United States Patent
Newman et al.

(10) Patent No.: US 12,479,838 B2
(45) Date of Patent: Nov. 25, 2025

(54) D3 RECEPTOR AGONIST COMPOUNDS; METHODS OF PREPARATION; INTERMEDIATES THEREOF; AND METHODS OF USE THEREOF

(71) Applicant: THE UNITED STATES OF AMERICA, AS REPRESENTED BY THE SECRETARY, DEPARTMENT OF HEALTH AND HUMAN SERVICES, Bethesda, MD (US)

(72) Inventors: Amy Hauck Newman, Bethesda, MD (US); Alessandro Bonifazi, Bethesda, MD (US); Francisco Oscar Battiti, Bethesda, MD (US); Sophie L. Cemaj, Bethesda, MD (US)

(73) Assignee: THE UNITED STATES OF AMERICA, AS REPRESENTED BY THE SECRETARY, DEPARTMENT OF HEALTH AND HUMAN SERVICES, Bethesda, MD (US)

( * ) Notice: Subject to any disclaimer, the term of this patent is extended or adjusted under 35 U.S.C. 154(b) by 1066 days.

(21) Appl. No.: 17/602,504

(22) PCT Filed: Apr. 13, 2020

(86) PCT No.: PCT/US2020/027903
§ 371 (c)(1),
(2) Date: Oct. 8, 2021

(87) PCT Pub. No.: WO2020/210785
PCT Pub. Date: Oct. 15, 2020

(65) Prior Publication Data
US 2022/0220102 A1 Jul. 14, 2022

Related U.S. Application Data

(60) Provisional application No. 62/833,023, filed on Apr. 12, 2019.

(51) Int. Cl.
*C07D 413/14* (2006.01)
(52) U.S. Cl.
CPC .................. *C07D 413/14* (2013.01)
(58) Field of Classification Search
CPC .................................................. C07D 413/14
See application file for complete search history.

(56) References Cited

U.S. PATENT DOCUMENTS

| | | | |
|---|---|---|---|
| 4,792,548 A | 12/1988 | Dewald et al. | |
| 5,077,290 A | 12/1991 | Fisher et al. | |
| 5,124,328 A | 6/1992 | Fisher et al. | |
| 2005/0288270 A1 | 12/2005 | Allerton et al. | |

FOREIGN PATENT DOCUMENTS

| | | | | |
|---|---|---|---|---|
| CN | 1948315 A | 4/2007 | | |
| CN | 100402534 C | 7/2008 | | |
| WO | 2004052372 A1 | 6/2004 | | |
| WO | WO-2005115985 A1 * | 12/2005 | ............. | A61P 15/00 |
| WO | 2006082511 A1 | 8/2006 | | |
| WO | 2007/119463 A1 | 10/2007 | | |
| WO | 2008087512 A1 | 7/2008 | | |
| WO | 2018/092921 A1 | 5/2018 | | |

OTHER PUBLICATIONS

National Library of Medicine, Dopamine Agonists, 2023 (Year: 2023).*
PCT International Search Report for PCT/US2020/027903, mailed Jul. 13, 2020.
Dewald et al. "Synthesis and Dopamine Agonist Properties of (+)-trans-3,4,4a,10b-tetrahydro-4-propyl-2H,5H-[1]benzopyrano[4,3-b]-1,4-oxazin-9-ol and Its Enantiomers," Journal of Medicinal Chemistry, (1990), vol. 33: 445-50.
Caine et al., "Modulation of Cocaine Self-Administration in the Rat Through D-3 Dopamine Receptors," Science, 260: 1814-1816 (1993).
Galaj et al., "A Highly D3R-selective and Efficacious Partial Agonist (S)-ABS01-113 Compared to its D3R-selective Antagonist Enantiomer (R)-ABS01-113 as Potential Treatments for Opioid Use Disorder," Neuropsychopharmacology, 47: 2309-2318 (2022).
Keck et al., "Identifying Medication Targets for Psychostimulant Addiction: Unraveling the Dopamine D3 Receptor Hypothesis," Journal of Medicinal Chemistry, 58: 5361-5380 (2015).
Shen et al., "Neuropharmacology Involvement of Dopamine D3 Receptor in Impulsive Choice Decision-making in Male Rats," Neuropharmacology, 257: 1-14 (2024).
Shen et al., "Cocaine Self-Administration Increases Impulsive Decision-Making in Low-Impulsive Rats Associated with Impaired Functional Connectivity in the Mesocorticolimbic System," eNeuro, 12(3): 1-19 (2025).
Canadian Intellectual Property Office, Office Action mailed in Canadian Patent Application No. 3,136,151 (Apr. 17, 2025).

* cited by examiner

*Primary Examiner* — Jeffrey H Murray
*Assistant Examiner* — Kevin S Martin
(74) *Attorney, Agent, or Firm* — Leydig, Voit & Mayer, Ltd.

(57) ABSTRACT

Disclosed herein are novel compounds including dopamine $D_3$ receptor agonists, compositions thereof, methods of use thereof, and processes of synthesizing the same. Further disclosed are $D_3R$ selective agonist compounds, specifically bitopic ligands comprising chirality.

22 Claims, No Drawings

D3 RECEPTOR AGONIST COMPOUNDS; METHODS OF PREPARATION; INTERMEDIATES THEREOF; AND METHODS OF USE THEREOF

CROSS-REFERENCE TO RELATED APPLICATIONS

This application is the National Stage entry of International Application No. PCT/US2020/027903, filed Apr. 13, 2020, which claims the benefit priority of U.S. Provisional Patent Application No. 62/833,023, filed Apr. 12, 2019, the contents of which are incorporated herein by reference in its entirety for all purposes.

BACKGROUND

Dopamine (DA) $D_3$ receptors ($D_3R$) are involved in several neurological mechanisms in the central nervous system (CNS), and hypo- or hyper-alteration of their functionality with consequent changes in brain plasticity is associated with multiple neuropsychiatric disorders.

$D_3R$ belong to the same $D_2$-like receptor family as $D_2R$ and $D_4R$ subtypes, sharing with them a high level of homology, highlighting the challenges in designing compounds to target them selectively.

$D_3R$ are one of the main therapeutic targets in the development of small drug-like molecules able to activate (agonists and partial agonists) or block (antagonists) the signaling pathways regulated by these receptors.

$D_3R$ agonists have been developed for the treatment of Parkinson's disease (PD) and its locomotor associated disorders. However, over the years, the design of $D_2$-like receptor selective agonists has proven to be an elusive challenge. This is likely due to the high level of homology between the receptors' orthosteric binding sites (OBS—site recognized by the endogenous agonist DA to initiate physiological signaling activation). Indeed, most of the agonists currently used in therapies or as tools for in vitro and in vivo drug development (i.e. Pramipexol, 7-OH-DPAT, ergoline derivatives, (+)-PD128,907, just to cite few examples) show very limited $D_3R$ selectivity, with $D_3R$ over $D_2R$ selectivity of ~10-fold. This could not only partially explain the cross-activation side effects observed in in vivo studies, but it could also limit validation of studies where it is difficult to discern the effects from activation of similar co-expressed receptor subtypes.

Additionally, assessing agonist affinity and selectivity in binding studies could be challenging and radioligand-probe dependent. Indeed, some of the high binding selectivity reported in the past for promising $D_3R$ agonists, often does not translate in the same way into functional studies, and these may be consequence of the radiotracer probes and assay conditions used in radioligand competition experiments.

There remains great interest in the development of selective dopamine receptor subtype-selective agonists because of the potential therapeutic applications in neurological disorders and as pharmacological tools, particularly interest in developing improved $D_3R$ selective agonists.

SUMMARY

In an embodiment is a compound of Formula I, II, III, or IV:

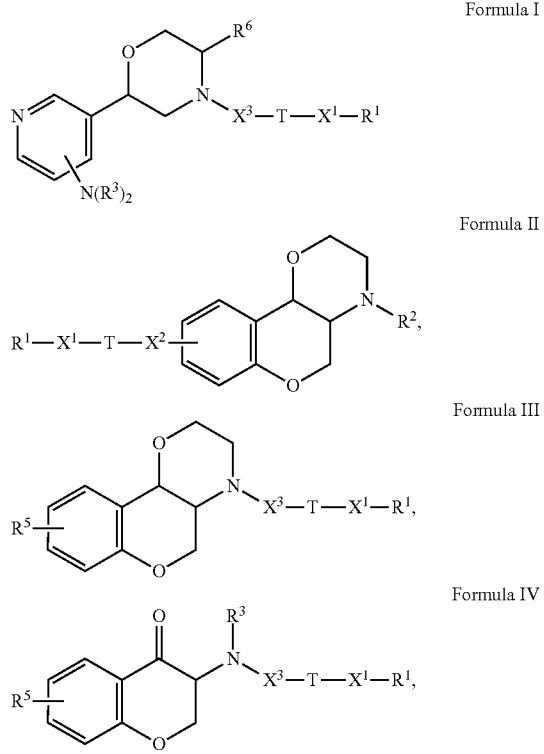

or a pharmaceutically acceptable salt thereof, wherein $R^1$ is an aryl, a heteroaryl, or a heterocycloalkyl; T is a tether group; $X^1$ is a covalent bond, O, S, $NR^3$, —(C=O)—, or $C(R^4)_2$, $N(R^3)$—(C=O)—, —(C=O)—$N(R^3)$, —O—(C=O)—O—, —O—(C=O)—$N(R^3)$—, —$N(R^3)$—(C=O)—O—, or —$N(R^3)$—(C=O)—$N(R^3)$—; $X^2$ is a covalent bond, O, S, $NR^3$, —(C=O)—, or $C(R^4)_2$, $N(R^3)$—(C=O)—, —(C=O)—$N(R^3)$, —O—(C=O)—O—, —O—(C=O)—$N(R^3)$—, —$N(R^3)$—(C=O)—O—, or —$N(R^3)$—(C=O)—$N(R^3)$—; $R^2$ is hydrogen, $C_1$-$C_6$ alkyl, $C_1$-$C_6$ haloalkyl, or $C_2$-$C_6$alkanoyl; each instance of $R^3$ independently is hydrogen, $C_1$-$C_6$ alkyl, $C_1$-$C_6$ haloalkyl, or $C_2$-$C_6$alkanoyl; each instance of $R^4$ independently is hydrogen, $C_1$-$C_6$ alkyl, $C_1$-$C_6$ haloalkyl, halogen, hydroxyl, amino, nitro, cyano, —COOH, —CHO, —$CONH_2$, $C_1$-$C_6$alkoxy, $C_1$-$C_6$haloalkoxy, $C_2$-$C_6$alkanoyl, mono-$C_1$-$C_2$alkylamino, or di-$C_1$-$C_2$alkylamino; $X^3$ is a covalent bond or —(C=O)—; $R^5$ is hydrogen, hydroxyl, halogen, amino, nitro, cyano, $C_1$-$C_6$ alkyl, —COOH, —CHO, —$CONH_2$, $C_1$-$C_6$alkoxy, $C_1$-$C_6$haloalkyl, $C_1$-$C_6$haloalkoxy, $C_2$-$C_6$alkanoyl, mono-$C_1$-$C_2$alkylamino, or di-$C_1$-$C_2$alkylamino; and $R^6$ is $C_1$-$C_6$ alkyl, $C_1$-$C_6$alkoxy, $C_1$-$C_6$haloalkyl, or $C_1$-$C_6$haloalkoxy.

In a further embodiment are compositions and pharmaceutical compositions comprising a compound of any one of Formula I, II, III, or IV, or a pharmaceutically acceptable salt thereof, and optionally further comprising at least one pharmaceutically acceptable carrier.

In another embodiment, a method for treating a neuropsychiatric disorder or dopaminergic system dysfunction, female arousal disorder, hypoactive sexual desire disorder and female orgasmic disorder, male erectile and ejaculatory dysfunctions, pain, myopia, or diabetes and weight gain induced by antipsychotic therapies, comprises providing a therapeutically effective amount of a compound or salt of any one of Formula I, II, III, or IV, or a pharmaceutical composition thereof to a patient in need thereof.

In still another embodiment are processes of preparing a compound of Formula I, II, III, or IV.

DETAILED DESCRIPTION

Disclosed herein are $D_3R$ agonist compounds and intermediates used in the preparation of such compounds. Further disclosed are $D_3R$ selective agonist compounds, specifically bitopic ligands comprising chirality. Due to the large degree of homogeneity among the $D_2$-like family of dopamine receptors, achieving ligands capable of discrimination among the subtypes remains a significant challenge. Use of bitopic ligands has been found to be a powerful strategy in achieving increased $D_2R$ or $D_3R$ selectivity for agonists and antagonists alike.

Disclosed herein are bitopic ligands derived from the chemical modification of the $D_3$ preferential agonists PF-592,379 and (+)-PD128,907, to generate novel compounds and/or to further improve their $D_3R$ selectivity.

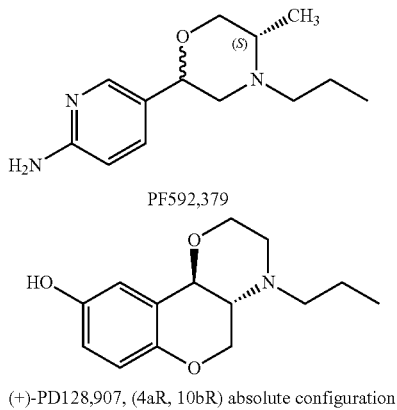

PF592,379

(+)-PD128,907, (4aR, 10bR) absolute configuration

These $D_3R$ preferential full-agonists were selected as the main primary pharmacophore ("PP", recognizing the OBS) scaffolds for chemical modifications guided by structure-activity relationship (SAR) studies. The PP can be linked to a secondary pharmacophore (SP) (inspired by privileged structural synthons able to bind a secondary binding pocket (SBP) or an allosteric binding site (ABS)) to result in compounds with high subtype affinity, selectivity, as well as unique pharmacological behaviors as a consequence of highly specific ligand-induced receptor conformations.

Extensive pharmacokinetic studies have been conducted on PF592,379, particularly focused on absorption routes, bioavailability, metabolic pathways and elimination, in rats, dogs and humans. Drug self-administration and drug discrimination studies in rats, also confirmed the lack of abuse potential for PF592,379, which is an important requirement in the development of compounds enhancing the dopaminergic signaling, for potential therapeutic applications.

Also provided are pharmaceutical compositions comprising a $D_3R$ agonist compound, specifically a $D_3R$ selective agonist compound, and a pharmaceutically acceptable carrier. Such pharmaceutical compositions may contain the $D_3R$ agonist compound or $D_3R$ selective agonist compound as the only active agent or may contain a combination of the $D_3R$ agonist compound $D_3R$ selective agonist compound and another pharmaceutically active agent. Also provided are methods for treating a neuropsychiatric disorders or dopaminergic system dysfunction comprising administering a $D_3R$ agonist compound or $D_3R$ selective agonist compound to a patient in need thereof, such or by administration of a pharmaceutical composition comprising the $D_3R$ agonist compound or $D_3R$ selective agonist compound.

$D_3R$ agonist compounds and $D_3R$ selective agonist compounds include those according to Formula I, Ia, Ib, II, IIa, III, IV, and IVa disclosed herein. Formula I, Ia, Ib, II, IIa, III, IV, and IVa may also encompass intermediate compounds that can be used in the preparation of $D_3R$ agonist compounds and $D_3R$ selective agonist compounds.

A compound of Formula I:

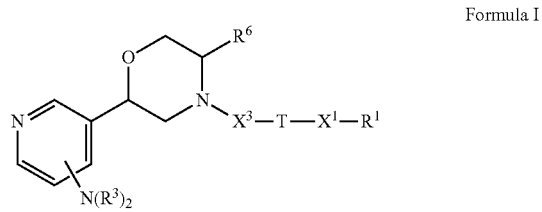

Formula I or a pharmaceutically acceptable salt thereof, wherein wherein $R^1$ is an aryl, a heteroaryl, or a heterocycloalkyl;

T is a tether group;

$X^1$ is a covalent bond, O, S, $NR^3$, —(C═O)—, or $C(R^4)_2$, —N($R^3$)—(C═O)—, —(C═O)—N($R^3$), —O—(C═O)—O—, —O—(C═O)—N($R^3$)—, —N($R^3$)—(C═O)—O—, or —N($R^3$)—(C═O)—N($R^3$)—;

$X^3$ is a covalent bond or —(C═O)—;

each instance of $R^3$ independently is hydrogen, $C_1$-$C_6$ alkyl, $C_1$-$C_6$ haloalkyl, or $C_2$-$C_6$alkanoyl; and each instance of $R^4$ independently is hydrogen, $C_1$-$C_6$ alkyl, $C_1$-$C_6$ haloalkyl, halogen, hydroxyl, amino, nitro, cyano, —COOH, —CHO, —CONH$_2$, $C_1$-$C_6$alkoxy, $C_1$-$C_6$haloalkoxy, $C_2$-$C_6$alkanoyl, mono-$C_1$-$C_2$alkylamino, or di-$C_1$-$C_2$alkylamino; and $R^6$ is $C_1$-$C_6$ alkyl, $C_1$-$C_6$alkoxy, $C_1$-$C_6$haloalkyl, or $C_1$-$C_6$haloalkoxy.

A compound of Formula Ia, Ib, Ia-1, Ia-2, Ib-1, or Ib-2:

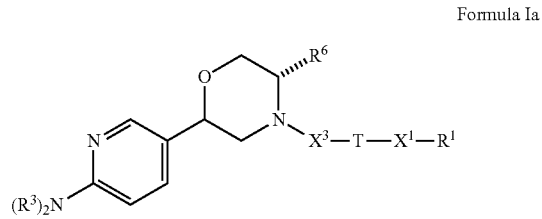

Formula Ia

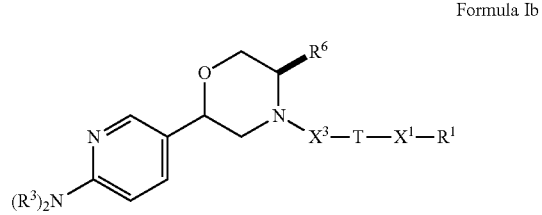

Formula Ib

-continued

Formula Ia-1

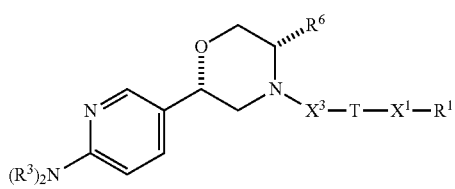

Formula Ia-2

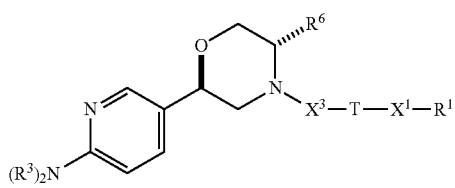

Formula Ib-1

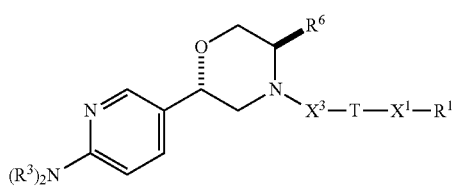

Formula Ib-2

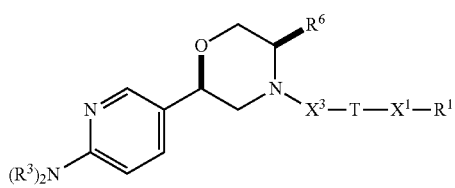

or a pharmaceutically acceptable salt thereof, wherein $R^1$, $X^1$, $X^3$, T, $R^3$, and $R^6$ are as defined previously for Formula I.

In an aspect, a compound of Formula I, Ia, Ib, Ia-1, Ia-2, Ib-1, or Ib-2, wherein $X^1$ is O, $N(R^3)$—(C=O)— or —(C=O)—$N(R^3)$; each instance of $R^3$ independently is hydrogen or $C_1$-$C_6$ alkyl, specifically hydrogen; $X^3$ is a covalent bond; and $R^6$ is $C_1$-$C_6$ alkyl, specifically, $C_1$-$C_3$ alkyl, or more specifically methyl.

The tether group T can be an alkyl chain containing 3, 4, 5, 6, 7, 8, 9 or more carbon atoms in the chain (the number of carbon atoms excluding pendant substitution), optionally including internal unsaturation, an internal cycloalky group, an internal heteroatom (e.g. O, N, S, or P, specifically an internal 0 (ether group) such as where T is —$(CH_2)_y$—O—$(CH_2)_y$— where each y independently is 1, 2, 3, or more), a substitution on the alkyl chain where the substitution is described herein (e.g. oxo, hydroxyl, alkyl, alkoxy, halogen, cycloalkyl group, hydroxyl-cycloalkyl group, etc.), an internal heteroaryl group (e.g. triazolyl), an internal heterocycloalkyl group (e.g., pyrrolidinyl), or a combination thereof. Exemplary internal unsaturation includes a —CH=CH— group or a —C≡C— group. Exemplary internal cycloalkyl groups include cyclopropyl, cyclobutyl, cyclopentyl, or cyclohexyl. Specific examples of T include —$(CH_2)_m$— wherein m is 3, 4, 5, 6, 7, or 8 (e.g., n-butyl, n-pentyl, etc.); —$(CH_2)_m$— substituted with 1, 2, or 3 substituents wherein each substituent independently is $C_1$-$C_6$ alkyl, $C_1$-$C_6$ haloalkyl, halogen, hydroxyl, amino, nitro, cyano, —COOH, —CHO, —$CONH_2$, $C_1$-$C_6$alkoxy, $C_1$-$C_6$haloalkoxy, $C_2$-$C_6$alkanoyl, mono-$C_1$-$C_2$alkylamino, or di-$C_1$-$C_2$alkylamino, specifically 1 substituent that is hydroxyl, wherein m is 3, 4, 5, 6, 7, or 8 (e.g., substituted n-butyl, n-pentyl, etc.); —$(CH_2)_n$—CH=CH—$(CH_2)_n$—wherein each instance of n independently is 1, 2, or 3 (e.g., E-butenyl); or

wherein each instance of n independently is 1, 2, or 3 (e.g., cis-(methyl)cyclopropyl-methyl, trans-(methyl)cyclopropyl-methyl, trans-(methyl)cyclopropyl-ethyl, trans-(ethyl)cyclopropyl-methyl), cis-(methyl)cyclopropyl-ethyl, cis-(ethyl)cyclopropyl-methyl): or T can be one of the following groups:

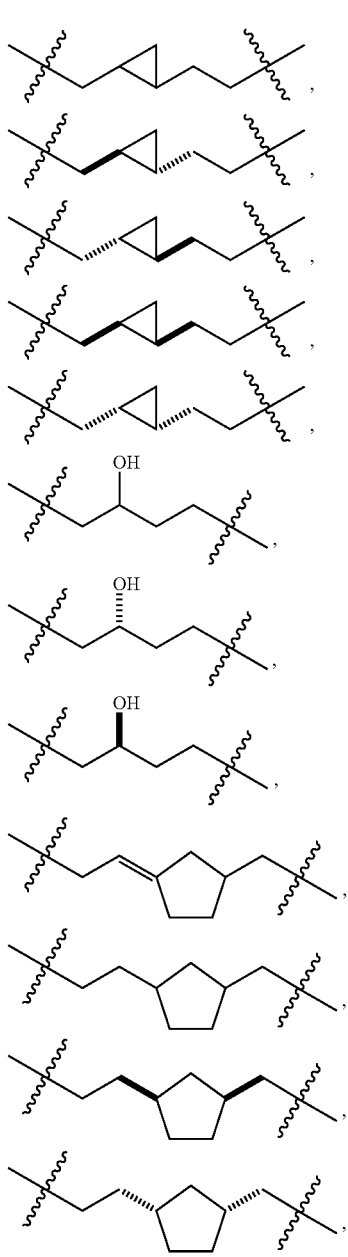

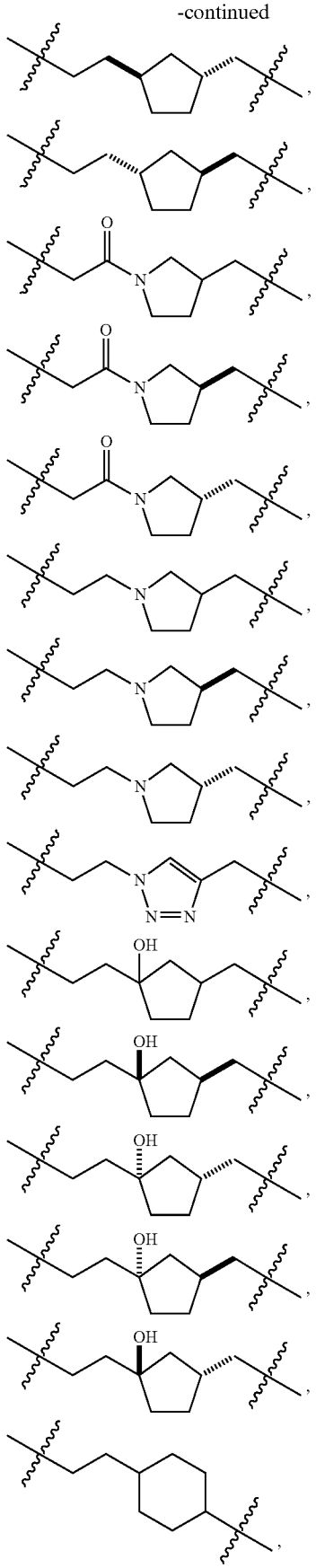
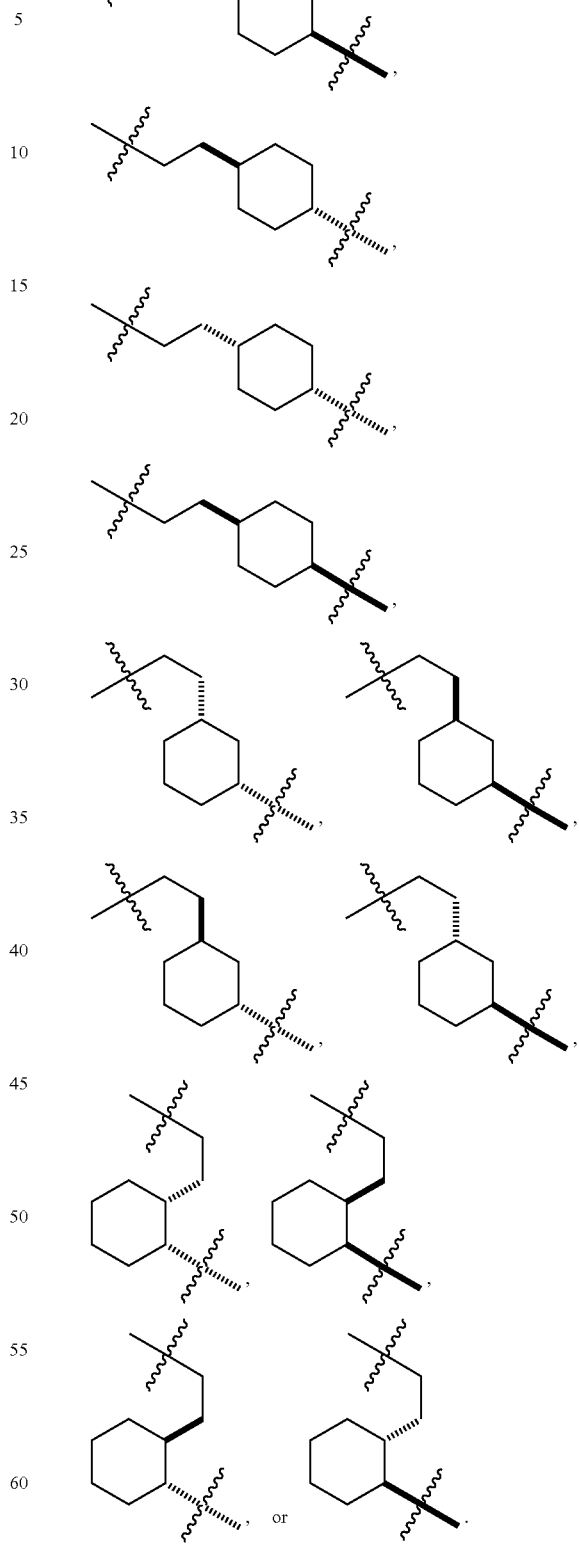
R[1] is an aryl, a heteroaryl, or a heterocycloalkyl, each of which may optionally be substituted with 1, 2, 3, or 4 substituents as defined herein.

Exemplary groups for $R^1$ include benzofuran, benzothiazole, 3,4-dihydroquinolin-2(1H)-one, fluorene, indole, 1H-pyrrolo[2,3-b]pyridine, and the like. Further exemplary groups for $R^1$ include

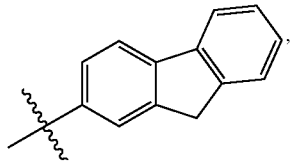

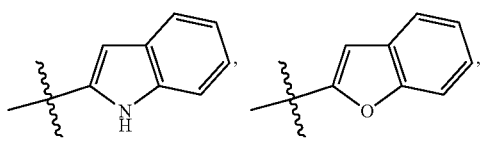

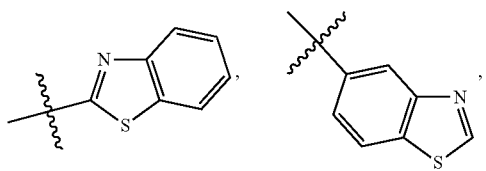

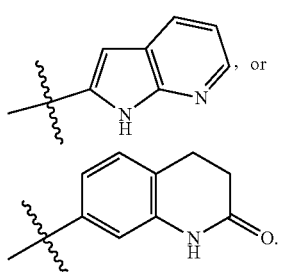

In an embodiment, a compound of Formula Ia, or Formula Ia-1, wherein $X^3$ is a covalent bond; each instance of $R^3$ independently is hydrogen; $R^6$ is methyl; $X^1$ is as previously defined above, specifically —N($R^3$)—(C=O)—; and $R^1$ and T are as previously defined above.

A compound of Formula II:

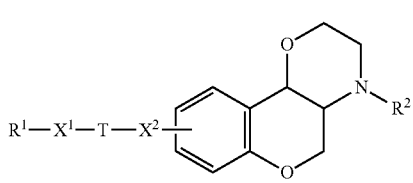

Formula II or a pharmaceutically acceptable salt thereof, wherein $R^1$, T, $X^1$, $R^3$, and $R^4$ are as defined previously for Formula I;

$X^2$ is a covalent bond, O, S, $NR^3$, —(C=O)—, or $C(R^4)_2$, N($R^3$)—(C=O)—, —(C=O)—N($R^3$), —O—(C=O)—O—, —O—(C=O)—N($R^3$)—, —N($R^3$)—(C=O)—O—, or —N($R^3$)—(C=O)—N($R^3$)—; and $R^2$ is hydrogen, $C_1$-$C_6$ alkyl, $C_1$-$C_6$ haloalkyl, or $C_2$-$C_6$alkanoyl.

A compound of Formula IIa:

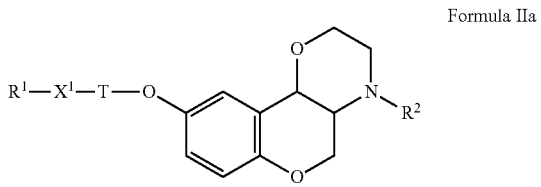

Formula IIa or a pharmaceutically acceptable salt thereof, wherein $R^1$, $R^2$, $X^1$, and T are as defined previously for Formula II.

In an aspect, a compound of Formula II or IIa, wherein $R^2$ is $C_1$-$C_6$ alkyl, specifically $C_2$-$C_5$ alkyl, or more specifically $C_3$-$C_4$ alkyl; $X^1$ is O, N($R^3$)—(C=O)— or —(C=O)—N($R^3$); $X^2$ is a covalent bond or O; and each instance of $R^3$ independently is hydrogen or $C_1$-$C_6$ alkyl, specifically hydrogen.

A compound of Formula III:

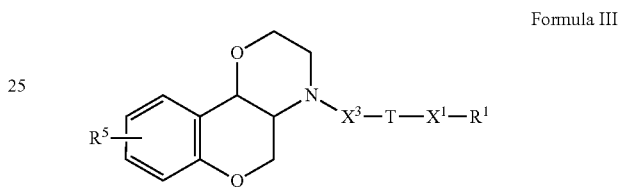

Formula III or a pharmaceutically acceptable salt thereof, wherein $R^1$, $X^1$, and T are as defined previously for Formula I; $X^3$ is a covalent bond or —(C=O)—; and $R^5$ is hydrogen, hydroxyl, halogen, amino, nitro, cyano, $C_1$-$C_6$ alkyl, —COOH, —CHO, —CONH$_2$, $C_1$-$C_6$alkoxy, $C_1$-$C_6$haloalkyl, $C_1$-$C_6$haloalkoxy, $C_2$-$C_6$alkanoyl, mono-$C_1$-$C_2$alkylamino, or di-$C_1$-$C_2$alkylamino.

A compound of Formula IIIa:

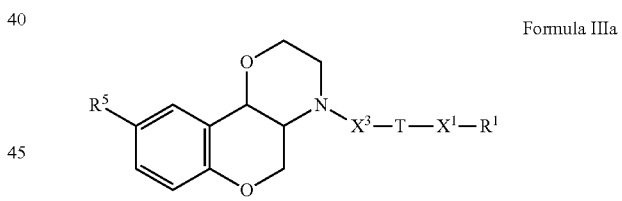

Formula IIIa or a pharmaceutically acceptable salt thereof, wherein $R^1$, $X^1$, $X^3$, T, and $R^5$ are as defined previously for Formula III.

In an aspect, a compound of Formula III or IIIa, wherein $X^1$ is O, N($R^3$)—(C=O)— or —(C=O)—N($R^3$); each instance of $R^3$ independently is hydrogen or $C_1$-$C_6$ alkyl, specifically hydrogen; $X^3$ is a covalent bond; and $R^5$ is hydrogen, hydroxyl, or $C_1$-$C_6$alkoxy, specifically hydroxyl.

The stereochemistry of the PP of Formulas II, IIa, III, and IIIa may be

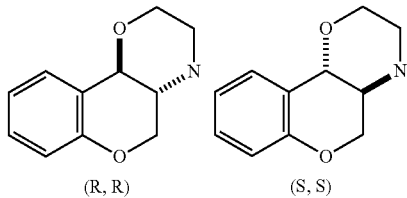

(R, R)    (S, S)

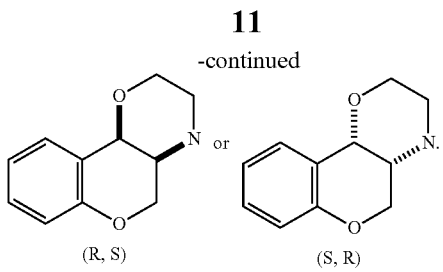

(R, S)          (S, R)

The individual diastereomers may be prepared using techniques known in the art, such as asymmetric synthesis, crystallization in the presence of a resolving agent, and chiral chromatography, just to name a few.

A compound of Formula IV:

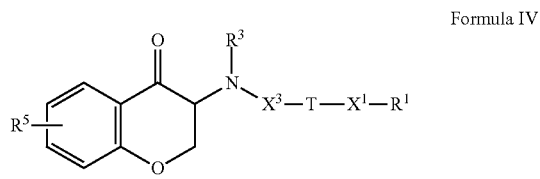

Formula IV or a pharmaceutically acceptable salt thereof, wherein $R^1$, $X^1$, $X^3$, T, $R^3$, and $R^5$ are as defined previously for Formula I, II, and III.

Also provided are processes for the preparation of a compound of any one of Formulas I, Ia, Ib, II, IIa, III, IIIa, and IV.

An exemplary process of preparing a compound of Formula II comprises alkylating Intermediate II-A with Intermediate II-B

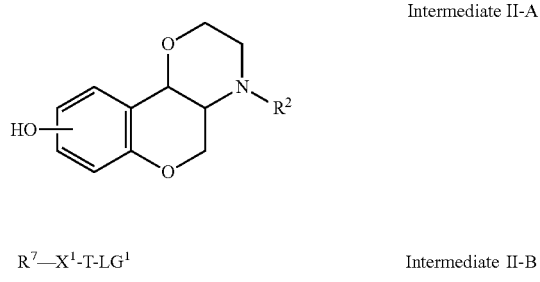

Intermediate II-A $R^7$—$X^1$-T-$LG^1$      Intermediate II-B wherein $LG^1$ is a leaving group; and $R^7$ is $R^1$ or a protecting group, optionally when $R^7$ is a protecting group, further comprising deprotecting and coupling the resulting intermediate compound with a compound comprising a $R^1$ group. The $R^2$ group of Intermediate II-A and $X^1$, T, and $R^1$ groups of Intermediate II-B are as previously defined for Formula II.

In an aspect, an exemplary process of preparing a compound of Formula III comprises reacting Intermediate III-A with Intermediate III-B via reductive amination

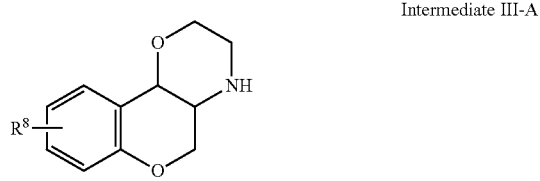

Intermediate III-A

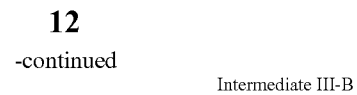

Intermediate III-B wherein $R^8$ is hydroxyl or —O-$PG^2$, wherein $PG^2$ is a hydroxyl protecting group, and optionally further comprising a deprotecting step to remove $PG^2$. The $R^1$, $X^1$, and T groups of Intermediate III-B are as previously defined for Formula III.

In another aspect, an exemplary process of preparing a compound of Formula IV comprises reacting Intermediate IV-A with Intermediate IV-B via reductive amination

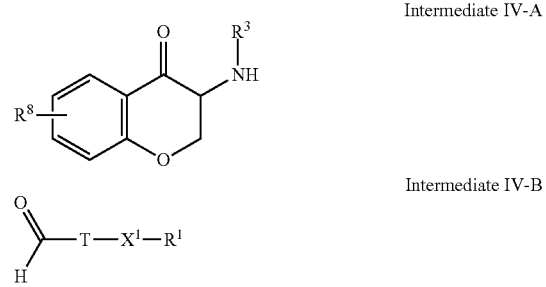

Intermediate IV-A

Intermediate IV-B wherein $R^8$ is hydroxyl or —O-$PG^2$, wherein $PG^2$ is a hydroxyl protecting group, and optionally further comprising a deprotecting step to remove $PG^2$. The $R^1$, $X^1$, and T groups of Intermediate IV-B are as previously defined for Formula IV.

In an aspect, an exemplary process of preparing a compound of Formula I comprises reacting Intermediate I-A with Intermediate I-B via reductive amination

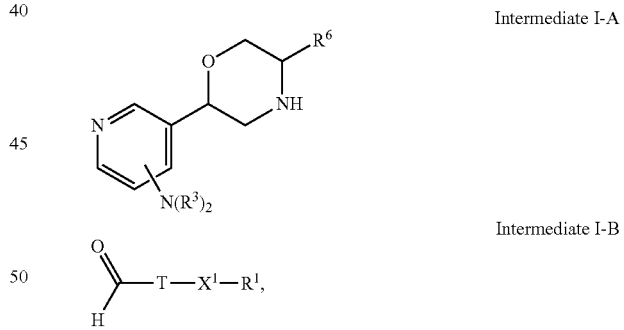

Intermediate I-A

Intermediate I-B alkylating Intermediate I-A with Intermediate I-C $R^7$—$X^1$-T-$LG^1$ Intermediate IC, wherein $LG^1$ is a leaving group; and $R^7$ is $R^1$ or a protecting group, optionally when $R^7$ is a protecting group, further comprising deprotecting and coupling the resulting intermediate compound with a compound comprising a $R^1$ group. The $R^6$ and $R^3$ groups of Intermediate I-A, the $R^1$, $X^1$, and T groups of Intermediate I-B, and the $R^1$, $X^1$, and T groups of Intermediate I-C are as previously defined for Formula I.

The compounds are described using standard nomenclature. Unless defined otherwise, all technical and scientific terms used herein have the same meaning as is commonly understood by one of skill in the art to which this disclosure belongs. Unless clearly contraindicated by the context each compound name includes the free acid or free base form of the compound as well hydrates of the compound and all pharmaceutically acceptable salts of the compound.

The term "Formula I," "Formula Ia," "Formula Ib," "Formula II," "Formula IIa," "Formula III," "Formula IIIa," and "Formula IV," etc. as used herein, encompasses all compounds that satisfy these Formulas, including any enantiomers, racemates and stereoisomers, as well as all pharmaceutically acceptable salts of such compounds. The terms include all subgeneric groups of the Formulas including salts and hydrates, unless clearly contraindicated by the context in which this phrase is used.

In certain situations, the compounds of the Formulas contain one or more asymmetric elements such as stereogenic centers, stereogenic axes and the like, e.g. asymmetric carbon atoms, so that the compounds can exist in different stereoisomeric forms. These compounds can be, for example, racemates or optically active forms. For compounds with two or more asymmetric elements, these compounds can additionally be mixtures of diastereomers. For compounds having asymmetric centers, it should be understood that all of the optical isomers and mixtures thereof are encompassed. In these situations, single enantiomers, i.e., optically active forms, can be obtained by asymmetric synthesis, synthesis from optically pure precursors, or by resolution of the racemates. Resolution of the racemates can also be accomplished, for example, by conventional methods such as crystallization in the presence of a resolving agent, or chromatography, using, for example, a chiral HPLC column. All stereochemical combinations of diastereoisomers and/or enantiomers of the disclosed compounds are contemplated herein.

Where a compound exists in various tautomeric forms, the compound is not limited to any one of the specific tautomers, but rather includes all tautomeric forms.

All isotopes of atoms occurring in the present compounds are contemplated. Isotopes include those atoms having the same atomic number but different mass numbers. By way of general example, and without limitation, isotopes of hydrogen such as $^2H$ and $^3H$, carbon, such as $^{11}C$, $^{13}C$ and $^{14}C$, chlorine, such as $^{36}Cl$, fluorine, such as $^{18}F$, iodine, such as $^{123}I$ and $^{125}I$, nitrogen, such as $^{13}N$ and $^{15}N$, oxygen, such as $^{15}O$, $^{17}O$, and $^{18}O$, phosphorus, such as $^{32}P$, and sulfur, such as $^{35}S$.

Certain compounds are described herein using a general formula that includes variables, e.g. $R^1$ to $R^8$, $X^1$, $X^2$, $X^3$, T, etc. Unless otherwise specified, each variable within such a formula is defined independently of other variables. Thus, if a group is said to be substituted, e.g., with 0-2 $R^1$, then the group may be substituted with up to two $R^1$ groups and $R^1$ at each occurrence is selected independently from the definition of $R^1$. Also, combinations of substituents and/or variables are permissible only if such combinations result in stable compounds.

The term "active agent", as used herein, means a compound (including a compound of the Formulas I, II, etc.), element, or mixture that when administered to a patient, alone or in combination with another compound, element, or mixture, confers, directly or indirectly, a physiological effect on the patient. The indirect physiological effect may occur via a metabolite or other indirect mechanism. When the active agent is a compound, then salts, solvates (including hydrates) of the free compound, crystalline forms, non-crystalline forms, and any polymorphs of the compound are included. All forms are contemplated herein regardless of the methods used to obtain them.

A dash ("-") that is not between two letters or symbols is used to indicate a point of attachment for a substituent. For example, —(CH$_2$)C$_3$-C$_8$cycloalkyl is attached through carbon of the methylene (CH$_2$) group.

"Alkanoyl" is an alkyl group as defined herein, covalently bound to the group it substitutes by a keto (—(C=O)—) bridge. Alkanoyl groups have the indicated number of carbon atoms, with the carbon of the keto group being included in the numbered carbon atoms. For example a C$_2$alkanoyl group is an acetyl group having the formula CH$_3$(C=O)—.

The term "alkyl", as used herein, means a branched or straight chain saturated aliphatic hydrocarbon group having the specified number of carbon atoms, generally from 1 to about 12 carbon atoms. The term C$_1$-C$_6$alkyl as used herein indicates an alkyl group having from 1, 2, 3, 4, 5, or 6 carbon atoms. Other embodiments include alkyl groups having from 1 to 8 carbon atoms, 1 to 4 carbon atoms or 1 or 2 carbon atoms, e.g. C$_1$-C$_6$alkyl, C$_1$-C$_4$alkyl, and C$_1$-C$_2$alkyl. When C$_0$-C$_n$ alkyl is used herein in conjunction with another group, for example, (cycloalkyl)C$_0$-C$_4$alkyl, the indicated group, in this case cycloalkyl, is either directly bound by a single covalent bond (C$_0$), or attached by an alkyl chain having the specified number of carbon atoms, in this case 1, 2, 3, or 4 carbon atoms. Examples of alkyl include, but are not limited to, methyl, ethyl, n-propyl, isopropyl, n-butyl, 3-methylbutyl, t-butyl, n-pentyl, and sec-pentyl.

The term "cycloalkyl", as used herein, indicates a saturated hydrocarbon ring group, having only carbon ring atoms and having the specified number of carbon atoms, usually from 3 to about 8 ring carbon atoms, or from 3 to about 7 carbon atoms. Examples of cycloalkyl groups include cyclopropyl, cyclobutyl, cyclopentyl, or cyclohexyl as well as bridged or caged saturated ring groups such as norborane or adamantane.

The term "heterocycloalkyl", as used herein, indicates a saturated cyclic group containing from 1 to about 3 heteroatoms chosen from N, O, and S, with remaining ring atoms being carbon. Heterocycloalkyl groups have from 3 to about 8 ring atoms, and more typically have from 5 to 7 ring atoms. Examples of heterocycloalkyl groups include morpholinyl, piperazinyl, piperidinyl, and pyrrolidinyl groups. A nitrogen in a heterocycloalkyl group may optionally be quaternized.

The term "alkenyl", as used herein, means straight and branched hydrocarbon chains comprising one or more unsaturated carbon-carbon bonds, which may occur in any stable point along the chain. Alkenyl groups described herein typically have from 2 to about 12 carbon atoms. Exemplary alkenyl groups are lower alkenyl groups, those alkenyl groups having from 2 to about 8 carbon atoms, e.g. C$_2$-C$_8$, C$_2$-C$_6$, and C$_2$-C$_4$ alkenyl groups. Examples of alkenyl groups include ethenyl, propenyl, and butenyl groups.

The term "cycloalkenyl", as used herein, means a saturated hydrocarbon ring group, comprising one or more unsaturated carbon-carbon bonds, which may occur in any stable point of the ring, and having the specified number of carbon atoms. Monocyclic cycloalkenyl groups typically have from 3 to about 8 carbon ring atoms or from 3 to 7 (3, 4, 5, 6, or 7) carbon ring atoms. Cycloalkenyl substituents may be pendant from a substituted nitrogen or carbon atom, or a substituted carbon atom that may have two substituents may have a cycloalkenyl group, which is attached as a spiro group. Examples of cycloalkenyl groups include cyclopropenyl, cyclobutenyl, cyclopentenyl, or cyclohexenyl as well as bridged or caged saturated ring groups such as norbornene.

The terms "(cycloalkyl)$C_0$-$C_n$alkyl", as used herein, means a substituent in which the cycloalkyl and alkyl are as defined herein, and the point of attachment of the (cycloalkyl)alkyl group to the molecule it substitutes is either a single covalent bond, ($C_0$alkyl) or on the alkyl group. (Cycloalkyl)alkyl encompasses, but is not limited to, cyclopropylmethyl, cyclobutylmethyl, and cyclohexylmethyl.

The terms "(heterocycloalkyl)$C_0$-$C_n$alkyl", as used herein, means a substituent in which the heterocycloalkyl and alkyl are as defined herein, and the point of attachment of the (heterocycloalkyl)alkyl group to the molecule it substitutes is either a single covalent bond, ($C_0$alkyl) or on the alkyl group. (Heterocycloalkyl)alkyl encompasses, but is not limited to, morpholinylmethyl, piperazinylmethyl, piperidinylmethyl, and pyrrolidinylmethyl groups.

The term "aryl", as used herein, means aromatic groups containing only carbon in the aromatic ring or rings. Typical aryl groups contain 1 to 3 separate, fused, or pendant rings and from 6 to about 18 ring atoms, without heteroatoms as ring members. When indicated, such aryl groups may be further substituted with carbon or non-carbon atoms or groups. Bicyclic aryl groups may be further substituted with carbon or non-carbon atoms or groups. Bicyclic aryl groups may contain two fused aromatic rings (naphthyl) or an aromatic ring fused to a 5- to 7-membered non-aromatic cyclic group that optionally contains 1 or 2 heteroatoms independently chosen from N, O, and S, for example, a 3,4-methylenedioxy-phenyl group. Aryl groups include, for example, phenyl, naphthyl, including 1-naphthyl and 2-naphthyl, and bi-phenyl.

The term "mono- or bicyclic heteroaryl", as used herein, indicates a stable 5- to 7-membered monocyclic or 7- to 10-membered bicyclic heterocyclic ring which contains at least 1 aromatic ring that contains from 1 to 4, or specifically from 1 to 3, heteroatoms chosen from N, O, and S, with remaining ring atoms being carbon. When the total number of S and O atoms in the heteroaryl group exceeds 1, theses heteroatoms are not adjacent to one another. Specifically, the total number of S and O atoms in the heteroaryl group is not more than 2, more specifically the total number of S and O atoms in the heteroaryl group is not more than 1. A nitrogen atom in a heteroaryl group may optionally be quaternized. When indicated, such heteroaryl groups may be further substituted with carbon or non-carbon atoms or groups. Such substitution may include fusion to a 5 to 7-membered saturated cyclic group that optionally contains 1 or 2 heteroatoms independently chosen from N, O, and S, to form, for example, a [1,3]dioxolo[4,5-c]pyridyl group. In certain embodiments 5- to 6-membered heteroaryl groups are used. Examples of heteroaryl groups include, but are not limited to, pyridyl, indolyl, pyrimidinyl, pyridizinyl, pyrazinyl, imidazolyl, oxazolyl, furanyl, thiophenyl, thiazolyl, triazolyl, tetrazolyl, isoxazolyl, quinolinyl, pyrrolyl, pyrazolyl, benz[b]thiophenyl, isoquinolinyl, quinazolinyl, quinoxalinyl, thienyl, isoindolyl, and 5,6,7,8-tetrahydroisoquinoline.

"Haloalkyl" includes both branched and straight-chain alkyl groups having the specified number of carbon atoms, substituted with 1 or more halogen atoms, up to the maximum allowable number of halogen atoms. Examples of haloalkyl include, but are not limited to, trifluoromethyl, difluoromethyl, 2-fluoroethyl, and penta-fluoroethyl.

"Haloalkoxy" is a haloalkyl group as defined herein attached through an oxygen bridge (oxygen of an alcohol radical).

"Halo" or "halogen" is any of fluoro, chloro, bromo, and iodo.

"Mono- and/or di-alkylamino" is a secondary or tertiary alkyl amino group, wherein the alkyl groups are independently chosen alkyl groups, as defined herein, having the indicated number of carbon atoms. The point of attachment of the alkylamino group is on the nitrogen. Examples of mono- and di-alkylamino groups include ethylamino, dimethylamino, and methyl-propyl-amino.

The term "substituted", as used herein, means that any one or more hydrogens on the designated atom or group is replaced with a selection from the indicated group, provided that the designated atom's normal valence is not exceeded. When the substituent is oxo (i.e., =O) then 2 hydrogens on the atom are replaced. When an oxo group substitutes aromatic moieties, the corresponding partially unsaturated ring replaces the aromatic ring. For example, a pyridyl group substituted by oxo is a pyridone. Combinations of substituents and/or variables are permissible only if such combinations result in stable compounds or useful synthetic intermediates. A stable compound or stable structure is meant to imply a compound that is sufficiently robust to survive isolation from a reaction mixture, and subsequent formulation into an effective therapeutic agent.

Unless otherwise specified substituents are named into the core structure. For example, it is to be understood that when (cycloalkyl)alkyl is listed as a possible substituent the point of attachment of this substituent to the core structure is in the alkyl portion, or when arylalkyl is listed as a possible substituent the point attachment to the core structure is the alkyl portion.

Suitable groups that may be present on a "substituted" or "optionally substituted" position include, but are not limited to, halogen; cyano; hydroxyl; nitro; azido; alkanoyl (such as a $C_2$-$C_6$ alkanoyl group such as acyl or the like); carboxamido; alkyl groups (including cycloalkyl groups) having 1 to about 8 carbon atoms, or 1 to about 6 carbon atoms; haloalkyl groups having 1 to about 8 carbon atoms, or 1 to about 6 carbon atoms; alkenyl and alkynyl groups including groups having one or more unsaturated linkages and from 2 to about 8, or 2 to about 6 carbon atoms; alkoxy groups having one or more oxygen linkages and from 1 to about 8, or from 1 to about 6 carbon atoms; haloalkoxy groups having one or more oxygen linkages and from 1 to about 8, or from 1 to about 6 carbon atoms; aryloxy such as phenoxy; alkylthio groups including those having one or more thioether linkages and from 1 to about 8 carbon atoms, or from 1 to about 6 carbon atoms; alkylsulfinyl groups including those having one or more sulfinyl linkages and from 1 to about 8 carbon atoms, or from 1 to about 6 carbon atoms; alkylsulfonyl groups including those having one or more sulfonyl linkages and from 1 to about 8 carbon atoms, or from 1 to about 6 carbon atoms; aminoalkyl groups including groups having one or more N atoms and from 1 to about 8, or from 1 to about 6 carbon atoms; aryl having 6 or more carbons and one or more rings, (e.g., phenyl, biphenyl, naphthyl, or the like, each ring either substituted or unsubstituted aromatic); arylalkyl having 1 to 3 separate or fused rings and from 6 to about 18 ring carbon atoms, with benzyl being an exemplary arylalkyl group; arylalkoxy having 1 to 3 separate or fused rings and from 6 to about 18 ring carbon atoms, with benzyloxy being an exemplary arylalkoxy group; cycloalkenyl; (cycloalkyl)$C_0$-$C_3$alkyl; (heterocycloalkyl)$C_0$-$C_3$alkyl; or a saturated, unsaturated, or aromatic heterocyclic group having 1 to 3 separate or fused rings with 3 to about 8 members per ring and one or more N, O or S atoms, e.g. coumarinyl, quinolinyl, isoquinolinyl, quinazolinyl, pyridyl, pyrazinyl, pyrimidinyl, furanyl, pyrrolyl, thienyl, thiazolyl, triazinyl, oxazolyl, isoxazolyl, imidazolyl, indolyl, benzofuranyl, benzothiazolyl, tetrahydrofuranyl, tetrahydropyranyl, piperidinyl, morpholinyl, piperazinyl, and pyrrolidinyl. Such heterocyclic groups may be further substituted, e.g. with hydroxy, alkyl, alkoxy, halogen and amino.

The term "dosage form", as used herein, means a unit of administration of an active agent. Examples of dosage forms include tablets, capsules, injections, suspensions, liquids, emulsions, creams, ointments, suppositories, inhalable forms, transdermal forms, and the like. An exemplary dosage form is a solid oral dosage form.

The term "pharmaceutical compositions", as used herein, are compositions comprising at least one active agent, such as a compound or salt of Formula I, Ia, Ib, II, IIa, III, IIIa, IV, or a combination thereof, and at least one other substance, such as a carrier. Pharmaceutical compositions meet the U.S. FDA's GMP (good manufacturing practice) standards for human or non-human drugs. The pharmaceutical compositions can be formulated into a dosage form.

The term "pharmaceutically acceptable salt", as used herein, includes derivatives of the disclosed compounds in which the parent compound is modified by making inorganic and organic, acid or base addition salts thereof. The salts of the present compounds can be synthesized from a parent compound that contains a basic or acidic moiety by conventional chemical methods. Generally, such salts can be prepared by reacting free acid forms of these compounds with a stoichiometric amount of the appropriate base (such as Na, Ca, Mg, or K hydroxide, carbonate, bicarbonate, or the like), or by reacting free base forms of these compounds with a stoichiometric amount of the appropriate acid. Such reactions are typically carried out in water or in an organic solvent, or in a mixture of the two. Generally, non-aqueous media like ether, ethyl acetate, ethanol, isopropanol, or acetonitrile are used, where practicable. Salts of the present compounds further include solvates of the compounds and of the compound salts.

Examples of pharmaceutically acceptable salts include, but are not limited to, mineral or organic acid salts of basic residues such as amines; alkali or organic salts of acidic residues such as carboxylic acids; and the like. The pharmaceutically acceptable salts include the conventional non-toxic salts and the quaternary ammonium salts of the parent compound formed, for example, from non-toxic inorganic or organic acids. For example, conventional non-toxic acid salts include those derived from inorganic acids such as hydrochloric, hydrobromic, sulfuric, sulfamic, phosphoric, nitric and the like; and the salts prepared from organic acids such as acetic, propionic, succinic, glycolic, stearic, lactic, malic, tartaric, citric, ascorbic, pamoic, maleic, hydroxymaleic, phenylacetic, glutamic, benzoic, salicylic, mesylic, esylic, besylic, sulfanilic, 2-acetoxybenzoic, fumaric, toluenesulfonic, methanesulfonic, ethane disulfonic, oxalic, isethionic, $HOOC-(CH_2)_n-COOH$ where n is 0-4, and the like. Lists of additional suitable salts may be found, e.g., in *Remington's Pharmaceutical Sciences,* 17th ed., Mack Publishing Company, Easton, Pa., p. 1418 (1985).

The term "carrier", as used herein, applied to pharmaceutical compositions refers to a diluent, excipient, or vehicle with which an active compound is provided.

The term "patient", as used herein, is a human or non-human animal in need of medical treatment. Medical treatment can include treatment of an existing condition, such as a disease or disorder, prophylactic or preventative treatment, or diagnostic treatment. In some embodiments the patient is a human patient.

The term "providing", as used herein, means giving, administering, selling, distributing, transferring (for profit or not), manufacturing, compounding, or dispensing.

The term "providing a compound of Formula I, Ia, Ia-1, Ia-2, Ib, Ib-1, Ib-2, II, IIa, III, IIIa, or IV with at least one additional therapeutic agent", as used herein, means the compound of Formula I, Ia, Ia-1, Ia-2, Ib, Ib-1, Ib-2, II, IIa, III, IIIa, or IV and the additional active agent(s) are provided simultaneously in a single dosage form, provided concomitantly in separate dosage forms, or provided in separate dosage forms for administration separated by some amount of time that is within the time in which both the compound of Formula I, Ia, Ia-1, Ia-2, Ib, Ib-1, Ib-2, II, IIa, III, IIIa, or IV and the at least one additional active agent are within the blood stream of a patient. The compound of Formula I, Ia, Ia-1, Ia-2, Ib, Ib-1, Ib-2, II, IIa, III, IIIa, or IV and the additional active agent need not be prescribed for a patient by the same medical care worker. The additional active agent or agents need not require a prescription. Administration of the compound of Formula I, Ia, Ia-1, Ia-2, Ib, Ib-1, Ib-2, II, IIa, III, IIIa, or IV or the at least one additional active agent can occur via any appropriate route, for example, oral tablets, oral capsules, oral liquids, inhalation, injection, suppositories or topical contact.

The term "treatment", as used herein, includes providing a compound of Formula I, Ia, Ia-1, Ia-2, Ib, Ib-1, Ib-2, II, IIa, III, IIIa, or IV either as the only active agent or together with at least one additional active agent sufficient to: (a) prevent a disease or a symptom of a disease from occurring in a patient who may be predisposed to the disease but has not yet been diagnosed as having it; (b) inhibiting the disease, i.e. arresting its development; and (c) relieving the disease, i.e., causing regression of the disease. "Treating" and "treatment" also means providing a therapeutically effective amount of a compound of Formula I, Ia, Ia-1, Ia-2, Ib, Ib-1, Ib-2, II, IIa, III, IIIa, or IV as the only active agent or together with at least one additional active agent to a patient suffering from a neuropsychiatric disorder or dopaminergic system dysfunction, female arousal disorder, hypoactive sexual desire disorder and female orgasmic disorder, male erectile and ejaculatory dysfunctions, pain (including acute, chronic, moderate, severe, inflammatory, neuropathic, nociceptive, etc.), myopia, and diabetes and weight gain induced by antipsychotic therapies. Exemplary disorders that can be treated with the compounds herein include Parkinson's Disease and its locomotor associated disorders, Restless Legs Syndrome, and substance use disorders.

The term "therapeutically effective amount" of a pharmaceutical composition, as used herein, means an amount effective, when administered to a patient, to provide a therapeutic benefit such as an amelioration of symptoms, e.g., to treat a patient suffering from a neuropsychiatric disorder or dopaminergic system dysfunction, female arousal disorder, hypoactive sexual desire disorder and female orgasmic disorder, male erectile and ejaculatory dysfunctions, pain, myopia, and diabetes and weight gain induced by antipsychotic therapies.

The compounds can be administered as the neat chemical, or administered as a pharmaceutical composition. Accordingly, an embodiment provides pharmaceutical compositions comprising a compound or pharmaceutically acceptable salt of Formula I, Ia, Ia-1, Ia-2, Ib, Ib-1, Ib-2, II, IIa, III, IIIa, or IV together with a pharmaceutically acceptable carrier. The pharmaceutical composition may contain a compound or salt of Formula I, Ia, Ia-1, Ia-2, Ib, Ib-1, Ib-2, II, IIa, III, IIIa, or IV as the only active agent, or may contain one or more additional active agents.

The compounds may be administered orally, topically, parenterally, by inhalation or spray, sublingually, transdermally, via buccal administration, rectally, as an ophthalmic solution, or by other means, in dosage unit formulations containing conventional pharmaceutically acceptable carriers. The pharmaceutical composition may be formulated as any pharmaceutically useful form, e.g., as an aerosol, a cream, a gel, a pill, a capsule, a tablet, a syrup, a transdermal patch, or an ophthalmic solution. Some dosage forms, such as tablets and capsules, are subdivided into suitably sized unit doses containing appropriate quantities of the active components, e.g., an effective amount to achieve the desired purpose.

Carriers include excipients and diluents and must be of sufficiently high purity and sufficiently low toxicity to render them suitable for administration to the patient being treated. The carrier can be inert or it can possess pharmaceutical benefits of its own. The amount of carrier employed in conjunction with the compound is sufficient to provide a practical quantity of material for administration per unit dose of the compound.

Classes of carriers include, for example, buffering agents, coloring agents, diluents, disintegrants, emulsifiers, flavorants, glidants, lubricants, preservatives, stabilizers, surfactants, tableting agents, and wetting agents. Some carriers may be listed in more than one class, for example vegetable oil may be used as a lubricant in some formulations and a diluent in others. Exemplary pharmaceutically acceptable carriers include sugars, starches, celluloses, powdered tragacanth, malt, gelatin, talc, and vegetable oils. Optional active agents may be included in a pharmaceutical composition, which do not substantially interfere with the activity of the compound of Formula I, Ia, Ia-1, Ia-2, Ib, Ib-1, Ib-2, II, IIa, III, IIIa, or IV.

The pharmaceutical compositions can be formulated for oral administration. These compositions contain between 0.1 and 99 weight percent ("wt. %") of a compound of Formula I, Ia, Ia-1, Ia-2, Ib, Ib-1, Ib-2, II, IIa, III, IIIa, or IV and usually at least about 5 wt. %. Some embodiments contain from about 25 wt. % to about 50 wt. % or from about 5 wt. % to about 75 wt. % of a compound of Formula I, Ia, Ia-1, Ia-2, Ib, Ib-1, Ib-2, II, IIa, III, IIIa, or IV.

The pharmaceutical composition can be formulated in a package comprising the pharmaceutical composition of Formula I, Ia, Ia-1, Ia-2, Ib, Ib-1, Ib-2, II, IIa, III, IIIa, or IV in a container and further comprising instructions for using the composition in order to treat a patient suffering from a neuropsychiatric disorder or dopaminergic system dysfunction, female arousal disorder, hypoactive sexual desire disorder and female orgasmic disorder, male erectile and ejaculatory dysfunctions, pain, myopia, and diabetes and weight gain induced by antipsychotic therapies.

In an embodiment, a method of treating a neuropsychiatric disorder or dopaminergic system dysfunction, female arousal disorder, hypoactive sexual desire disorder and female orgasmic disorder, male erectile and ejaculatory dysfunctions, pain, myopia, or diabetes and weight gain induced by antipsychotic therapies comprises providing an effective amount of a compound or salt of Formula I, Ia, Ia-1, Ia-2, Ib, Ib-1, Ib-2, II, IIa, III, IIIa, or IV to a patient in need of such treatment. Alternatively, the compound may be provided in the form of a pharmaceutical composition.

The $D_3R$ agonists disclosed herein having high affinity and receptor subtype selectivity find use as primary reference tools for molecular biology, computational chemistry, and in vivo and in vitro pharmacology studies focused on understanding $D_3R$ physiology. In an embodiment, a method comprises using a compound or salt of Formula I, Ia, Ia-1, Ia-2, Ib, Ib-1, Ib-2, II, IIa, III, IIIa, or IV as a molecular tool in research.

This invention is further illustrated by the following examples that should not be construed as limiting.

EXAMPLES

All chemicals and solvents were purchased from chemical suppliers unless otherwise stated, and used without further purification. All melting points were determined on an OptiMelt automated melting point system and are uncorrected. The $^1H$ and $^{13}C$ NMR spectra were recorded on a Varian Mercury Plus 400 instrument. Proton chemical shifts are reported as parts per million ($\delta$ ppm) relative to tetramethylsilane (0.00 ppm) as an internal standard. Coupling constants are measured in Hz. Chemical shifts for $^{13}C$ NMR spectra are reported as parts per million ($\delta$ ppm) relative to deuterated $CHCl_3$ or deuterated MeOH ($CDCl_3$ 77.5 ppm, $CD_3OD$ 49.3 ppm). Chemical shifts, multiplicities and coupling constants (J) have been reported and calculated using Vnmrj Agilent-NMR 400MR or MNova 9.0 software. Gas chromatography-mass spectrometry (GC/MS) data were acquired (where obtainable) using an Agilent Technologies (Santa Clara, CA) 7890B GC equipped with an HP-5MS column (cross-linked 5% PH ME siloxane, 30 m×0.25 mm i.d.×0.25 µm film thickness) and a 5977B mass-selective ion detector in electron-impact mode. Ultrapure grade helium was used as the carrier gas at a flow rate of 1.2 mL/min. The injection port and transfer line temperatures were 250 and 280° C., respectively, and the oven temperature gradient used was as follows: the initial temperature (70° C.) was held for 1 minute (min.) and then increased to 300° C. at 20° C./min. and maintained at 300° C. for 4 min., total run time 16.5 min. Column chromatography was performed using a Teledyne Isco CombiFlash RF flash chromatography system, or a Teledyne Isco EZ-Prep chromatography system. Preparative thin layer chromatography was performed on Analtech silica gel plates (1000 µm). Preparative chiral HPLC was performed using a Teledyne Isco EZ-Prep chromatography system with DAD (Diode Array Detector) and ELS detectors. HPLC analysis was performed using an Agilent 1260 Infinity system coupled with DAD (Diode Array Detector). Separation of the analyte, purity and enantiomeric/diastereomeric excess determinations were achieved at 40° C. using the methods reported in each detailed reaction description. Preparative and analytical HPLC columns were purchased from Daicel corporation or Phenomenex. Microanalyses were performed by Atlantic Microlab, Inc. (Norcross, GA) and agree with ±0.4% of calculated values. HRMS (mass error within 5 ppm) and MS/MS fragmentation analysis were performed on a LTQ-Orbitrap Velos (Thermo-Scientific, San Jose, CA) coupled with an ESI source in positive ion mode to confirm the assigned structures and regiochemistry. Optical rotations were determined using a Jasco DIP-370 polarimeter. Unless otherwise stated, all the compounds were evaluated to be >95% pure on the basis of combustion analysis, NMR, GC-MS, and HPLC-DAD.

Radioligand Binding Studies

Radioligand binding assays with [$^3H$]—(R)-(+)-7-OH-DPAT were conducted similarly to previously described Bonifazi et al. "Novel and Potent Dopamine D2 Receptor Go-Protein Biased Agonists. ACS Pharmacology & Translational Science 2019 and Michino et al. "Toward Understanding the Structural Basis of Partial Agonism at the Dopamine D3 Receptor." *J. Med. Chem.* 2017, 60 (2), 580-593. HEK293 cells stably expressing human $D_{2L}R$ or $D_3R$ or $D_{4.4}$ were grown in a 50:50 mix of DMEM and Ham's F12 culture media, supplemented with 20 mM HEPES, 2 mM L-glutamine, 0.1 mM non-essential amino acids, 1× antibiotic/antimycotic, 10% heat-inactivated fetal bovine serum, and 200 µg/mL hygromycin (Life Technologies, Grand Island, NY) and kept in an incubator at 37° C. and 5% $CO_2$. Upon reaching 80-90% confluence, cells were harvested using pre-mixed Earle's Balanced Salt Solution (EBSS) with 5 mM EDTA (Life Technologies) and centrifuged at 3,000 rpm for 10 min. at 21° C. The supernatant was removed and the pellet was resuspended in 10 mL hypotonic lysis buffer (5 mM $MgCl_2$, 5 mM Tris, pH 7.4 at 4° C.) and centrifuged at 14,500 rpm (~25,000 g) for 30 min at 4° C. The pellet was then resuspended in fresh binding buffer. A Bradford protein assay (Bio-Rad, Hercules, CA) was used to determine the protein concentration. For $[^3H]$—(R)-(+)-7-OH-DPAT binding studies, membranes were harvested fresh; the binding buffer was made from 50 mM Tris, 10 mM $MgCl_2$, 1 mM EDTA, pH 7.4. On test day, each test compound was diluted into half-log serial dilutions using 30% DMSO vehicle. When it was necessary to assist solubilization of the drugs at the highest tested concentration, 0.1% acetic acid (final concentration v/v) was added alongside the vehicle. Membranes were diluted in fresh binding buffer. Radioligand competition experiments were conducted in 96-well plates containing 300 µl fresh binding buffer, 50 µl of diluted test compound, 100 µl of membranes (40-80 µg/well, 20-40 µg/well, and 30-60 µg/well total protein for $hD_{2L}R$, $hD_3R$, and $hD_{4.4}R$ respectively), and 50 µl of radioligand diluted in binding buffer ($[^3H]$—(R)-(+)-7-OH-DPAT: 1.5 nM final concentration for $hD_{2L}$, 0.5 nM final concentration for $hD_3$, and 3 nM final concentration for $hD_{4.4}$ ARC, Saint Louis, MO). Aliquots of $[^3H]$—(R)-(+)-7-OH-DPAT solution were also quantified accurately to determine how much radioactivity was added, taking in account the experimentally determined counter efficiency. Nonspecific binding was determined using 10 µM (+)-butaclamol (Sigma-Aldrich, St. Louis, MO) and total binding was determined with 30% DMSO vehicle. All compound dilutions were tested in duplicate or triplicate and the reaction incubated for 90 min at room temperature. The reaction was terminated by filtration through Perkin Elmer Uni-Filter-96 GF/B, presoaked for 90 min in 0.5% polyethylenimine, using a Brandel 96-Well Plates Harvester Manifold (Brandel Instruments, Gaithersburg, MD). The filters were washed 3 times with 3 mL (3×1 mL/well) of ice-cold binding buffer. 65 µL Perkin Elmer MicroScint 20 Scintillation Cocktail was added to each well and filters were counted using a Perkin Elmer MicroBeta Microplate Counter. $IC_{50}$ values for each compound were determined from dose-response curves and $K_i$ values were calculated using the Cheng-Prusoff equation; $K_d$ values for $[^3H]$—(R)-(+)-7-OH-DPAT were determined via separate homologous competitive binding experiments. When a complete inhibition couldn't be achieved at the highest tested concentrations, $K_i$ values have been extrapolated by constraining the bottom of the dose-response curves (=0% residual specific binding) in the non-linear regression analysis. These analyses were performed using GraphPad Prism version 6.00 for Macintosh (GraphPad Software, San Diego, CA). All the results were rounded to the third significant figure. $K_i$ values were determined from at least 3 independent experiments and are reported as mean±SEM.

Example 1

Bitopic Compounds Comprising the (+)-PD128,907 Scaffold as PP

Scheme 1A. illustrates the chemistry for forming a series of bitopic compounds comprising the (+)-PD128,907 scaffold as PP with various canonical aromatic SPs. As shown in Scheme 1A, a linker is connected at the phenolic oxygen through a standard alkylation with N-(4-bromobutyl)phthalimide in the presence of excess potassium carbonate under reflux. Deprotection of the resulting phthalamide (SLC01-22) yielded primary amine SLC01-23 which was used as a common intermediate to achieve compounds SLC01-24, SLC01-25, SLC01-26, SLC01-35, AB04-41, and AB04-42 via standard N-ethyl-N'-[3-(dimethylamino)propyl]carbodiimide hydrochloride (EDC)-mediated amide coupling. Incorporation of the dihydroquinolin-2(1H)-one motif as SP was achieved via alkylation of the phenol with 7-(4-bromobutoxy)-3,4-dihydroquinolin-2(1H)-one under standard basic conditions with potassium carbonate at reflux (Scheme 1B).

In an alternate approach, the linker could also connect to the (+)-PD128,907 scaffold at the nitrogen position via reductive amination, effectively substituting the propyl side chain with the linker and SP. Aldehyde AB04-72 was thus synthesized from the commercially available dihydroquinolin-2(1H)-one through alkylation of the phenol with (4-bromobutoxy)(tert-butyl)dimethylsilane and potassium carbonate, followed by deprotection of the (tert-butyl)dimethylsilane (TBDMS) group in AB04-68, and Dess-Martin oxidation of the resulting primary alcohol AB04-70 to yield the precursor aldehyde AB04-72 (Scheme 2A). Separately, the propyl side chain at the nitrogen was removed by treating (+)-PD128,907 with cyanogen bromide under exposure to microwave irradiation at elevated temperature and pressure (120° C., 275 psi) to yield AB04-75 (Scheme 2B). Compound SLC02-11 was readily prepared, starting from AB04-75 and AB04-72, via reductive amination with sodium triacetoxyborohydride (STAB) and catalytic acetic acid. Substitution at the N position in SLC02-11 lowered the affinity of the (+)-PD128,907 scaffold (Table 1).

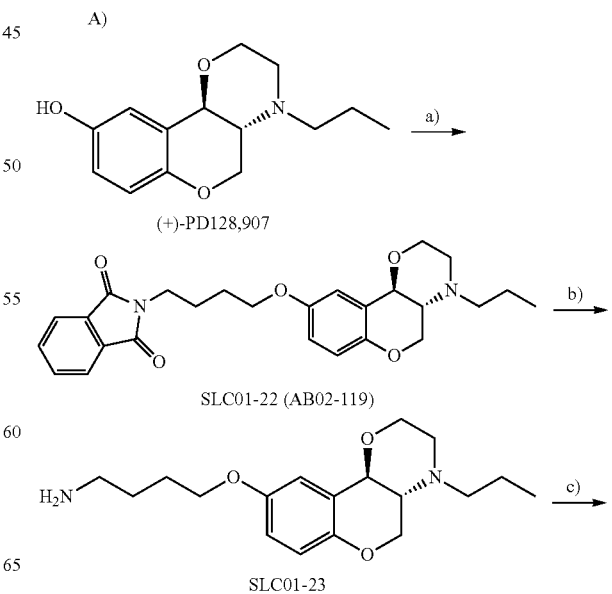

Scheme 1.

-continued

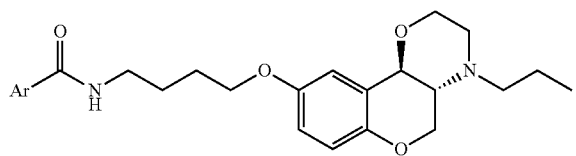

Ar =

SLC01-24

Ar =

SLC01-25

Ar =

SLC01-26

Ar =

SLC01-35

Ar =

AB04-41

Ar =

AB04-42

B)

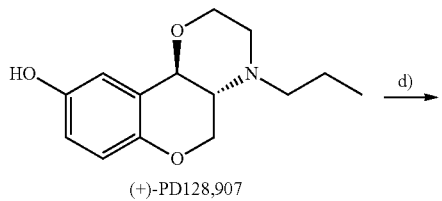

(+)-PD128,907 d)

-continued

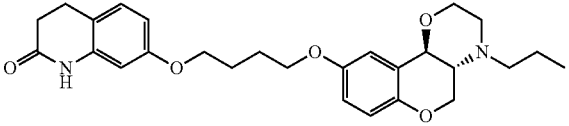

AB04-38 a) N-(4-Bromobutyl)phthalimide, KI, K$_2$CO$_3$, ACN, reflux;
b) NH$_2$NH$_2$, EtOH, reflux;
c) DIPEA, EDC, HOBt, ArCOOH, 0° C. to RT;
d) 7-(4-bromobutoxy)-3,4-dihydroquinolin-2(1H)-one, KI, K$_2$CO$_3$, ACN, reflux.

2-(4-(((4aR,10bR)-4-propyl-3,4,4a,10b-tetrahydro-2H, 5H-chromeno[4,3-b][1,4]oxazin-9-yl)oxy)butyl)isoindoline-1,3-dione (SLC01-22). To a solution of (4aR,10bR)-4-propyl-3,4,4a,10b-tetrahydro-2H,5H-chromeno[4,3-b][1,4]oxazin-9-ol ((+)-PD128,907) (0.50 g, 1.7 mmol) in acetonitrile (AcOH, 10 mL), K$_2$CO$_3$ (4.8 g, 17 mmol) was added followed by 2-(4-bromobutyl)isoindoline-1,3-dione (0.65 g, 8.2 mmol) and KI (5.4 mg, 0.053 mmol). The reaction mixture was stirred under an inert atmosphere at reflux overnight. The reaction mixture was cooled, filtered, and the solvent was removed in vacuo. The crude material was purified via flash column chromatography, eluting with 5% DMA (CH$_2$Cl$_2$:MeOH:NH$_4$OH 95:5:0.5) to afford the product as a white solid, in 58% yield. $^1$H NMR (400 MHz, CDCl$_3$) δ 7.88-7.80 (m, 2H), 7.74-7.67 (m, 2H), 6.91 (s, 1H), 6.74-6.63 (m, 2H), 4.47 (dd, J=10.7, 3.7 Hz, 1H), 4.39 (d, J=9.2 Hz, 1H), 4.11-4.02 (m, 1H), 3.96-3.80 (m, 5H), 3.75 (t, J=6.8 Hz, 2H), 2.89 (d, J=11.5 Hz, 1H), 2.68 (td, J=11.2, 10.4, 6.0 Hz, 1H), 2.57-2.40 (m, 2H), 1.90-1.81 (m, 2H), 1.59-1.54 (m, 3H), 1.48 (dq, J=15.1, 6.9 Hz, 1H), 0.95-0.86 (m, 3H). The free base was converted into the corresponding oxalate salt. CHN Anal (C$_{26}$H$_{30}$N$_2$O$_5$·H$_2$C$_2$O$_4$·0.5H$_2$O) calculated C, 61.19; H, 6.05; N, 5.10. found C, 60.87; H, 5.78; N, 5.00. m.p. 158-159° C.

4-(((4aR,10bR)-4-propyl-3,4,4a,10b-tetrahydro-2H,5H-chromeno[4,3-b][1,4]oxazin-9-yl)oxy)butan-1-amine (SLC01-23). To a solution of SLC01-22 (0.5 mg, 1.1 mmol) in EtOH (50 mL), hydrazine (36 mg, 14 mL, 1.1 mmol) was added under an inert atmosphere and was stirred at reflux overnight. The reaction mixture was cooled to room temperature and the solvent was removed in vacuo. The product was resuspended in DCM and the organic fraction was extracted (3×) with 75 mL portions of aqueous K$_2$CO$_3$, which after drying over anhydrous MgSO$_4$, was concentrated in vacuo to afford the crude product as a white solid, in 89% yield. $^1$H NMR (400 MHz, CDCl$_3$) δ 6.93 (d, J=2.7 Hz, 1H), 6.76-6.65 (m, 2H), 4.48 (dd, J=10.8, 3.7 Hz, 1H), 4.41 (d, J=9.2 Hz, 1H), 4.07 (dd, J=11.4, 3.3 Hz, 1H), 3.99-3.81 (m, 4H), 2.90 (d, J=11.7 Hz, 1H), 2.79-2.70 (m, 2H), 2.67 (dd, J=10.4, 6.2 Hz, 1H), 2.58-2.41 (m, 2H), 2.33-2.21 (m, 1H), 1.78 (p, J=6.6 Hz, 2H), 1.48 (ddd, J=29.8, 16.3, 6.9 Hz, 4H), 0.91 (t, J=7.4 Hz, 3H).

N-(4-(((4aR,10bR)-4-propyl-3,4,4a,10b-tetrahydro-2H, 5H-chromeno[4,3-b][1,4]oxazin-9-yl)oxy)butyl)-9H-fluorene-2-carboxamide (SLC01-24). To a solution of 9H-fluorene-2-carboxylic acid (72 mg, 0.34 mmol) in DCM (10 mL) under an inert atmosphere at 0° C., EDC (76 mg, 0.39 mmol) and 1-hydroxybenzotriazol (HOBt, 53 mg, 0.39 mmol) were added. After 30 minutes of vigorous stirring, SLC01-23 (0.10 g, 0.31 mmol) and DIPEA (0.075 mL, 0.42 mmol) were added to the reaction mixture. The reaction stirred overnight gradually warming to RT. The solvent was evaporated and the compound was purified via flash chromatography, eluting with EtOAc/hexanes (9:1) to give 68 mg product as a tan colored powder, in 43% yield. 1H NMR (400 MHz, CDCl$_3$) δ 7.93 (s, 1H), 7.86-7.71 (m, 3H), 7.57 (d, J=7.3 Hz, 1H), 7.38-7.26 (m, 2H), 6.99 (s, 1H), 6.72 (q, J=9.1 Hz, 2H), 6.38 (s, 1H), 4.48 (dd, J=10.8, 3.6 Hz, 1H), 4.39 (d, J=9.2 Hz, 1H), 4.04-4.00 (m, 3H), 3.88 (m, 4H), 3.56 (q, J=6.4 Hz, 2H), 2.92-2.80 (m, 1H), 2.67 (s, 1H), 2.55-2.38 (m, 2H), 2.27 (d, J=14.2 Hz, 1H), 1.86 (m, 4H), 1.57 (m, 2H), 0.90 (t, J=7.3 Hz, 3H). $^{13}$C NMR (101 MHz, CDCl$_3$) δ 167.73, 153.02, 147.26, 144.69, 144.00, 143.38, 140.70, 133.00, 127.55, 126.93, 125.71, 125.15, 123.71, 122.73, 120.49, 119.65, 116.43, 116.04, 110.48, 75.54, 68.16, 67.24, 66.00, 59.44, 55.57, 51.99, 39.75, 36.86, 26.86, 26.46, 19.07, 11.82. HPLC column Chiralpak AD-H (4.6 mm×250 mm; particle size 5 μm), elution with n-hexane:2-propanol (80:20, flow rate 1 mL/min), total run time 40 min, multiple DAD λ absorbance signals measured in the range of 230-280 nm; RT 17.073 min, purity>99%, de>95% (absorbance at 280 nm). HRMS (ESI) C$_{32}$H$_{36}$O$_4$N$_2$+H$^+$ calculated 513.27478, found 513.27432 (−0.9 ppm). CHN Anal (C$_{32}$H$_{36}$N$_2$O$_4$·0.75H$_2$O) calculated C, 73.05; H, 7.18; N, 5.32. found C, 73.11; H, 7.03; N, 5.17. m.p. 165-166° C.; [α]$_D^{25}$: +38.83 (0.065 g/100 mL in DCM).

N-(4-(((4aR,10bR)-4-propyl-3,4,4a,10b-tetrahydro-2H,5H-chromeno[4,3-b][1,4]oxazin-9-yl)oxy)butyl)-1H-indole-2-carboxamide (SLC01-25). The compound was prepared following the same procedure described for SLC01-24, starting from 1H-indole-2-carboxylic acid (55 mg, 0.34 mmol). The compound was purified via flash chromatography, eluting with EtOAc/hexanes (9:1) to give 0.10 g product as a white solid, in 69% yield. $^1$H NMR (400 MHz, CDCl$_3$) δ 9.11 (s, 1H), 7.62 (d, J=8.1 Hz, 1H), 7.42 (d, J=8.3 Hz, 1H), 7.26 (m, 1H), 7.13 (t, J=7.5 Hz, 1H), 6.95 (s, 1H), 6.79-6.67 (m, 3H), 6.35 (s, 1H), 4.49 (dd, J=10.8, 3.7 Hz, 1H), 4.40 (d, J=9.2 Hz, 1H), 4.15-3.96 (m, 3H), 3.89 (q, J=11.3, 10.9 Hz, 2H), 3.61-3.52 (m, 2H), 2.89 (d, J=11.7 Hz, 1H), 2.67 (d, J=15.1 Hz, 1H), 2.58-2.41 (m, 2H), 2.27 (s, 1H), 1.90-1.80 (m, 3H), 0.91 (t, J=7.3 Hz, 3H). $^{13}$C NMR (101 MHz, CDCl$_3$) δ 161.45, 152.97, 147.33, 136.03, 130.79, 127.71, 124.41, 122.75, 121.90, 120.61, 116.46, 116.07, 111.79, 110.44, 101.64, 75.55, 68.08, 67.25, 66.02, 59.43, 55.60, 52.01, 39.30, 26.75, 26.55, 19.07, 11.82. HPLC column Chiralpak AD-H (4.6 mm×250 mm; particle size 5 μm), elution with n-hexane:2-propanol (80:20, flow rate 1 mL/min), total run time 40 min, multiple DAD λ absorbance signals measured in the range of 230-280 nm; RT 29.973 min, purity>95%, de>90% (absorbance at 230 nm). HRMS (ESI) C$_{27}$H$_{33}$O$_4$N$_3$+H$^+$ calculated 464.25438, found 464.25347 (−1.9 ppm). CHN Anal (C$_{27}$H$_{33}$N$_3$O$_4$·0.25H$_2$O) calculated C, 69.28; H, 7.21; N, 8.98. found C, 69.40; H, 7.33; N, 9.07. m.p. 143-144° C.; [α]$_D^{24}$: +35.4 (0.130 g/100 mL in DCM).

N-(4-(((4aR,10bR)-4-propyl-3,4,4a,10b-tetrahydro-2H,5H-chromeno[4,3-b][1,4]oxazin-9-yl)oxy)butyl)benzofuran-2-carboxamide (SLC01-26). The compound was prepared following the same procedure described for SLC01-24 starting from benzofuran-2-carboxylic acid (55 mg, 0.34 mmol). The compound was purified via flash chromatography, eluting with EtOAc/hexanes (9:1) to give a 0.13 g of the product as a yellow oil, in 86% yield. $^1$H NMR (400 MHz, CDCl$_3$) δ 7.66 (d, J=7.8 Hz, 1H), 7.49-7.35 (m, 3H), 7.33-7.23 (m, 1H), 6.95 (s, 1H), 6.82 (s, 1H), 6.79-6.66 (m, 2H), 4.48 (dd, J=11.0, 3.7 Hz, 1H), 4.39 (d, J=9.2 Hz, 1H), 4.15-4.02 (m, 2H), 4.01-3.91 (m, 2H), 3.91-3.81 (m, 2H), 3.56 (q, J=6.2 Hz, 2H), 2.89 (d, J=11.6 Hz, 1H), 2.68 (dd, J=17.8, 10.9 Hz, 1H), 2.57-2.41 (m, 2H), 1.85 (s, 2H), 1.56 (s, 3H), 1.47 (s, 1H), 1.26 (t, J=7.1 Hz, 1H), 0.91 (t, J=7.3 Hz, 3H). $^{13}$C NMR (101 MHz, CDCl$_3$) δ 158.87, 154.67, 153.08, 148.85, 147.24, 127.65, 126.69, 123.59, 122.68, 122.64, 116.40, 116.03, 111.71, 110.36, 110.16, 75.57, 68.02, 67.26, 66.01, 59.43, 55.61, 52.02, 38.97, 26.78, 26.45, 19.07, 11.84. HPLC column Chiralpak AD-H (4.6 mm×250 mm; particle size 5 μm), elution with n-hexane:2-propanol (80:20, flow rate 1 mL/min), total run time 40 min, multiple DAD λ absorbance signals measured in the range of 230-280 nm; RT 17.984 min, purity>99%, de>95% (absorbance at 273 nm). HRMS (ESI) C$_{27}$H$_{32}$O$_5$N$_2$+H$^+$ calculated 465.23840, found 465.23812 (−0.6 ppm). CHN Anal (C$_{27}$H$_{32}$N$_2$O$_5$) calculated C, 69.81; H, 6.94; N, 6.03. found C, 70.09; H, 7.12; N, 6.01. [α]$_D^{24}$: +45.3 (0.225 g/100 mL in DCM).

N-(4-(((4aR,10bR)-4-propyl-3,4,4a,10b-tetrahydro-2H,5H-chromeno[4,3-b][1,4]oxazin-9-yl)oxy)butyl)benzo[d]thiazole-2-carboxamide (SLC01-35). The compound was prepared following the same procedure described for SLC01-24 starting from benzo(d)thiazole-2-carboxylic (43 mg, 0.24 mmol). The compound was purified via flash chromatography, eluting with EtOAc/hexanes (9:1) to give 83 mg of the product as a clear wax, in 79% yield. $^1$H NMR (400 MHz, CDCl$_3$) δ 7.93 (dt, J=26.8, 8.1 Hz, 2H), 7.45 (dt, J=23.7, 7.4 Hz, 2H), 6.86 (d, J=2.9 Hz, 1H), 6.71-6.57 (m, 2H), 4.45-4.29 (m, 2H), 4.03-3.72 (m, 5H), 3.48 (s, 2H), 3.35-3.26 (m, 1H), 2.83 (d, J=11.7 Hz, 1H), 2.70-2.55 (m, 1H), 2.42 (dtd, J=24.0, 11.9, 10.8, 3.6 Hz, 2H), 2.26-2.16 (m, 1H), 1.84 (m, 3H), 1.50 (dt, J=11.3, 6.2 Hz, 1H), 1.44-1.33 (m, 1H), 0.83 (t, J=7.3 Hz, 3H). $^{13}$C NMR (101 MHz, CDCl$_3$) δ 164.06, 159.89, 153.11, 152.88, 147.21, 137.11, 126.70, 126.57, 124.24, 122.64, 122.36, 116.37, 116.08, 110.32, 75.59, 67.92, 67.26, 66.01, 59.45, 55.61, 52.04, 39.48, 26.74, 26.35, 19.09, 11.83. HPLC column Chiralpak AD-H (4.6 mm×250 mm; particle size 5 μm), elution with n-hexane:2-propanol (80:20+0.1% DEA, flow rate 1 mL/min), total run time 40 min, multiple DAD λ absorbance signals measured in the range of 210-280 nm; RT 16.477 min, purity>99%, de>95% (absorbance at 280 nm). HRMS (ESI) C$_{26}$H$_{31}$O$_4$N$_3$S+H$^+$ calculated 482.21080, found 482.21006 (−1.5 ppm). CHN Anal (C$_{26}$H$_{31}$N$_3$O$_4$S) calculated C, 64.84; H, 6.49; N, 8.73. found C, 64.64; H, 6.51; N, 8.44. [α]$_D^{24}$: +37.3 (0.215 g/100 mL in DCM).

N-(4-(((4aR,10bR)-4-propyl-3,4,4a,10b-tetrahydro-2H,5H-chromeno[4,3-b][1,4]oxazin-9-yl)oxy)butyl)benzo[d]thiazole-5-carboxamide (AB04-41) The compound was prepared following the same procedure described for SLC01-24 starting from benzo[d]thiazole-5-carboxylic acid (84 mg, 0.47 mmol). The compound was purified via flash chromatography, eluting with EtOAc/hexanes (9:1) to give 100 mg of the product as a clear viscous oil, in 44% yield. $^1$H NMR (400 MHz, CDCl$_3$) δ 9.06 (d, J=1.4 Hz, 1H), 8.47 (s, 1H), 8.00 (d, J=8.4 Hz, 1H), 7.88 (dd, J=8.7, 1.8 Hz, 1H), 6.98-6.90 (m, 1H), 6.70 (q, J=8.8 Hz, 2H), 6.46 (s, 1H), 4.52-4.43 (m, 1H), 4.39 (d, J=9.2 Hz, 1H), 4.09-3.95 (m, 2H), 3.94-3.8 (m, 2H), 3.58 (q, J=6.3 Hz, 2H), 2.89 (d, J=11.7 Hz, 1H), 2.68 (td, J=11.1, 6.1 Hz, 1H), 2.55-2.39 (m, 2H), 2.31-2.20 (m, 1H), 1.85 (d, J=9.4 Hz, 4H), 1.66 (s, 1H), 1.60-1.39 (m, 2H), 0.91 (t, 3H); $^{13}$C NMR (101 MHz, CDCl$_3$) δ 167.16, 155.34, 153.31, 153.16, 147.44, 136.85, 133.52, 124.51, 122.87, 122.25, 122.01, 116.60, 116.24, 110.55, 75.74, 67.44, 66.18, 59.60, 55.78, 52.20, 40.05, 26.95, 26.63, 19.26, 12.01. HPLC column Chiralpak AD-H (4.6 mm×250 mm; particle size 5 μm), elution with n-hexane:2-propanol (80:20+0.1% DEA, flow rate 1 mL/min), total run time 40 min, multiple DAD λ absorbance signals measured in the range of 230-280 nm; RT 25.177 min, purity>95%, de>90% (absorbance at 230 nm). HRMS (ESI) $C_{26}H_{31}O_4N_3S+H^+$ calculated 482.21080, found 482.20892 (−3.9 ppm). CHN Anal ($C_{26}H_{31}N_3O_4S$) calculated C, 64.84; H, 6.49; N, 8.73. found C, 64.93; H, 6.77; N, 8.46. $[\alpha]_D^{26}$: ++41.7 (0.255 g/100 mL in DCM).

N-(4-(((4aR,10bR)-4-propyl-3,4,4a,10b-tetrahydro-2H,5H-chromeno[4,3-b][1,4]oxazin-9-yl)oxy)butyl)-1H-pyrrolo[2,3-b]pyridine-2-carboxamide (AB04-42) The compound was prepared following the same procedure described for SLC01-24 starting from 1H-pyrrolo[2,3-b]pyridine-2-carboxylic acid (77 mg, 0.47 mmol). The compound was purified via flash chromatography, eluting with 2% DMA ($CH_2Cl_2$:MeOH 98:2+0.1% $NH_4OH$) to give 90 mg of the product as a clear viscous oil, in 41% yield. $^1$H NMR (400 MHz, $CDCl_3$) δ 8.38 (d, J=4.8 Hz, 1H) 7.95 (dd, J=8.0, 1.5 Hz, 1H), 7.16-7.02 (m, 2H), 6.91 (d, J=2.8 Hz, 1H), 6.83 (d, J=0.9 Hz, 1H), 6.75-6.60 (m, 2H), 4.46 (dd, J=10.8, 3.7 Hz, 1H), 4.38 (d, J=9.2 Hz, 1H), 4.03 (dd, J=11.5, 3.5 Hz, 1H), 3.98-3.78 (m, 4H), 3.51 (q, J=6.2 Hz, 2H), 2.88 (d, J=11.7 Hz, 1H), 2.76-2.57 (m, 1H), 2.53-2.40 (m, 3H), 2.30-2.18 (m, 1H), 1.80 (dt, J=12.8, 6.4 Hz, 4H), 1.61-1.36 (m, 2H), 0.88 (t, J=7.3 Hz, 3H); $^{13}$C NMR (101 MHz, $CDCl_3$) δ 161.43, 161.35, 153.09, 147.92, 147.40, 145.65, 131.62, 130.85, 122.71, 120.41, 110.64, 101.61, 75.58, 68.31, 67.27, 65.96, 59.56, 55.72, 52.08, 39.45, 26.86, 26.37, 19.03, 11.90. HPLC column Chiralpak AD-H (4.6 mm×250 mm; particle size 5 μm), elution with n-hexane:2-propanol (80:20+0.1% DEA, flow rate 1 mL/min), total run time 40 min, multiple DAD λ absorbance signals measured in the range of 230-280 nm; RT 35.552 min, purity>95%, de>90% (absorbance at 230 nm). HRMS (ESI) $C_{26}H_{32}O_4N_4+H^+$ calculated 465.24963, found 465.24713 (−5.2 ppm). CHN Anal ($C_{26}H_{32}N_4O_4$) calculated C, 67.22; H, 6.94; N, 12.06. found C, 67.39; H, 7.10; N, 11.89. $[\alpha]^{26}$: +38.2 (0.211 g/100 mL in DCM).

7-(4-(((4aR,10bR)-4-propyl-3,4,4a,10b-tetrahydro-2H,5H-chromeno[4,3-b][1,4]oxazin-9-yl)oxy)butoxy)-3,4-dihydroquinolin-2(1H)-one (AB04-38) The compound was prepared following the same procedure described for SLC01-22, starting from (+)-PD128,907 (0.150 g, 0.5 mmol) and 7-(4-bromobutoxy)-3,4-dihydroquinolin-2(1H)-one (0.158 g, 0.5 mmol). The compound was purified by flash chromatography, eluting with 5% DMA ($CH_2Cl_2$:MeOH 98:2+0.1% $NH_4OH$) to give 100 mg of the product as a clear viscous oil, in 43% yield. $^1$H NMR (400 MHz, $CDCl_3$) δ 7.59 (s, 1H), 7.04 (d, J=8.3 Hz, 1H), 6.94 (s, 1H), 6.77-6.65 (m, 2H) 6.52 (d, J=8.3 Hz, 1H), 6.28 (s, 1H), 4.48 (d J=10.6 Hz, 1H), 4.41 (d, J=9.2 Hz, 1H), 4.08 (d, J=11.4 Hz, 1H), 4.02-3.75 (m, 6H), 2.89 (t, J=7.9 Hz, 3H), 2.73-2.64 (m, 1H), 2.61 (t, J=7.5 Hz, 2H), 2.57-2.44 (m, 2H), 2.33-2.22 (m, 1H), 1.99-1.86 (m, 4H), 1.53-1.46 (m, 2H), 0.91 (t, J=7.3 Hz, 3H); $^{13}$C NMR (101 MHz, $CDCl_3$) δ 171.42, 158.79, 153.38, 147.36, 138.20, 128.86, 122.82, 116.56, 116.20, 115.93, 110.50, 108.84, 102.32, 75.84, 68.17, 67.94, 67.50, 66.19, 59.64, 55.79, 52.21, 31.29, 26.19, 26.13, 24.79, 19.27, 12.01. HPLC column Chiralpak AD-H (4.6 mm×250 mm; particle size 5 μm), elution with n-hexane:2-propanol (80:20+0.1% DEA, flow rate 1 mL/min), total run time 40 min, multiple DAD λ absorbance signals measured in the range of 210-280 nm; RT 24.783 min, purity>95%, de>90% (absorbance at 214 nm). HRMS (ESI) $C_{27}H_{34}O_5N_2+H^+$ found 467.25295 (−2.3 ppm). CHN Anal ($C_{27}H_{34}N_2O_5$) calculated C, 69.51; H, 7.35; N, 6.00. found C, 69.77; H, 7.55; N, 5.84. $[\alpha]_D^{26}$: +25.5 (0.335 g/100 mL in DCM).

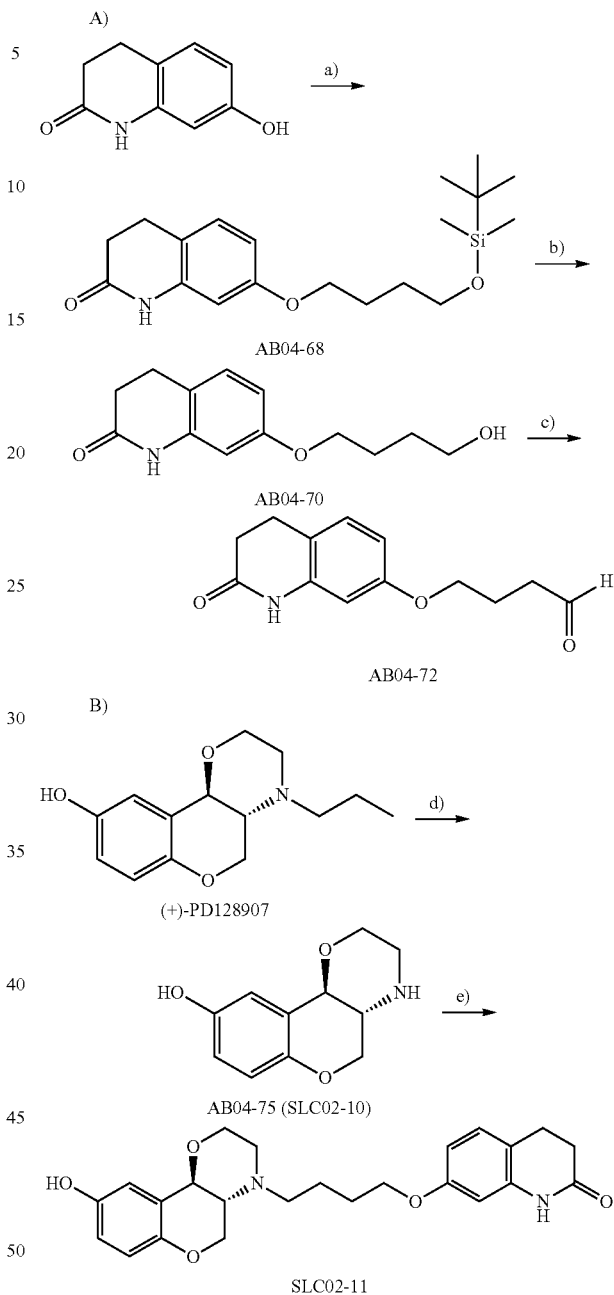

Scheme 2.

a) (4-bromobutoxy)(tert-butyl)dimethylsilane, KI, $K_2CO_3$, ACN, reflux;
b) 1M TBAF, THF, RT;
c) Dess-Martin periodinane (DMP), DCM, 0° C. to RT;
d) i) BrCN, $K_2CO_3$, acetonitrile, microwave 120° C., 275 psi, 75W; ii) 37% HCl/$H_2O$
e) cat. AcOH, Na(OAc)$_3$BH, AB04-72.

7-(4-((tert-butyldimethylsilyl)oxy)butoxy)-3,4-dihydroquinolin-2(1H)-one (AB04-68) To a stirring solution of 7-hydroxy-3,4-dihydroquinolin-2(1H)-one (0.5 g, 3.1 mmol) and $K_2CO_3$ (10 eq.) in ethanol (20 mL), (4-bromobutoxy)(tert-butyl)dimethylsilane (0.82 g, 3.1 mmol) was added portion-wise, and the mixture stirred at reflux overnight. The solvent was evaporated, the residue dissolved with DCM, and washed with water and brine. The organic phase was dried over $MgSO_4$, filtered, and evaporated in vacuo to afford the crude product. The compound was purified via flash chromatography, eluting with EtOAc/hexanes (5:5) to give 0.91 g of product as colorless viscous oil, in 84% yield. $^1$H NMR (400 MHz, CDCl$_3$) δ 7.75 (s, 1H), 7.04 (d, J=8.3 Hz, 1H) 6.52 (d, J=8.1 Hz, 1H), 6.29 (d, J=3.3 Hz, 1H), 3.67 (br s, 2H), 2.89 (br s, 2H), 2.61 (br s, 2H), 1.82 (br s, 2H), 1.67 (br s, 2H), 0.90 (q, J=2.2 Hz, 9H), 0.05 (q, J=2.2 Hz, 6H).

7-(4-hydroxybutoxy)-3,4-dihydroquinolin-2(1H)-one (AB04-70) A solution of AB04-68 (0.91 g, 2.6 mmol) and 1M TBAF (2 eq.) in THF (30 mL) was stirred at room temperature for 4 hours. The reaction mixture was washed with water, dried over MgSO$_4$, filtered, and evaporated in vacuo to afford 0.5 g of the desired product as colorless viscous oil, in 82% yield. $^1$H NMR (400 MHz, CDCl$_3$) δ 7.04 (d, J=8.2 Hz, 1H), 6.53 (dd, J=8.3, 2.5 Hz, 1H), 6.36 (d, J=2.4 Hz, 1H), 3.98 (t, J=6.2 Hz, 2H), 3.69 (t, J=6.4 Hz, 2H), 2.88 (dd, J=8.5, 6.5 Hz, 2H), 2.64-2.56 (m, 2H), 2.33 (br s, 1H), 1.87 (tt, J=8.2, 5.9 Hz, 2H), 1.78-1.68 (m, 2H).

4-((2-oxo-1,2,3,4-tetrahydroquinolin-7-yl)oxy)butanal (AB04-72) To solution of AB04-70 (0.5 g, 2.1 mmol) in DCM (10 mL) at 0° C., Dess-Martin periodinane (1 g, 2.4 mmol) was added portion-wise. The reaction mixture was stirred at 0° C. for 1 hour, then cooled to room temperature and washed with 2N NaHCO$_3$ water solution. The organic phase was dried over MgSO$_4$, filtered, and evaporated in vacuo to afford the crude product. The compound was purified via flash chromatography, eluting with EtOAc/hexanes (3:7) to give 0.27 g of product as colorless viscous oil, in 55% yield. $^1$H NMR (400 MHz, CDCl$_3$) δ 9.84 (s, 1H), 8.02 (br s, 1H), 7.04 (d, J=8.3 Hz, 1H), 6.50 (dd, J=8.3, 2.4 Hz, 1H), 6.30 (d, J=2.5 Hz, 1H), 3.97 (t, J=6.0 Hz, 2H), 2.89 (dd, J=8.4, 6.6 Hz, 2H), 2.70-2.57 (m, 4H), 2.16-2.05 (m, 2H).

(4aR,10bR)-3,4,4a,10b-tetrahydro-2H,5H-chromeno[4,3-b][1,4]oxazin-9-ol (SLC 02-10). To a stirred solution of (+)-PD-128907 (0.23 g, 0.92 mmol) in 1M BrCN (0.29 g, 2.8 mmol) in acetonitrile, K$_2$CO$_3$ (0.38 g, 2.8 mmol) was added. The solution was stirred for 40 minutes in a microwave at 120° C., 275 psi, 75 W. The reaction was analyzed with gas chromatography to confirm the intermediate cyanate was formed. The reaction mixture was filtered and concentrated in vacuo. A solution of 5 mL of concentrated HCl in 5 mL of H$_2$O was made and added to the dry crude material. The reaction solution was stirred at reflux overnight. The reaction solution was concentrated in vacuo. A solution of ammonia in methanol was added until a pH of 8 was reached. The solution mixture was concentrated in vacuo and was purified via flash column chromatography, eluting with 5% DMA (CH$_2$Cl$_2$:MeOH:NH$_4$OH 95:5:0.5) to afford 60 mg of the product as a tan viscous oil in 31% yield. $^1$H NMR (400 MHz, CDCl$_3$) δ 6.85 (d, J=1.2 Hz, 1H), 6.67 (d, J=1.5 Hz, 2H), 4.32 (d, J=9.2 Hz, 1H), 4.16-4.03 (m, 2H), 3.99-3.82 (m, 2H), 3.20-2.97 (m, 3H); $^{13}$C NMR (101 MHz, CDCl$_3$) δ 149.69, 147.61, 122.92, 116.98, 116.10, 111.71, 76.40, 68.10, 67.97, 54.39, 46.30. HPLC column Chiralpak AD-H (4.6 mm×250 mm; particle size 5 μm), elution with n-hexane:2-propanol (80:20 flow rate 1 mL/min), total run time 70 min, multiple DAD λ absorbance signals measured in the range of 230-280 nm; RT 40.879 min, purity>95%, de>90% (absorbance at 230 nm). GC/MS (EI) RT 10.360 min, 207.1 m/z.

7-(4-((4aR,10bR)-9-hydroxy-2,3,4a,10b-tetrahydro-4H,5H-chromeno[4,3-b][1,4]oxazin-4-yl)butoxy)-3,4-dihydroquinolin-2(1H)-one (SLC 02-11). To a stirred solution of (4aR,10bR)-3,4,4a,10b-tetrahydro-2H,5H-chromeno[4,3-b][1,4]oxazin-9-ol (SLC 02-10) (0.060 g, 0.29 mmol) in 1-2 dichloroethane (10 mL) was added N-(4-oxobutyl)-1H-indole-2-carboxamide (0.068 g, 0.29 mmol) and catalytic amounts of AcOH. Na(OAc)$_3$BH (0.093 g, 0.44 mmol) was added after solution stirred for 1 hour. Solution was left at room temperature and allowed to stir overnight. The solution mixture was concentrated in vacuo and was purified twice via flash column chromatography, eluting with 10% DMA (CH$_2$Cl$_2$:MeOH:NH$_4$OH 95:5:0.5) and EtOAc/hexanes (6:4), respectively. The partially purified product was purified again with a preparative TLC eluting with 5% DMA (CH$_2$Cl$_2$:MeOH:NH$_4$OH 95:5:0.5) to afford 10 mg of the product as a white solid in 8.1% yield, after all the combined purification steps. $^1$H NMR (400 MHz, CDCl$_3$+CD$_3$OD) δ 7.04 (d, J=8.3 Hz, 1H), 6.83 (d, J=2.7 Hz, 1H), 6.69-6.60 (m, 2H), 6.52 (dd, J=8.3, 2.5 Hz, 1H), 6.34 (d, J 2.4 Hz, 1H), 4.47 (dd, J=10.7, 3.6 Hz, 1H), 4.40 (d, J 9.2 Hz, 1H), 4.08-4.03 (m, 1H), 3.95 (t, J=6.0 Hz, 2H), 3.91-3.81 (m, 2H), 2.95-2.85 (m, 3H), 2.85-2.76 (m, 1H), 2.64-2.42 (m, 5H), 1.86-1.61 (m, 4H); $^{13}$C NMR (101 MHz, CDCl$_3$+CD$_3$OD) δ 172.19, 158.61, 150.57, 146.59, 138.09, 128.76, 122.57, 116.49, 116.11, 115.93, 111.63, 108.89, 102.30, 75.7 m7, 67.89, 67.29, 65.85, 59.71, 53.34, 52.08, 31.06, 27.20, 24.58, 22.66; HPLC column Chiralpak AD-H (4.6 mm×250 mm; particle size 5 μm), elution with n-hexane:2-propanol (80:20 flow rate 1 mL/min), total run time 70 min, multiple DAD λ absorbance signals measured in the range of 210-280 nm; RT 27.262 min, purity>99%, de>95% (absorbance at 214 nm). HRMS (ESI) C$_{24}$H$_{28}$O$_5$N$_2$+H$^+$ calculated 425.20710, found 425.20788 (1.8 ppm). m.p. 185-186° C.; $[α]_D^{25}$: +43.3 (0.060 g/100 mL in MeOH).

Structurally simplified analogues of (+)-PD128,907, were prepared where the morpholine ring was removed while retaining the oxygen and nitrogen heteroatoms in the same position to preserve their H-bond accepting activity (Scheme 3). Intermediate SLC02-05 was synthesized via a Neber rearrangement from the commercially available 6-methoxy-4-chromanone as reported in the literature. Subsequent HBr assisted O-demethylation of SLC02-05 afforded SLC02-14, which was used to form compound SLC02-16 via reductive amination with N-(4-oxobutyl)-1H-indole-2-carboxamide. The enantiomers of the resulting analogue (enantiomeric separation achieved via preparative chiral HPLC) exhibited lessened affinity in radioligand binding studies relative to the parent compound ((+)-PD128,907).

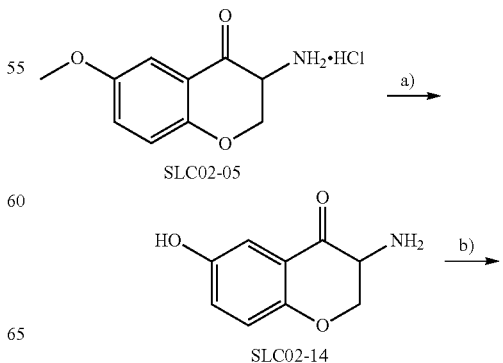

Scheme 3.

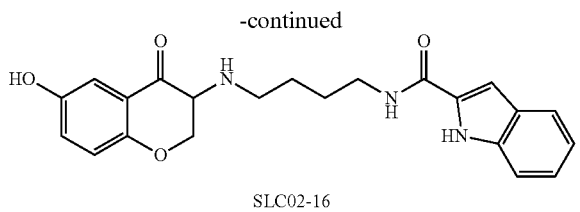

SLC02-16 a) 48% HBr in water, reflux;
e) AcOH, Na(OAc)₃BH, N-(4-oxobutyl)-1H-indole-2-carboxamide, DCE, RT.

3-amino-6-hydroxychroman-4-one (SLC 02-14). 3-amino-6-methoxychroman-4-one hydrochloride (SLC 02-05) (0.94 g, 4.1 mmol) was dissolved in 48% hydrobromic acid (23 mL) and stirred at 120° C. for 8 hours and 60° C. overnight. The reaction mixture was cooled to room temperature and neutralized with 7N ammonia solution in methanol until a pH of 8 was reached. The solution mixture was concentrated in vacuo and filtered on a silica plug, washing with EtOAc/hexanes (9:1) to give 0.27 g of product as a yellow viscous oil, in 37% yield, which was used in the next step without further purification. GC/MS (EI) RT 9.203 min, 179.0 m/z.

N-(4-((6-hydroxy-4-oxochroman-3-yl)amino)butyl)-1H-indole-2-carboxamide (SLC 02-16). To a stirred solution of 3-amino-6-hydroxychroman-4-one (SLC 02-14) (0.12 g, 0.70 mmol) in 1-2 dichloroethane (10 mL) was added N-(4-oxobutyl)-1H-indole-2-carboxamide (0.15 g, 0.70 mmol) and catalytic amounts of AcOH. Na(OAc)₃BH (0.21 g, 1.0 mmol) was added after solution stirred for 1 hour. Solution was left at room temperature and allowed to stir overnight. The solution mixture was concentrated in vacuo and was purified via flash column chromatography, eluting with EtOAc/hexanes (7:3). HRMS (ESI) $C_{22}H_{23}O_4N_3+H^+$ calculated 394.17613, found 394.17640 (0.6 ppm). The racemic mixture was purified via preparative chiral HPLC (Chiralpak AD-H 21 mm×250 mm; 5 µm), eluting with n-hexane:2-propanol (70:30, flow rate 20 mL/min) to yield two different fractions (6 mg and 4 mg of yellow solid, respectively), enriched of the corresponding enantiomers. SLC02-16A: ¹H NMR (400 MHz, CDCl₃+CD₃CN) δ 9.27 (s, 1H), 7.58 (d, J=8.0 Hz, 1H), 7.39 (d, J 8.3 Hz, 1H), 7.24-7.19 (m, 2H), 7.07 (t, J 7.5 Hz, 1H), 6.98 (dd, J=8.9, 3.1 Hz, 1H), 6.85-6.77 (m, 2H), 6.71 (s, 1H), 4.45 (dd, J=11.1, 5.3 Hz, 1H), 4.04 (t, J 11.4 Hz, 1H), 3.57 (dd, J=11.7, 5.3 Hz, 1H), 3.44 (q, J 6.5 Hz, 2H), 2.73 (ddt, J=23.7, 11.7, 5.8 Hz, 2H), 1.63 (dq, J=28.0, 7.3 Hz, 4H); ¹³C NMR (101 MHz, CDCl₃+CD₃CN) δ 161.59, 155.67, 152.87, 150.95, 136.10, 131.02, 127.68, 124.72, 124.21, 121.85, 120.45, 119.44, 118.74, 111.85, 111.22, 102.05, 70.80, 60.62, 47.94, 39.30, 27.45, 27.23, 27.17, 26.29. SLC02-16B: ¹H NMR (400 MHz, CDCl₃+CD₃CN) δ 9.29 (s, 1H), 7.59 (d, J=8.1 Hz, 1H), 7.40 (d, J=8.3 Hz, 1H), 7.27-7.21 (m, 1H), 7.09 (t, J=7.5 Hz, 1H), 7.00 (dd, J=8.9, 3.1 Hz, 1H), 6.84-6.79 (m, 2H), 6.67 (s, 1H), 4.47 (dd, J=11.1, 5.3 Hz, 1H), 4.06 (t, J=11.4 Hz, 1H), 3.58 (dd, J=11.7, 5.3 Hz, 1H), 3.47 (q, J=6.5 Hz, 2H) 2.84-2.61 (m, 2H), 1.66 (dp, J=29.1, 7.2 Hz, 4H); ¹³C NMR (101 MHz, CDCl₃+CD₃CN) δ 192.85, 161.72, 155.81, 150.93, 136.19, 130.98, 127.74, 124.84, 124.37, 121.93, 120.58, 119.92, 119.56, 118.87, 111.34, 107.91, 102.14, 70.87, 60.71, 48.02, 39.43, 27.52, 27.26. Analytical HPLC column Chiralpak AD-H (4.6 mm×250 mm; particle size 5 µm), elution with n-hexane:2-propanol (70:30 flow rate 1 mL/min), total run time 90 min, multiple DAD λ absorbance signals measured in the range of 210-280 nm; enantiomer SLC02-16A: RT 48.546 min, purity>90%, er 70:30 (absorbance at 214 nm); enantiomer SLC02-16B: RT 54.171 min, purity>90%, er 90:10 (absorbance at 214 nm). [α] values for compounds SLC02-16A and SLC02-16B were not determined.

Bitopic Compounds Comprising the PF-592,379 Scaffold as PP

The PF-592,379 scaffold as PP began by examining substitution at the anilinic nitrogen (Scheme 4A) where the aniline was dialkylated using propionaldehyde at reflux. Substitution at the anilinic nitrogen showed a detrimental effect on the binding profile of the PF-592,379 pharmacophore (Table 2) and research was redirected to the morpholine nitrogen for further manipulations (Scheme 4B). Starting from the NOR-PF-592,379 mixture of diastereomers, achieved in a 3:1 mixture of (R,S):(S,S) by reported synthetic methods, AB04-35 was synthesized via traditional alkylation with 7-(4-bromobutoxy)-3,4-dihydroquinolin-2 (1H)-one and potassium carbonate at reflux. Encouraged by the affinity shown by AB04-35, the two diastereomers of NOR-PF-592,379, AB04-85A and AB04-85B, were separated via flash chromatography and used independently thereafter. Their diastereomeric purity was assessed via chiral analytical HPLC and their absolute stereochemistry was confirmed via X-ray crystallography of AB04-85A, and by comparison with the previously reported spectroscopic data. Starting from the two pure diastereomers, their respective bitopic compounds were synthesized in parallel. Compounds AB04-95 and AB04-96 were synthesized from their respective NOR-PF-592,379 diastereomer via alkylation, similarly to AB04-35. Compounds AB04-87 and AB04-88 were constructed via reductive amination with N-(4-oxobutyl)-1H-indole-2-carboxamide.

Having confirmed the privileged stereochemistry of the morpholine ring (Table 2) with the compounds in Scheme 4, the effect of structural changes on the linker was examined next. Initial efforts were aimed at synthesizing compounds FOB01-42 and FOB01-44, the unsaturated analogues of AB04-95 and AB04-96, respectively. As shown in Scheme 5, allyl bromide was dimerized via cross olefin metathesis using Hoveyda-Grubbs catalyst $2^{nd}$ generation to form (E)-1,4-dibromobut-2-ene, FOB01-39, in 9:1 (E:Z) ratio. Alkylation of 3,4-dihydroquinolin-2(1H)-one at the phenolic oxygen was accomplished with slight excess of dibromobutene under gentle reflux conditions with potassium carbonate to yield FOB01-41. Lastly, FOB01-42 and FOB01-44 were achieved from alkylation of AB04-85A and AB04-85B with FOB01-41, respectively. The E stereochemistry about the olefin in the linker was further confirmed through nuclear Overhauser effect (n.O.e.) analysis.

The effect of adding a cyclopropyl ring to the linker was also explored. As reported in Scheme 6, first a 4 carbon-long linker with a cyclopropyl ring separated by one methylene unit from both pharmacophores was constructed. Starting from the mixture of isomers of the ethyl 2-cyanocyclopropanecarboxylate, reduction with lithium aluminum hydride afforded amino alcohol FOB01-55, which was then subjected to EDC-mediated amide coupling with indole-2 carboxylic acid, yielded FOB01-56, establishing the SP in the desired position and preparing the alcohol necessary for the aldehyde intermediate. Previous efforts at accessing the separate cis and trans indole-cyclopropyl-alcohol intermediate in FOB01-56 have relied on distillation of the ethyl 2-cyanocyclopropanecarboxylate starting material to separate the cis and trans cyclopropyl moieties, however it was observed that the cis and trans FOB01-56 are readily separable by standard flash chromatography, allowing the use of the racemic ethyl 2-cyanocyclopropanecarboxylate starting material and circumventing less efficient distillation procedures. Having separated cis and trans cyclopropyl intermediates, the desired aldehyde was prepared by Dess-Martin oxidation of the alcohol to achieve the exclusively trans-FOB01-58 and cis-FOB01-57 aldehydes. Reductive amination of the cis and trans aldehydes with AB04-85A and AB04-85B yielded four sets of diastereomers: AB05-26, AB05-27, FOB01-59, and FOB01-60. Compounds AB05-26 and FOB01-60 have a fixed (2R,5S) stereochemistry at the morpholine ring, and both consist of two sets of enantiomers at the cyclopropyl ring: AB05-26 the two trans-cyclopropyl enantiomers, FOB01-60 the two cis-cyclopropyl enantiomers. The same is true for compounds AB05-27 and FOB01-59, however the morpholine ring in these is fixed with the (2S,5S) stereochemistry. To extend the study of the effect of the structural configuration of the linker on the affinity of these bitopic ligands, when possible, the enantiomeric pairs were separated across the cyclopropyl ring for AB05-27, FOB01-59, and FOB01-60. Using chiral preparative HPLC, these three diastereomeric sets were separated to yield the individual enantiomers. Six of the total eight possible enantiomers (one chiral center was fixed allowing for a total of eight enantiomers) were thus isolated. Compound AB05-26, due to the challenges in achieving sufficient enantiomers separation via preparative HPLC, and being aware of the unfavorable conformation of its (R,S)-morpholine ring for binding pose, was tested as trans diastereomeric mixture.

Binding data collected from compounds AB04-87, AB04-88, AB04-95, AB04-96, FOB01-42, and FOB01-44 had conclusively shown the (2S,5S) stereochemistry at the morpholine to be significantly privileged over the (2R,5S) stereochemistry. As a result, a new diastereoselective synthetic strategy that would access the desired (2S,5S) diastereomer, AB04-85B, selectively, was sought given the current synthetic strategy to access the NOR-PF-592,379 scaffold yielded a 3:1 ratio in favor of the undesired diastereomer. Rapid access to large amounts of the desired (2S,5S) diastereomer became particularly important in the development of a new set of compounds containing a five carbon-length linker with a cyclopropyl ring. The diastereoselective synthetic scheme already reported for the synthesis of the (2R,5S)-diastereoisomer was adapted toward obtaining the (2S,5S) absolute configuration.

Previous studies had revealed that addition of a cyclopropyl ring to the linker may render the four-carbon length too short, and incorporation of an additional methylene unit between the cyclopropyl ring and SP yields improved results, and intriguing pharmacological allosteric properties. Consequently, the results from compounds AB05-26, AB05-27, FOB01-59, and FOB01-60 suggested that the homologated analogues of these compounds had great potential as desirable targets.

The diastereoselective approach to access AB04-85B (Scheme 7) features the enantioselective reduction of α-chloroketone 2-chloro-1-(6-(2,5-dimethyl-1H-pyrrol-1-yl)pyridin-3-yl)ethan-1-one, synthesized in two steps from readily available materials, with (+)-DIP-Cl to yield FOB01-83 selectively in a 97.5:2.5 enantiomeric ratio as determined by analytical chiral HPLC. This reduction step allowed the installation of the right stereochemistry at the key chiral center in AB04-85B. Compound FOB01-83 was then treated with potassium carbonate to yield epoxide FOB01-84 quantitatively, and then achieve FOB01-85 via epoxide opening with L-Alaninol ((S)-(+)-2-aminopropanol). With FOB01-85 successfully synthesized, both key chiral centers of AB04-85B had been established with the desired S stereochemistry. Following Cbz protection of the secondary amine in FOB01-85 with Cbz-succinamide, the morpholine ring was closed under traditional Mitsunobu conditions to displace the less hindered primary alcohol and yield the fully constructed scaffold of AB04-85B. Deprotection of the 2,5-dimethylpyrrole protecting group with hydroxylamine hydrochloride, followed by deprotection of the Cbz group via Pd(OH)$_2$/C catalyzed hydrogenation yielded AB04-85B. With this rapid diastereoselective route, it was possible to proceed to synthesize the desired bitopic compounds with a five carbon-long cyclopropyl linker.

Previous work had shown the trans conformation across the cyclopropyl ring to be favorable over the cis conformation for an array of bitopic compounds. As a result, synthesizing the racemic trans bitopic compound FOB02-04 (Scheme 8) was pursued. Starting with the trans aldehyde N-(2-(2-formylcyclopropyl)ethyl)-1H-indole-2-carboxamide, synthesized selectively with trans stereochemistry, from a previously reported procedure, standard reductive amination conditions with AB04-85B gave access to FOB02-04 in good yields. Further separation of the trans-FOB02-04 racemic mixture with preparative chiral HPLC led to the isolation of the two trans cyclopropyl enantiomers FOB02-04A and FOB02-04B.

The excellent affinity and selectivity exhibited by the FOB02-04A over the FOB02-04B prompted the determination of the absolute stereochemistry of these two enantiomers. The absolute stereochemistry of the (−)-(1R,2S)-AG065 intermediate was identified, isolated via chiral HPLC resolution, in the synthesis of the linker (Scheme 7), by X-ray chromatography. As a result we had HPLC and optical rotation information of the two trans enantiomers of alcohols (−)-(1R,2S)-AG073 and (+)-(1S,2R)-AG071, and aldehydes (+)-(1R,2S)-AG074 and (−)-(1S,2R)-AG072 (Scheme 7). Separation of the two trans enantiomers could also be readily accomplished for the alcohol intermediate FOB02-22A (Scheme 8), which was separated via preparative chiral HPLC into (−)-FOB02-22A and (+)-FOB02-22B, from which the absolute stereochemistry of both was determined comparing to reported analytical HPLC and specific optical rotation, with the same compounds prepared as in Scheme 7. Knowing the absolute configuration of both enantiomers of alcohol FOB02-22, as comparison and HPLC standards to assign all the absolute configurations, FOB02-04B was re-synthesized by Dess-Martin oxidation of alcohol (+)-FOB02-22B to the corresponding aldehyde, followed by reductive amination with AB04-85B to yield FOB02-04B with the stereochemistry at all four chiral centers fully resolved. The use of analytical HPLC at every step of this sequence ensures the correct stereochemistry was assigned.

After conducting the studies with the (+)-PD128,907 and PF-592,379 scaffolds, the importance of the PP in the activity observed by these bitopic molecules was considered. Thus, as additional SAR investigations on the nature of the PP to induce agonism or antagonism pharmacology, synthesis was conducted of bitopic molecules containing the same initial linker and SP tested for the (+)-PD128,907 and PF-592379 scaffolds, and widely characterized D$_3$R selective antagonist scaffolds as PPs.

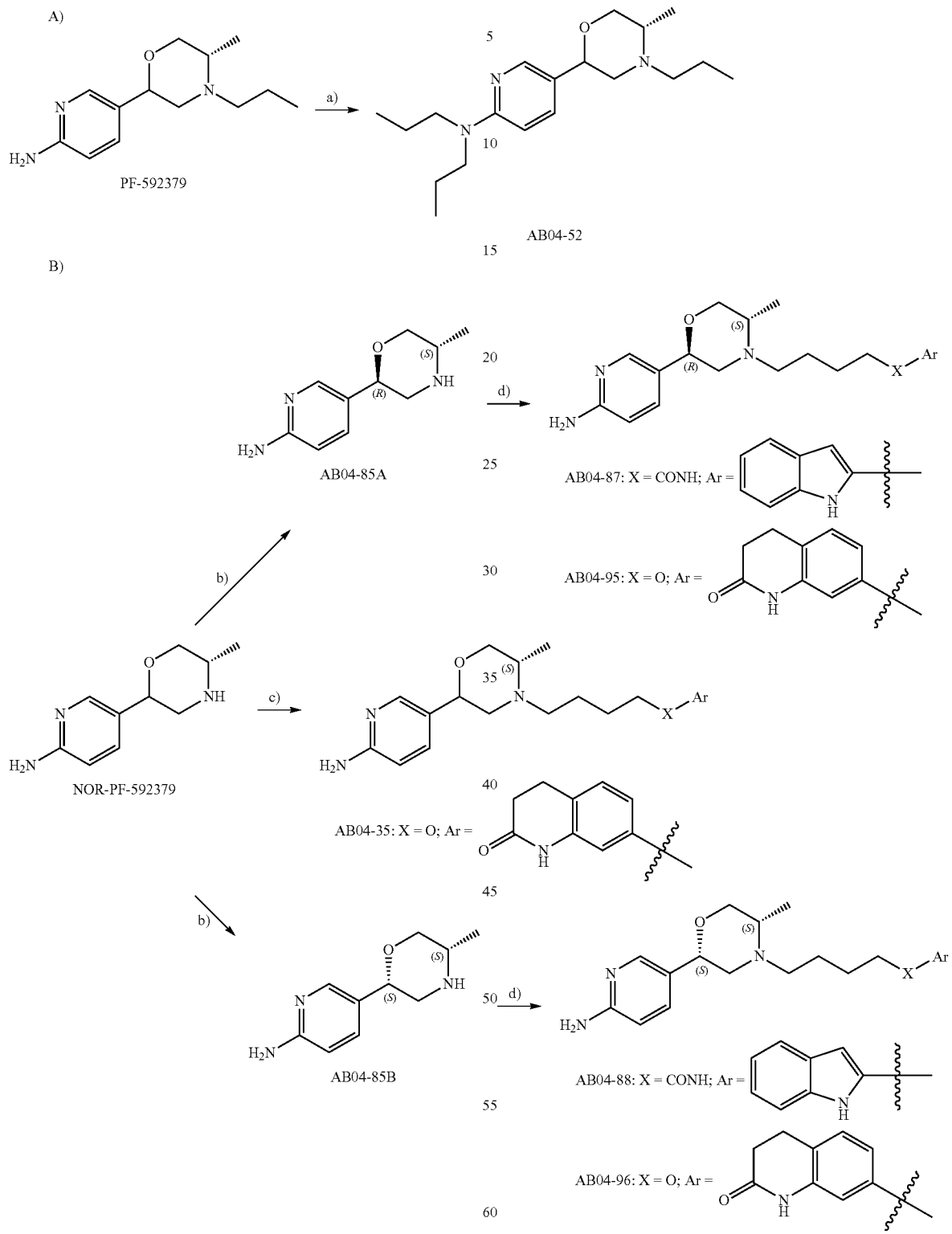
Scheme 4.
a) AcOH, Na(OAc)₃BH, propionaldehyde, ACN, reflux;
b) Resolution via flash chromatography;
c) 7-(4-bromobutoxy)-3,4-dihydroquinolin-2(1H)-one, KI, K₂CO₃, ACN, reflux;
d) AcOH, Na(OAc)₃BH, N-(4-oxobutyl)-1H-indole-2-carboxamide, DCE, RT.

5-((5S)-5-methyl-4-propylmorpholin-2-yl)-N,N-dipropylpyridin-2-amine (AB04-52) To a solution of PF592379 diastereomeric mixture (50 mg, 0.21 mmol) in acetonitrile (10 mL), propionaldehyde (49 mg, 0.84 mmol) was added, followed by catalytic amount of glacial acetic acid. The reaction mixture was stirred at reflux for 2 hours, cooled to room temperature, followed by portion-wise addition of sodium triacetoxyborohydride (178 mg, 0.84 mmol). The mixture was stirred at reflux overnight. The reaction was monitored via GC/MS until complete consumption of the starting material. The solvent was evaporated in vacuo to give a crude product, which was purified via flash chromatography, eluting with 5% DMA ($CH_2Cl_2$:MeOH 95:5+0.5% $NH_4OH$). The pure compound was obtained as diastereomeric mixture, as a yellow oil, in 22% yield (15 mg) $^1H$ NMR (400 MHz, $CDCl_3$) δ 8.12 (s, 1H), 7.44 (d, J=9.2 Hz, 1H), 6.40 (d, J=8.9 Hz, 1H), 4.48 (br s, 1H), 3.93 (br s, 1H), 3.77 (d, J=11.3 Hz, 1H), 3.38 (t, J=7.7 Hz, 4H), 2.93 (br s, 1H), 2.62 (br s, 2H), 2.43 (br s, 2H), 1.60 (h, J=7.7 Hz, 6H) 1.13 (br s, 3H), 0.97-0.82 (m, 9H); $^{13}C$ NMR (101 MHz, $CDCl_3$) δ 158.08, 147.95, 146.78, 135.68, 129.00, 126.10, 105.33, 77.36, 56.53, 53.02, 51.43, 50.75, 29.86, 20.93, 12.00, 11.61. GC/MS (EI) RT 11.905 min, 319.3 m/z. HPLC column Chiralpak AD-H (4.6 mm×250 mm; particle size 5 μm), elution with n-hexane:2-propanol (95:5 flow rate 1 mL/min), total run time 60 min, multiple DAD λ absorbance signals measured in the range of 250-273 nm, RT 5.907 min and 6.267 min, purity>95%, dr 1:1 (absorbance at 254 nm). HRMS (ESI) $C_{19}H_{33}ON_3+H^+$ calculated 320.26964, found 320.26896 (−2.1 ppm).

5-((2R,5S)-5-methylmorpholin-2-yl)pyridin-2-amine (AB04-85A) and 5-((2S,5S)-5-methylmorpholin-2-yl)pyridin-2-amine (AB04-85B) The diastereomeric mixture (65:35 ratio of (2R,5S):(2S,5S)) was separated via flash chromatography, eluting with 5% to 10% DMA ($CH_2Cl_2$:MeOH+0.5% $NH_4OH$). GC/MS (EI) RT 9.494 min and 9.540 min, 193.1 m/z. The (2R,5S)-diastereoisomer eluted first as a white solid. All the spectroscopic data were consistent with the reported ones. $^1H$ NMR (400 MHz, $CD_3OD$) δ 7.91 (d, J=2.3 Hz, 1H), 7.51 (dd, J=8.7, 2.3, 1H), 6.61 (d, J=8.6 Hz, 1H), 4.33 (dd, J=10.7, 2.5 Hz, 1H), 3.95 (dd, J=11.4, 3.3 Hz, 1H), 3.37-3.33 (m, 2H), 3.11-2.92 (m, 1H), 2.83 (dd, J=12.7, 10.7 Hz, 1H), 1.07 (d, J=6.5 Hz, 3H). HPLC method A: column Chiralpak AD-H (4.6 mm×250 mm; particle size 5 μm), elution with n-hexane:2-propanol (85:15 flow rate 1 mL/min), total run time 50 min, multiple DAD λ absorbance signals measured in the range of 230-280 nm, RT 19.193 min, purity>99%, de>99% (absorbance at 230 nm). HPLC method B: column Chiralcel OD-H (4.6 mm×250 mm; particle size 5 μm), elution with n-hexane:2-propanol (90:10 flow rate 1 mL/min), total run time 60 min, multiple DAD λ absorbance signals measured in the range of 230-280 nm, RT 42.578 min, purity>95%, de>95% (absorbance at 230 nm). CHN Anal ($C_{10}H_{15}N_3O·0.1H_2O$) calculated C, 61.58; H, 7.86; N, 21.54. found C, 61.35; H, 7.46; N, 21.31. The (2S,5S)-diastereoisomer eluted second as a pale yellow solid solid $^1H$ NMR (400 MHz, $CD_3OD$) δ 7.88 (d, J=2.3 Hz, 1H), 7.49 (dd, J=8.5, 2.2 Hz, 1H), 6.58 (d, J=8.6 Hz, 1H), 4.35 (dd, J=10.0, 2.9 Hz, 1H), 3.84 (dd, J=11.5, 3.0 Hz, 1H), 3.74-3.63 (m, 1H), 3.11-2.91 (m, 2H), 2.73 (dd, J=13.2, 3.0 Hz, 1H), 1.33 (d, J=7.1 Hz, 3H). HPLC method A: column Chiralpak AD-H (4.6 mm×250 mm; particle size 5 μm), elution with n-hexane:2-propanol (85:15 flow rate 1 mL/min), total run time 50 min, multiple DAD λ absorbance signals measured in the range of 230-280 nm, RT 20.228 min, purity>95%, de>99% (max absorbance at 230 nm). HPLC method B: column Chiralcel OD-H (4.6 mm×250 mm; particle size 5 μm), elution with n-hexane:2-propanol (90:10 flow rate 1 mL/min), total run time 60 min, multiple DAD λ absorbance signals measured in the range of 230-280 nm, RT 38.246 min, purity>99%, de>99% (max absorbance at 230 nm). CHN Anal ($C_{10}H_{15}N_3O·0.1H_2O$) calculated C, 61.58; H, 7.86; N, 21.54. found C, 61.71; H, 7.61; N, 21.33.

7-(4-((5S)-2-(6-aminopyridin-3-yl)-5-methylmorpholino)butoxy)-3,4-dihydroquinolin-2(1H)-one (AB04-35) To a solution of AB04-85 (65:35 diastereomeric mixture, 50 mg, 0.26 mmol) in acetonitrile (5 mL), was added $K_2C_2O_3$ (10 eq.), followed by 7-(4-bromobutoxy)-3,4-dihydroquinolin-2 (1H)-one (92.6 mg, 0.31 mmol). The reaction mixture was stirred at reflux overnight. The solvent was evaporated in vacuo, and the crude residue purified via flash chromatography, eluting with 10% CMA ($CHCl_3$:MeOH 9:1+0.1% $NH_4OH$). The pure product was obtained as 2:1 diastereomeric mixture, as yellow oil, in 28% yield (30 mg). $^1H$ NMR (400 MHz, $CDCl_3$) δ 8.94 (s, 1H, 33% isomer), 8.65 (s, 1H, 66% isomer), 8.12 (s, 1H, 33% isomer), 8.03 (s, 1H, 66% isomer), 7.50-7.38 (m, 1H), 7.02 (d, J 8.3 Hz, 1H) 6.49 (td, J=10.8, 8.8, 5.9 Hz, 1H), 6.36-6.32 (m, 1H), 4.75 (s, 2H, 33% isomer), 4.62 (s, 2H, 66% isomer), 4.46 (t, J=10.0 Hz, 1H), 4.00-3.91 (m, 3H, 66% isomer), 3.86-3.77 (m, 3H, 33% isomer), 3.69 (d, J=11.6 Hz, 1H, 33% isomer), 3.38 (t, J=10.8 Hz, 1H, 66% isomer), 2.98-2.76 (m, 4H), 2.71-2.48 (m, 3H), 2.47-2.37 (m, 2H), 2.29 (dt, J=13.1, 6.7 Hz, 2H, 33% isomer), 2.19 (t, J=11.0 Hz, 2H, 66% isomer), 1.91-1.69 (m, 4H), 1.08 (d, J=6.6 Hz, 3H, 33% isomer), 1.01 (d, J=6.2 Hz, 3H, 66% isomer), $^{13}C$ NMR (101 MHz, $CDCl_3$) δ 172.14, 171.97, 158.75, 158.50, 158.46, 146.46, 146.35, 138.44, 138.40, 136.95, 136.41, 128.79, 128.76, 126.08, 126.05, 115.96, 115.91, 109.15, 108.63, 108.47, 102.45, 102.24, 76.65, 75.88, 73.48, 71.58, 68.18, 67.97, 58.60, 55.04, 54.15, 53.14, 53.02, 52.21, 31.27, 31.24, 27.36, 27.35, 24.75, 23.60, 22.17, 15.09, 8.96. HPLC method A: column Chiralpak AD-H (4.6 mm×250 mm; particle size 5 μm), elution with n-hexane:2-propanol (70:30+0.1% DEA, flow rate 1 mL/min), total run time 50 min, multiple DAD λ absorbance signals measured in the range of 230-280 nm, RT 22.568 min and 27.336 min, purity>95%, dr 65:35 (absorbance at 230 nm). HPLC method B: column Chiralcel OD-H (4.6 mm×250 mm; particle size 5 μm), elution with n-hexane:2-propanol (70:30+0.1% DEA, flow rate 1 mL/min), total run time 50 min, multiple DAD λ absorbance signals measured in the range of 230-280 nm, RT 16.751 min and 29.776 min, purity>95%, dr 35:65 (absorbance at 230 nm). HRMS (ESI) $C_{23}H_{30}O_3N_4+H^+$ calculated 411.23907, found 411.23863 (−1.0 ppm). CHN Anal ($C_{23}H_{30}N_4O_3·0.4CH_2Cl_2·0.2CH_3OH$) calculated C, 62.87; H, 7.06; N, 12.43. found C, 63.06; H, 6.83; N, 12.09.

7-(4-((2R,5S)-2-(6-aminopyridin-3-yl)-5-methylmorpholino)butoxy)-3,4-dihydroquinolin-2(1H)-one (AB04-95). The desired product was prepared following the same procedure described for AB04-35, starting from AB04-85A (30 mg, 0.16 mmol). $^1H$ NMR (400 MHz, $CDCl_3$) δ 8.04 (s, 1H), 7.77 (s, 1H), 7.45 (d, J=8.5 Hz, 1H), 7.04 (d, J=8.3 Hz, 1H), 6.49 (t, J=9.4 Hz, 2H), 6.25 (s, 1H), 4.54 (s, 2H), 4.45 (d, J=10.3 Hz, 1H), 3.98-3.89 (m, 2H), 3.83 (d, J=11.3 Hz, 1H), 3.39 (t, J=10.8 Hz, 1H), 2.99-2.83 (m, 4H), 2.61 (t, J=7.5 Hz, 2H), 2.47-2.37 (m, 1H), 2.29 (dt, J=12.9, 6.8 Hz, 1H), 2.19 (t, J=11.1 Hz, 1H), 1.88-1.57 (m, 4H), 1.02 (d, J=6.2 Hz, 3H); $^{13}$C NMR (101 MHz, CDCl$_3$) δ 171.50, 158.77, 158.41, 146.39, 138.29, 136.45, 128.86, 126.15, 116.03, 108.54, 108.47, 102.43, 76.64, 73.50, 68.00, 58.58, 55.06, 53.12, 31.27, 27.32, 24.78, 22.15, 15.10. HPLC method A: column Chiralpak AD-H (4.6 mm×250 mm; particle size 5 μm), elution with n-hexane:2-propanol (70:30, flow rate 1 mL/min), total run time 60 min, multiple DAD λ absorbance signals measured in the range of 210-280 nm, RT 28.163 min, purity>95%, de>99% (absorbance at 230 nm). HPLC method B: column Chiralcel OD-H (4.6 mm×250 mm; particle size 5 μm), elution with n-hexane:2-propanol (70:30, flow rate 1 mL/min), total run time 60 min, multiple DAD λ absorbance signals measured in the range of 210-280 nm, RT 33.735 min, purity>99%, de>99% (absorbance at 230 nm). The free base was converted into the corresponding oxalate salt. HRMS (ESI) $C_{23}H_{30}O_3N_4$+H$^+$ calculated 411.23907, found 411.23818 (−0.2 ppm). CHN Anal ($C_{23}H_{30}N_4O_3 \cdot 3H_2C_2O_4 \cdot 0.75H_2O$) calculated C, 50.18; H, 5.45; N, 8.07. found C, 50.09; H, 5.64; N, 8.46. m.p. 178-179° C.; $[\alpha]_D^{25}$: +24.8 (0.295 g/100 mL in MeOH).

7-(4-((2S,5S)-2-(6-aminopyridin-3-yl)-5-methylmorpholino)butoxy)-3,4-dihydroquinolin-2(1H)-one (AB04-96) The desired product was prepared following the same procedure described for AB04-35, starting from AB04-85B (30 mg, 0.16 mmol). $^1$H NMR (400 MHz, CDCl$_3$) δ 8.36 (s, 1H), 7.99 (s, 1H), 7.51 (d, J=8.8 Hz, 1H), 7.04 (d, J=8.3 Hz, 1H), 6.50 (dd, J=12.5, 8.0 Hz, 2H), 6.31 (s, 1H), 5.27 (br s, 2H), 4.47 (t, J=6.3 Hz, 1H), 3.96 (t, J=6.5 Hz, 2H), 3.85 (d, J=11.1 Hz, 1H), 3.72 (d, J=11.2 Hz, 1H), 2.89 (t, J=7.5 Hz, 3H), 2.61 (dt, J=7.9, 4.7 Hz, 4H), 2.50 (hept, J=7.1, 6.2 Hz, 2H), 1.87-1.75 (m, 2H), 1.67 (q, J=7.4 Hz, 2H), 1.11 (d, J=6.5 Hz, 3H); $^{13}$C NMR (101 MHz, CDCl$_3$) δ 172.19, 158.77, 158.24, 144.39, 138.18, 137.62, 128.86, 125.74, 115.93, 109.36, 109.13, 102.31, 75.62, 71.72, 68.09, 54.05, 52.78, 51.78, 31.19, 27.31, 24.70, 23.34, 8.65. HPLC method A: column Chiralpak AD-H (4.6 mm×250 mm; particle size 5 μm), elution with n-hexane:2-propanol (70:30, flow rate 1 mL/min), total run time 60 min, multiple DAD λ absorbance signals measured in the range of 210-280 nm, RT 35.369 min, purity>95%, de>90% (absorbance at 230 nm). HPLC method B: column Chiralcel OD-H (4.6 mm×250 mm; particle size 5 μm), elution with n-hexane:2-propanol (70:30, flow rate 1 mL/min), total run time 60 min, multiple DAD λ absorbance signals measured in the range of 210-280 nm, RT 18.507 min, purity 94.2% de 88.4% (absorbance at 230.4 nm). HRMS (ESI) $C_{23}H_{30}O_3N_4$+H$^+$ calculated 411.23907, found 411.23798 (−1.6 ppm). CHN Anal ($C_{23}H_{30}N_4O_3 \cdot 2H_2C_2O_4 \cdot 2H_2O$) calculated C, 51.75; H, 6.11; N, 8.94. found C, 51.58; H, 5.94; N, 8.77. Salt was highly hygroscopic therefore melting point could not be determined; $[\alpha]_D^{25}$: −1.37 (0.085 g/100 mL in MeOH).

N-(4-((2R,5S)-2-(6-aminopyridin-3-yl)-5-methylmorpholino)butyl)-1H-indole-2-carboxamide (AB04-87) To a solution of AB04-85A (60 mg, 0.31 mmol) in 1,2-dichloroethane (10 mL), N-(4-oxobutyl)-1H-indole-2-carboxamide (71 mg, 0.31 mmol) was added, followed by catalytic amount of glacial acetic acid. The reaction mixture was stirred at room temperature for 2 hours, followed by portion-wise addition of sodium triacetoxyborohydride (178 mg, 0.84 mmol). The reaction was stirred at room temperature overnight, the solvent was evaporated in vacuo to give a crude product, which was purified via flash chromatography, eluting with 15% DMA (CH$_2$Cl$_2$:MeOH 85:15+0.1% NH$_4$OH). The pure compound was obtained as 62 mg of colorless viscous oil, in 47% yield. $^1$H NMR (400 MHz, CDCl$_3$) δ 9.31 (s, 1H), 8.03 (d, J=2.2 Hz, 1H), 7.64 (dd, J=8.0, 1.0 Hz, 1H), 7.47-7.40 (m, 2H), 7.31-7.26 (m, 1H), 7.14 (ddd, J=8.0, 7.0, 1.0 Hz, 1H), 6.82 (dd, J=2.2, 0.9 Hz, 1H), 6.47-6.44 (m, 1H), 6.32 (s, 1H), 4.55 (s, 2H), 4.46 (dd, J=10.5, 2.3 Hz, 1H), 3.83 (dd, J=11.3, 3.4 Hz, 1H), 3.53-3.49 (m, 2H), 3.43-3.37 (m, 1H), 2.97-2.80 (m, 2H), 2.42 (ddd, J=10.0, 6.3, 3.5 Hz, 1H), 2.26 (ddd, J=12.9, 7.7, 5.6 Hz, 1H), 2.18 (dd, J=11.7, 10.5 Hz, 1H), 1.58 (qd, J=8.0, 3.6 Hz, 4H), 1.02 (d, J=6.2 Hz, 3H); $^{13}$C NMR (101 MHz, CDCl$_3$) δ 161.73, 158.29, 146.17, 136.52, 136.31, 130.93, 127.79, 126.01, 124.64, 122.04, 120.83, 112.06, 108.56, 101.89, 76.60, 73.41, 58.25, 53.12, 51.01, 27.95, 23.29, 15.09. HPLC column Chiralpak AD-H (4.6 mm×250 mm; particle size 5 μm), elution with n-hexane:2-propanol (70:30, flow rate 1 mL/min), total run time 120 min, multiple DAD λ absorbance signals measured in the range of 230-280 nm, RT 80.465 min, purity>99%, de>99% (absorbance at 230 nm). The free base was converted into the corresponding oxalate salt. HRMS (ESI) $C_{23}H_{29}O_2N_5$+H$^+$ found 408.23917 (−0.6 ppm). CHN Anal ($C_{23}H_{29}N_5O_2 \cdot 2H_2C_2O_4 \cdot 0.85H_2O$) calculated C, 53.79; H, 5.80; N, 11.62. found C, 54.19; H, 6.05; N, 11.22. m.p. 176-177° C.; $[\alpha]_D^{25}$: +30.8 (0.055 g/100 mL in MeOH).

N-(4-((2S,5S)-2-(6-aminopyridin-3-yl)-5-methylmorpholino)butyl)-1H-indole-2-carboxamide (AB04-88) The desired product was prepared following the same procedure described for AB04-87, starting from AB04-85B (30 mg, 0.16 mmol) The pure compound was obtained as 43 mg of colorless viscous oil, in 63% yield. $^1$H NMR (400 MHz, CDCl$_3$) δ 9.28 (s, 1H), 8.06 (d, J=2.3 Hz, 1H), 7.64 (dd, J=8.1, 1.0 Hz, 1H), 7.48-7.40 (m, 2H), 7.28 (ddd, J=8.3, 7.0, 1.2 Hz, 1H), 7.14 (ddd, J=8.0, 7.0, 1.0 Hz, 1H), 6.83 (d, J=1.5 Hz, 1H), 6.51-6.44 (m, 1H), 6.41 (s, 1H), 4.51 (br s, 2H), 4.47 (dd, J=9.4, 3.6 Hz, 1H), 3.87 (dd, J=11.2, 2.8 Hz, 1H), 3.74 (dd, J=11.2, 2.1 Hz, 1H), 3.52 (q, J=6.6 Hz, 2H), 2.92-2.83 (m, 1H), 2.66-2.52 (m, 2H), 2.49 (t, J=7.1 Hz, 2H), 1.65 (dq, J=37.1, 7.5 Hz, 4H), 1.10 (d, J=6.6 Hz, 3H); $^{13}$C NMR (101 MHz, CDCl$_3$) δ 161.69, 158.20, 146.44, 136.64, 136.27, 131.03, 127.82, 126.27, 124.64, 122.05, 120.85, 112.02, 108.52, 101.88, 76.14, 72.18, 53.85, 53.09, 51.57, 39.65, 27.75, 24.52, 8.24. HPLC column Chiralpak AD-H (4.6 mm×250 mm; particle size 5 μm), elution with n-hexane:2-propanol (70:30, flow rate 1 mL/min), total run time 120 min, multiple DAD λ absorbance signals measured in the range of 230-280 nm, RT 89.625 min, purity>99%, de>99% (absorbance at 230 nm). The free base was converted into the corresponding oxalate salt. HRMS (ESI) $C_{23}H_{29}O_2N_5$+H$^+$ found 408.23994 (1.3 ppm). CHN Anal ($C_{23}H_{29}N_5O_2 \cdot 2H_2C_2O_4 \cdot 0.5H_2O$) calculated C, 54.36; H, 5.74; N, 11.74. found C, 54.45; H, 5.85; N, 11.86. m.p. 132-133° C.; $[\alpha]_D^{25}$: −7.27 (0.055 g/100 mL in MeOH).

Scheme 5.

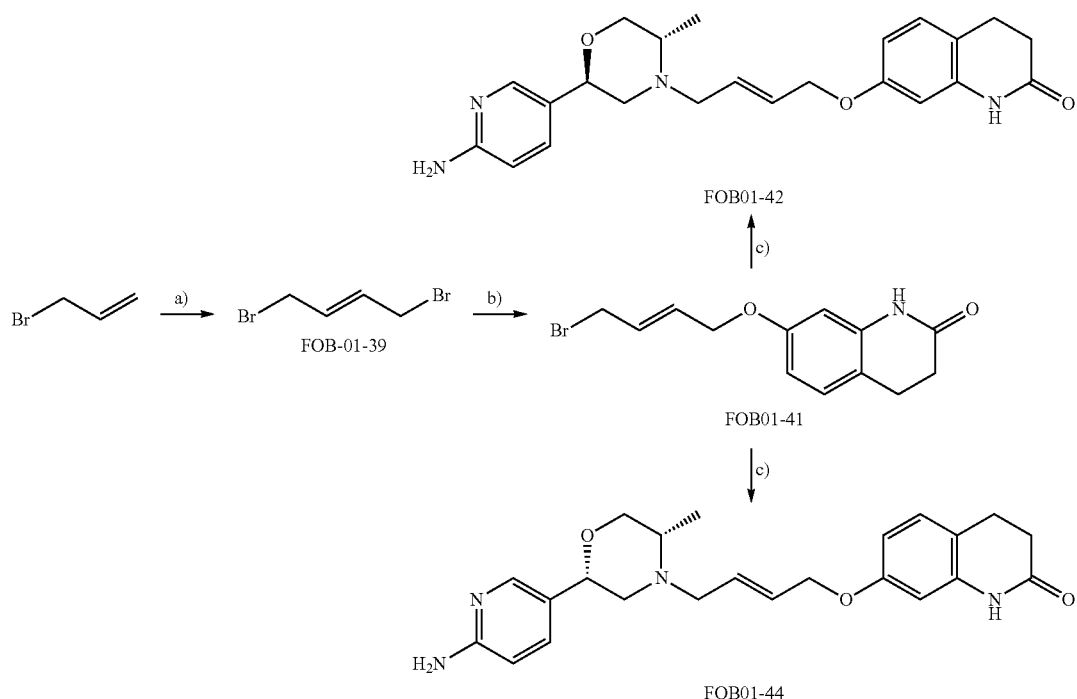

a) HG-II Grubb's catalyst, DCM;
b) 7-(4-bromobutoxy)-3,4-dihydroquinolin-2(1H)-one, KI, K$_2$CO$_3$, ACN, reflux;
c) AB04-85A or AB04-85B, K$_2$CO$_3$, ACN, reflux.

(E)-1,4-dibromobut-2-ene (FOB-01-39) To a two neck round bottom flask was added Hoveyda-Grubbs catalyst 2$^{nd}$ generation (25.0 mg, 0.04 mmol) and subsequently purged with argon. Degassed dichloromethane (6 mL) were added via syringe to the flask to form a green solution of the catalyst. To the solution was added freshly distilled allyl bromide (5.0 mL, 52.1 mmol), gas evolution from the reaction was observed and within a minute the reaction mixture had become brown in color. The reaction mixture was allowed to stir for approximately 10 more minutes after which the solvent was removed under reduced pressure and the product purified by standard flash chromatography with hexanes/EtOAc (95:5) to yield 1.70 g of 1,4-dibromobut-2-ene as a white crystal, in 15% yield, and in 9:1 ratio of the E:Z product. $^1$H NMR (400 MHz, CDCl$_3$) δ 5.98 (br s, 2H), 4.03-3.90 (m, 4H).

(E)-7-((4-bromobut-2-en-1-yl)oxy)-3,4-dihydroquinolin-2(1H)-one (FOB-01-41) (E)-1,4-dibromobut-2-ene (0.200 g, 0.94 mmol) and 7-hydroxy-3,4-dihydroquinolin-2(1H)-one (0.155 g, 5.55 mmol) were dissolved in acetonitrile (5 mL) with gentle heating, to the reaction mixture was added anhydrous K$_2$CO$_3$ (1.29 g, 9.40 mmol) and a catalytic amount of KI (approx. 25.0 mg). The reaction was subsequently refluxed for 1.5 hours and then allowed to stir overnight at room temperature. The solvent was then removed under reduced pressure and the crude material purified via flash chromatography, eluting with hexanes/EtOAc (75:25), to yield 0.060 g of the product as a white solid, in 22% yield. $^1$H NMR (400 MHz, CDCl$_3$) δ 8.77 (s, 1H), 7.04 (d, J=8.4 Hz, 1H), 6.52 (d, J=8.2 Hz, 1H), 6.39 (s, 1H), 6.13-6.01 (m, 1H), 6.02-5.89 (m, 1H), 4.52 (s, 1H), 3.98 (d, J=5.6 Hz, 2H), 2.96-2.84 (m, 2H), 2.70-2.55 (m, 2H).

7-(((E)-4-((2R,5S)-2-(6-aminopyridin-3-yl)-5-methyl-morpholino)but-2-en-1-yl)oxy)-3,4-dihydroquinolin-2(1H)-one (FOB-01-42) To a round bottom flask were added FOB-01-41 (0.0342 g, 0.115 mmol) and AB-04-85A (0.0220 g, 0.110 mmol) and subsequently dissolved with acetonitrile (5 mL). To the solution was added anhydrous K$_2$CO$_3$ (0.150 g, 1.20 mmol) and the reaction was set to reflux for 50 minutes and then allowed to return to room temperature to be stirred overnight. The solvent was removed under reduced pressure and the crude mixture purified via flash chromatography eluting with 5% DMA (DCM:MeOH 95:5+ 0.5% NH$_4$OH), to yield 0.0365 g of the desired product, as a white solid, in 78% yield. $^1$H NMR (400 MHz, CD$_3$OD) δ 7.81 (s, 1H), 7.38 (d, J=8.7 Hz, 1H), 6.99 (d, J=8.5 Hz, 1H), 6.53 (t, J=7.9 Hz, 2H), 6.45 (s, 1H), 5.86 (br s, 2H), 4.54 (s, 2H), 4.37 (d, J=10.5 Hz, 1H), 3.81 (d, J=11.5 Hz, 1H), 3.56 (d, J=14.0 Hz, 1H), 3.37 (d, J=11.0 Hz, 1H), 2.95 (dd, J=13.9, 7.3 Hz, 1H), 2.82 (d, J=9.6 Hz, 3H), 2.51 (t, J=7.8 Hz, 2H), 2.43 (s, 1H), 2.15 (t, J=11.3 Hz, 1H), 1.05 (d, J=6.0 Hz, 3H); $^{13}$C NMR (101 MHz, CD$_3$OD) δ 174.05, 160.69, 159.26, 146.18, 139.73, 137.84, 131.45, 129.87, 129.54, 125.80, 117.41, 111.43, 110.45, 109.89, 103.78, 77.39, 73.85, 68.79, 59.19, 56.12, 56.08, 31.90, 25.39, 14.68. HPLC Method A: column Chiralpak AD-H (4.6 mm×250 mm; particle size 5 μm), elution with n-hexane:2-propanol (70:30, flow rate 1 mL/min), total run time 60 min, multiple DAD λ absorbance signals measured in the range of 210-280 nm, RT 31.234 min, purity>95%, de>99% (absorbance at 214 nm). HPLC Method B: column Chiralcel OD-H (4.6 mm×250 mm; particle size 5 μm), elution with n-hexane:2-propanol (70:30, flow rate 1 mL/min), total run time 60 min, multiple DAD λ absorbance signals measured in the range of 210-280 nm, RT 31.721 min, purity>99%, de>99% (absorbance at 214 nm). HPLC Method C: column Chiralcel OZ-H (4.6 mm×250 mm; particle size 5 μm), elution with n-hexane:2-propanol (70:30, flow rate 1 mL/min), total run time 130 min, multiple DAD λ absorbance signals measured in the range of 210-280 nm, RT 46.609 min, purity>95%, de>99% (max absorbance at 214 nm). The free base was converted into the corresponding oxalate salt. HRMS (ESI) $C_{23}H_{28}O_3N_4+H^+$ calculated 409.22342, found 409.22293 (−1.1 ppm). CHN Anal ($C_{23}H_{28}N_4O_3 \cdot 3H_2C_2O_4 \cdot 2.5H_2O$) calculated C, 48.13; H, 5.43; N, 7.74. found C, 47.96; H, 5.31; N, 7.42. m.p. 123-124° C.; $[\alpha]_D^{25}$: +20.0 (0.080 g/100 mL in MeOH).

7-(((E)-4-((2S,5S)-2-(6-aminopyridin-3-yl)-5-methylmorpholino)but-2-en-1-yl)oxy)-3,4-dihydroquinolin-2(1H)-one (FOB-01-44) The desired product was prepared following the same procedure described for FOB-01-42, starting from AB-04-85B (0.0200 g, 0.103 mmol). The crude material was purified via flash chromatography, eluting with 5% DMA (DCM:MeOH 95:5+0.5% $NH_4OH$), to yield 0.0379 g of the desired product as a white solid, in 90% yield. $^1H$ NMR (400 MHz, $CD_3OD$) δ 7.85 (s, 1H), 7.43 (dd, J=8.7, 2.5 Hz, 1H), 7.00 (d, J=8.5 Hz, 1H), 6.53 (t, J=8.5 Hz, 2H), 6.45 (d, J=2.5 Hz, 1H), 5.85 (br s, 2H), 4.52 (s, 2H), 4.37 (dt, J=7.9, 3.4 Hz, 1H), 3.84 (d, J=11.5 Hz, 1H), 3.70 (d, J=10.6 Hz, 1H), 3.13 (q, J=13.5 Hz, 2H), 2.91-2.77 (m, 3H), 2.59-2.45 (m, 4H), 1.10 (d, J=4.4 Hz, 3H); $^{13}C$ NMR (101 MHz, $CD_3OD$) δ 173.99, 160.59, 159.32, 146.23, 139.70, 137.96, 131.19, 130.62, 129.56, 126.04, 117.38, 110.44, 109.91, 103.71, 77.04, 72.69, 68.90, 57.21, 52.86, 31.89, 25.37, 8.50. HPLC Method A: column Chiralpak AD-H (4.6 mm×250 mm; particle size 5 μm), elution with n-hexane:2-propanol (70:30, flow rate 1 mL/min), total run time 60 min, multiple DAD λ absorbance signals measured in the range of 210-280 nm, RT 37.386 min, purity 92.6%, de 86.3% (absorbance at 214 nm). HPLC Method B: column Chiralcel OD-H (4.6 mm×250 mm; particle size 5 μm), elution with n-hexane:2-propanol (70:30, flow rate 1 mL/min), total run time 60 min, multiple DAD λ absorbance signals measured in the range of 210-280 nm, RT 19.762 min, purity 91.5%, de>83.4% (max absorbance at 214.4 nm). The free base was converted into the corresponding oxalate salt. HRMS (ESI) $C_{23}H_{28}O_3N_4+H^+$ calculated 409.22342, found 409.22282 (−2.8 ppm). CHN Anal ($C_{23}H_{28}N_4O_3 \cdot 2H_2C_2O_4 \cdot 2H_2O$) calculated C, 51.92; H, 5.81; N, 8.97. found C, 51.85; H, 5.71; N, 8.93. m.p. 110-111° C.; $[\alpha]_D^{25}$: −5.33 (0.075 g/100 mL in MeOH).

Scheme 6.

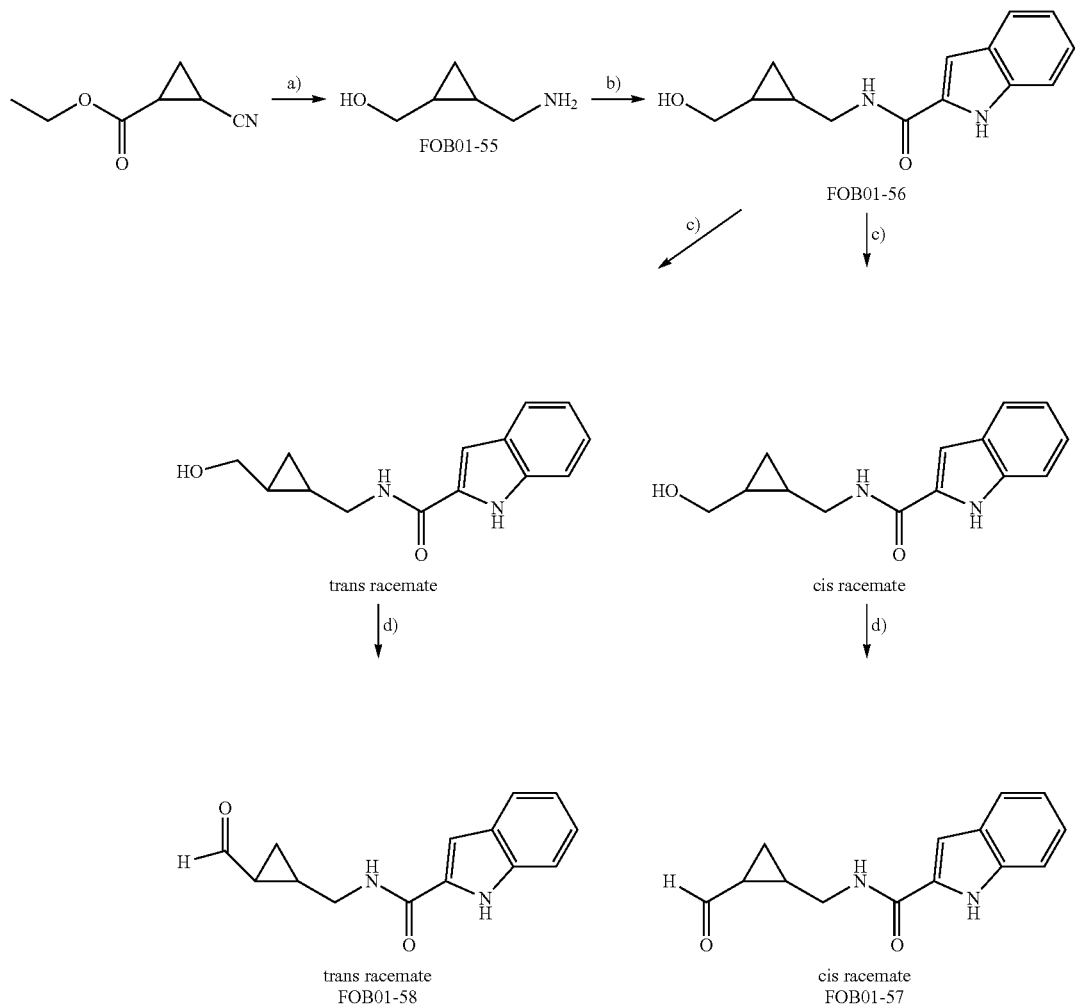

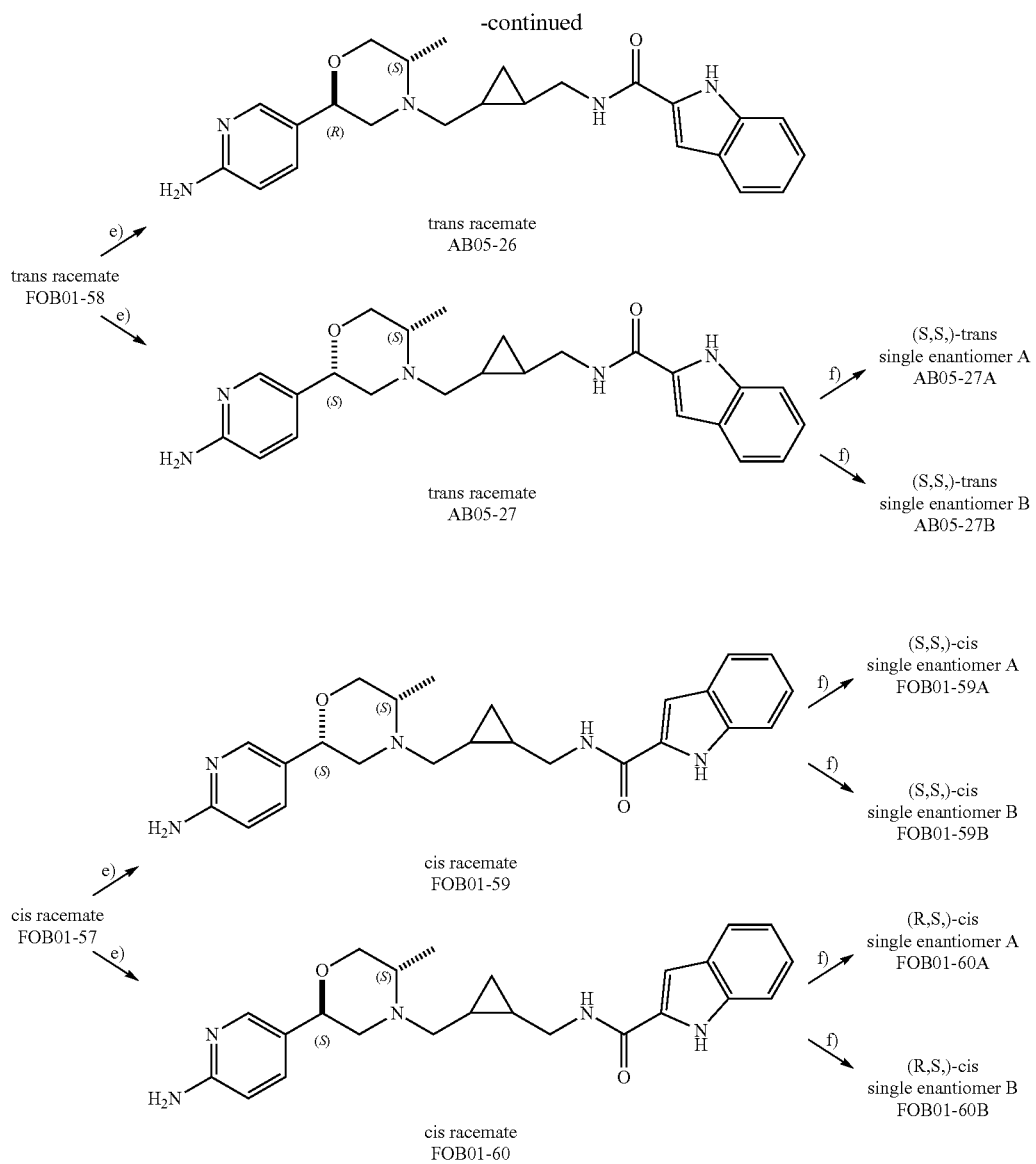

a) LiAlH₄, THF, 0° C. to RT;
b) Indole-2-carboxylic acid, DIPEA, EDC, HOBt, ArCOOH, 0° C. to RT;
c) diastereoisomers separation via flash chromatography;
d) Dess-Martin periodinane (DMP), DCM, 0° C. to RT;
e) cat. AcOH, Na(OAc)₃BH, AB04-85A or AB04-85B, DCE;
f) Chiral resolution via preparative chiral HPLC (AD—H column) or flash chromatography.

(2-(aminomethyl)cyclopropyl)methanol (FOB01-55) To a round bottom flask was added lithium aluminum hydride (LAH, 2.106 g, 55.5 mmol) and subsequently purged with argon. Anhydrous tetrahydrofuran (25 mL) was added to the flask to form a gray suspension and the solution was subsequently cooled to 0° C. in an ice bath. Ethyl 2-cyano-cyclopropanecarboxylate (2.57 g, 18.5 mmol) was then dissolved in 5 mL of anhydrous tetrahydrofuran and added dropwise to the solution of LAH via syringe. Upon complete addition of the ethyl 2-cyanocyclopropanecarboxylate, the reaction mixture was removed from the ice bath and allowed to reach room temperature and stirred with moderate heating for 2 hrs. The reaction mixture was then removed from the heating source and stirred at room temperature overnight. 3 mL of ice cold water were added to the reaction, followed by 3 mL of 15% NaOH which resulted in the formation of a white solid precipitate. An additional 15 mL of water were added to the reaction mixture and it was then stirred for 30 minutes. Excess MgSO₄ was added to the reaction mixture to absorb water and the suspension was stirred for additional 30 minutes. The suspension was then filtered over celite and the solvent removed under reduced pressure to yield 1.801 g of the desired product as a colorless oil, in 96% yield, which was carried on to the next step without further purification.

N-((2-(hydroxymethyl)cyclopropyl)methyl)-1H-indole-2-carboxamide (FOB01-56) Indole-2-carboxylic acid (3.220 g, 20.0 mmol) was dissolved in anhydrous tetrahydrofuran (50 mL) and cooled to 0° C. in an ice bath. To this solution was subsequently added 1-Ethyl-3-(3-dimethylaminopropyl)carbodiimide (EDC hydrochloride) (4.14 g, 21.6 mmol) and hydroxybenzotriazole (3.16 g, 23.4 mmol) in one portion and allowed to stir for 30 minutes at 0° C. A solution of FOB01-55 (1.801 g, 17.8 mmol, 1.78 M) in DCM was added dropwise, followed by N,N-diisoproylethylamine (Hunig's base or DIPEA) (4.4 mL, 25.2 mmol). The reaction mixture was then removed from the ice bath and allowed to reach room temperature and stirred overnight. The reaction mixture was quenched with the addition of 50 mL of saturated sodium bicarbonate solution. The mixture was extracted with ethyl acetate (3×50 mL), the combined organic phases were dried with $Na_2SO_4$, concentrated under reduced pressure, and the crude was purified by flash chromatography, gradually increasing the mobile phase polarity up to hexanes/EtOAc (2:3) (EtOAc:Hex), followed by isocratic elution. The diastereoisomers cis-FOB01-56 and trans-FOB01-56 were separated with Rf: 0.25 and Rf: 0.20 respectively; cis-FOB01-56 eluted first as a colorless oil (0.241 g, 5.5% yield); $^1$H NMR (400 MHz, $CD_3OD$) δ 7.59 (d, J=8.0 Hz, 1H), 7.43 (d, J=8.3 Hz, 1H), 7.21 (t, J=7.7 Hz, 1H), 7.09-6.99 (m, 2H), 3.96-3.87 (m, 1H), 3.73 (dd, J=14.3, 4.8 Hz, 1H), 3.45 (t, J=9.8 Hz, 1H), 3.23 (dd, J=14.3, 7.0 Hz, 1H), 1.25 (br s, 2H), 0.82 (q, J=7.5 Hz, 1H), 0.26 (d, J=5.6 Hz, 1H); trans-FOB01-56 eluted second as a colorless oil (0.117 g, 2.7% yield) and its spectroscopic data were consistent with the previously reported data; $^1$H NMR (400 MHz, $CD_3OD$) δ 7.56 (d, J=7.9 Hz, 1H), 7.40 (d, J=8.2 Hz, 1H), 7.17 (t, J=7.7 Hz, 1H), 7.10-6.97 (m, 2H), 3.44 (dd, J=11.6, 5.8 Hz, 1H), 3.31 (p, J=5.4, 4.4 Hz, 2H), 3.23 (dd, J=13.8, 6.4 Hz, 1H), 0.99 (d, J=6.0 Hz, 2H), 0.50 (d, J=6.7 Hz, 1H), 0.44 (d, J=6.7 Hz, 1H).

cis-N-((2-formylcyclopropyl)methyl)-1H-indole-2-carboxamide (FOB01-57) Compound cis-FOB01-56 (0.241 g, 0.99 mmol) was dissolved in tetrahydrofuran (20 mL) and cooled to −78° C. under an argon atmosphere. To the solution was added Dess-Martin periodinane (0.636 g, 1.50 mmol) in one portion and the reaction was allowed to warm to room temperature. The reaction mixture was then stirred for 1.5 hrs, at which point the solvent was removed under reduced pressure and the crude mixture partially purified by flash chromatography, eluting with hexanes/EtOAc (7:3) to yield 45 mg of the desired product as a viscous colorless oil, in 18.8% yield, and used directly in the following step.

trans-N-((2-formylcyclopropyl)methyl)-1H-indole-2-carboxamide (FOB01-58) The desired product was prepared following the same procedure described for FOB01-57 starting from trans-FOB01-56 (0.117 g, 0.50 mmol) to yield 99.0 mg as a colorless viscous oil, in 81.7% yield. $^1$H NMR (400 MHz, $CDCl_3$) δ 10.12 (s, 1H), 8.99 (dd, J=3.8, 1.5 Hz, 1H), 7.59 (s, 1H), 7.52 (d, J=8.2 Hz, 1H), 7.33 (d, J=8.1 Hz, 1H), 7.13 (t, J=7.8 Hz, 1H), 7.03-6.87 (m, 2H), 3.48 (dt, J=12.7, 5.8 Hz, 1H), 3.24 (dt, J=13.8, 6.5 Hz, 1H), 1.82 (s, 1H), 1.75 (s, 1H), 1.24 (d, J=4.2 Hz, 1H), 1.05 (d, J=6.6 Hz, 1H).

cis-N-((2-(((2R,5S)-2-(6-aminopyridin-3-yl)-5-methyl-morpholino)methyl)cyclopropyl)methyl)-1H-indole-2-carboxamide (FOB01-60) Compound FOB01-57 (37.5 mg, 0.155 mmol) was dissolved in 1,2-dichloroethane (6 mL) and to the mixture was added AB04-85A (30.0 mg, 0.155 mmol). To the stirring solution was added catalytic amount of acetic acid and the reaction was allowed to stir for 30 minutes, after which sodium triacetoxyborohydride (50.0 mg, 0.23 mmol) was added in one portion, and the reaction mixture was allowed to stir at room temperature overnight. The solvent was removed under reduced pressure and the crude residue purified via flash chromatography, gradually increasing the polarity of the mobile phase, with two fractions of desired product, enriched with the respective diastereoisomer, eluting with 10% DMA (DCM:MeOH 9:1+0.5% $NH_4OH$) to yield colorless oils. The diastereoisomers were further purified via preparative chiral HPLC (Chiralpak AD-H 21 mm×250 mm; 5 μm), eluting with n-hexane:2-propanol (from 70:30 up to 50:50, flow rate 25 mL/min) to yield two different fractions corresponding to the two diastereoisomers FOB01-60A (5.7 mg; 8.7%) and FOB01-60B (7.6 mg; 12% yield). Analytical HPLC for FOB01-60A: column Chiralpak AD-H (4.6 mm×250 mm; particle size 5 μm), elution with n-hexane:2-propanol (60:40, flow rate 1 mL/min), total run time 90 min, multiple DAD λ absorbance signals measured in the range of 210-280 nm, RT 38.626 min, purity>99%, de>99% (absorbance at 230 nm). $^1$H NMR (400 MHz, $CDCl_3$) δ 9.49 (s, 1H), 7.95 (s, 1H), 7.68 (d, J=7.9 Hz, 1H), 7.46 (d, J=8.2 Hz, 1H), 7.39 (d, J=8.3 Hz, 1H), 7.29 (br s, 2H), 7.15 (s, 1H), 7.05 (s, 1H), 6.45 (d, J=8.5 Hz, 1H), 4.64 (d, J=13.5 Hz, 2H), 4.48 (s, 1H), 3.89 (d, J=11.9 Hz, 1H), 3.56 (t, J=11.3 Hz, 1H), 3.32 (d, J=11.9 Hz, 1H), 2.68 (t, J=12.2 Hz, 1H), 2.59 (t, J=12.6 Hz, 1H), 2.47-2.28 (m, 2H), 2.18-2.05 (m, 2H), 1.13 (br s, 2H), 1.03-0.98 (m, 3H), 0.88 (br s, 1H), 0.24 (br s, 1H). HRMS (ESI) $C_{24}H_{29}O_2N_5+H^+$ calculated 420.23940, found 420.23983 (1 ppm). Analytical HPLC for FOB01-60B: column Chiralpak AD-H (4.6 mm×250 mm; particle size 5 μm), elution with n-hexane:2-propanol (60:40, flow rate 1 mL/min), total run time 90 min, multiple DAD λ absorbance signals measured in the range of 210-280 nm, RT 48.157 min, purity>99%, de>99% (absorbance at 230 nm). $^1$H NMR (400 MHz, $CDCl_3$) δ 9.38 (s, 1H), 7.90 (s, 1H), 7.66 (d, J=8.1 Hz, 1H), 7.43 (d, J=8.3 Hz, 1H), 7.29 (d, J=8.3 Hz, 2H), 7.18-7.10 (m, 1H), 6.90 (s, 1H), 6.84 (s, 1H), 6.33 (d, J=8.4 Hz, 1H), 4.48-4.34 (m, 3H), 4.09-3.95 (m, 1H), 3.82 (t, J=10.1 Hz, 2H), 3.49 (t, J=10.9 Hz, 1H), 3.44-3.30 (m, 1H), 3.14 (t, J=12.9 Hz, 1H), 2.96 (d, J=10.6 Hz, 2H), 2.55-2.47 (m, 1H), 2.42-2.22 (m, 2H), 1.11 (d, J=6.3 Hz, 3H), 1.01 (d, J=6.2 Hz, 1H), 0.18 (q, J=5.5 Hz, 1H); HRMS (ESI) $C_{24}H_{29}O_2N_5+H^+$ calculated 420.23940, found 420.23976 (0.8 ppm). [α] values for compounds FOB01-60A and FOB01-60B were not determined.

cis-N-((2-(((2S,5S)-2-(6-aminopyridin-3-yl)-5-methyl-morpholino)methyl)cyclopropyl)methyl)-1H-indole-2-carboxamide (FOB01-59) Compound FOB01-59 was synthesized following the same procedure described for FOB01-60, starting from AB04-85B (11.0 mg, 0.06 mmol) and FOB01-57 (37.5 mg, 0.16 mmol) to yield 12.3 mg of the final product as a colorless oil, in 48% yield. HRMS (ESI) $C_{24}H_{29}O_2N_5+H^+$ calculated 420.23940, found 420.24047 (2.5 ppm). The racemic mixture was purified via preparative chiral HPLC (Chiralpak AD-H 21 mm×250 mm; 5 μm), eluting with n-hexane:2-propanol (from 70:30 up to 50:50, flow rate 25 mL/min) to yield two different fractions corresponding to the two diastereoisomers FOB01-59A and FOB01-59B. Analytical HPLC for FOB01-59A: column Chiralpak AD-H (4.6 mm×250 mm; particle size 5 μm), elution with n-hexane:2-propanol (60:40, flow rate 1 mL/min), total run time 100 min, multiple DAD λ absorbance signals measured in the range of 210-280 nm, RT 78.730 min, purity>95%, de>99% (absorbance at 230 nm).

¹H NMR (400 MHz, CDCl₃) δ 9.17 (s, 1H), 7.98 (s, 1H), 7.65 (d, J=8.0 Hz, 1H), 7.59-7.35 (m, 3H), 7.29 (d, J=7.5 Hz, 1H), 7.14 (t, J=7.5 Hz, 1H), 6.82 (s, 1H), 6.43 (d, J=8.5 Hz, 1H), 4.57 (d, J=9.4 Hz, 1H), 4.39 (s, 2H), 4.31 (dt, J=13.9, 6.7 Hz, 1H), 4.02 (d, J=10.8 Hz, 1H), 3.81 (d, J=11.4 Hz, 1H), 3.15 (s, 1H), 2.82 (ddd, J=39.5, 26.2, 13.0 Hz, 3H), 2.51 (d, J=12.1 Hz, 1H), 2.20 (t, J=12.0 Hz, 1H), 1.26 (br s, 2H), 1.15 (d, J=6.6 Hz, 3H), 0.94-0.83 (m, 1H), 0.22 (d, J=5.4 Hz, 1H); Analytical HPLC for FOB01-59B: column Chiralpak AD-H (4.6 mm×250 mm; particle size 5 μm), elution with n-hexane:2-propanol (60:40, flow rate 1 mL/min), total run time 100 min, multiple DAD λ absorbance signals measured in the range of 210-280 nm, RT 82.436 min, purity>99%, de>99% (absorbance at 230 nm). ¹H NMR (400 MHz, CDCl₃) δ 9.19 (s, 1H), 8.08 (s, 1H), 7.67 (d, J=8.1 Hz, 1H), 7.46 (dd, J=15.8, 8.4 Hz, 3H), 7.30 (d, J=7.5 Hz, 1H), 7.15 (t, J=7.6 Hz, 1H), 7.01 (s, 1H), 6.49 (d, J=8.5 Hz, 1H), 4.63 (d, J=10.5 Hz, 1H), 4.46 (s, 2H), 4.26 (dd, J=14.4, 7.0 Hz, 1H), 3.97 (d, J=12.0 Hz, 1H), 3.72 (d, J=11.3 Hz, 1H), 2.98-2.83 (m, 3H), 2.78 (t, J=12.1 Hz, 1H), 2.58 (t, J=11.3 Hz, 1H), 2.21 (t, J=11.9 Hz, 1H), 1.26 (br s, 1H), 1.17 (d, J=6.8 Hz, 3H), 1.14 (br s, 1H), 0.87 (d, J=5.8 Hz, 1H), 0.21 (d, J=5.3 Hz, 1H). [α] values for compounds FOB01-59A and FOB01-59B were not determined.

trans-N-((2-(((2S,5S)-2-(6-aminopyridin-3-yl)-5-methylmorpholino)methyl)cyclopropyl)methyl)-1H-indole-2-carboxamide (AB05-27) Compound AB05-27 was synthesized following the same procedure described for FOB01-60, starting from the AB04-85B (30.0 mg, 0.16 mmol) and FOB01-58 (37.6 mg, 0.16 mmol) to yield 35.0 mg of the final product as a colorless oil, in 52% yield. ¹H NMR (400 MHz, CDCl₃) δ 10.34 (s, 1H, 50% isomer), 10.05 (s, 1H, 50% isomer), 8.10 (s, 1H, 50% isomer), 7.88 (d, J=6.7 Hz, 1H, 50% isomer), 7.67 (t, J=8.0 Hz, 2H), 7.43 (d, J=8.4 Hz, 1H), 7.32-7.19 (m, 2H), 7.11 (q, J=10.1, 9.4 Hz, 2H), 6.24 (d, J=8.6 Hz, 1H, 50% isomer), 6.03 (d, J=8.6 Hz, 1H, 50% isomer), 5.05 (br s, 2H), 4.66 (d, J=10.5 Hz, 1H, 50% isomer), 4.60 (d, J=10.5 Hz, 1H, 50% isomer), 4.16-3.83 (m, 2H), 3.72-3.62 (m, 1H), 3.47-3.27 (m, 2H), 3.10 (d, J=13.2 Hz, 1H, 50% isomer), 2.94 (dd, J=22.9, 12.5 Hz, 1H), 2.77 (s, 1H, 50% isomer), 2.69-2.49 (m, 1H), 2.32 (t, J=11.0 Hz, 1H, 50% isomer), 2.19 (d, J=11.3 Hz, 1H, 50% isomer), 1.26 (d, J=6.4 Hz, 3H, 50% isomer), 1.18 (d, J=7.0 Hz, 3H, 50% isomer), 1.14-0.79 (m, 2H), 0.65 (s, 1H), 0.52 (s, 1H). ¹³C NMR (101 MHz, CDCl₃) δ 161.73, 161.70, 158.29, 144.49, 144.24, 137.05, 136.94, 136.70, 136.59, 131.31, 131.13, 127.86, 127.82, 124.53, 124.42, 124.29, 123.73, 122.24, 122.18, 120.64, 120.51, 112.03, 112.00, 109.04, 108.94, 104.76, 103.90, 74.58, 74.45, 70.14, 58.29, 57.59, 51.97, 51.85, 51.75, 51.46, 43.48, 43.42, 29.85, 22.46, 19.12, 18.23, 14.07, 13.52, 10.09, 9.44, 9.28, 9.11. HRMS (ESI) $C_{24}H_{29}O_2N_5$+H⁺ calculated 420.23940, found 420.23976 (0.8 ppm). The racemic mixture was purified via preparative chiral HPLC (Chiralpak AD-H 21 mm×250 mm; 5 μm), eluting with n-hexane:2-propanol (from 70:30 up to 50:50, flow rate 25 mL/min) to yield two different fractions corresponding to the two enantiomers AB05-27A and AB05-27B. Analytical HPLC for AB05-27A: column Chiralpak AD-H (4.6 mm×250 mm; particle size 5 μm), elution with n-hexane:2-propanol (60:40, flow rate 1 mL/min), total run time 70 min, multiple DAD λ absorbance signals measured in the range of 210-280 nm, RT 37.316 min, purity>95%, de>99% (absorbance at 230 nm). ¹H NMR (400 MHz, CDCl₃) δ 9.22 (s, 1H), 8.07 (s, 1H), 7.65 (d, J=8.1 Hz, 1H), 7.43 (d, J=8.4 Hz, 2H), 7.30 (d, J=7.6 Hz, 1H), 7.15 (t, J=7.6 Hz, 1H), 6.83 (s, 1H), 6.43 (d, J=8.6 Hz, 1H), 6.37 (s, 1H), 4.46 (d, J=10.0 Hz, 1H), 4.40 (s, 2H), 3.87 (d, J=11.2 Hz, 1H), 3.69 (d, J=11.1 Hz, 1H), 3.39 (q, J=7.6 Hz, 2H), 2.97 (d, J=6.9 Hz, 1H), 2.69 (d, J=12.0 Hz, 1H), 2.60 (t, J=10.9 Hz, 1H), 2.39 (s, 2H), 1.26 (br s, 1H), 1.10-1.04 (m, 3H), 0.98 (br s, 1H), 0.57 (d, J=6.7 Hz, 1H), 0.45 (t, J=6.6 Hz, 1H). Analytical HPLC for AB05-27B: column Chiralpak AD-H (4.6 mm×250 mm; particle size 5 μm), elution with n-hexane:2-propanol (60:40, flow rate 1 mL/min), total run time 70 min, multiple DAD λ absorbance signals measured in the range of 210-280 nm, RT 42.160 min, purity 92.9%, de 89.4% (max absorbance at 230.4 nm). ¹H NMR (400 MHz, CDCl₃) δ 9.28 (s, 1H), 8.06 (s, 1H), 7.65 (d, J=8.1 Hz, 1H), 7.43 (d, J=8.3 Hz, 1H), 7.35 (d, J=8.4 Hz, 1H), 7.30 (d, J=7.6 Hz, 1H), 7.14 (t, J=7.6 Hz, 1H), 6.83 (s, 1H), 6.46 (s, 1H), 6.32 (d, J=8.4 Hz, 1H), 4.46 (d, J=9.9 Hz, 1H), 4.36 (s, 2H), 3.87 (d, J=11.3 Hz, 1H), 3.71 (d, J=11.1 Hz, 1H), 3.46 (dt, J=12.7, 5.9 Hz, 1H), 3.29 (dt, J=13.8, 6.7 Hz, 1H), 2.99 (d, J=7.3 Hz, 1H), 2.69 (d, J=11.9 Hz, 1H), 2.65-2.53 (m, 2H), 2.19 (dd, J=12.7, 7.4 Hz, 1H), 1.26 (s, 1H), 1.08 (d, J=6.6 Hz, 3H), 0.94 (d, J=6.8 Hz, 1H), 0.56 (dd, J=8.6, 4.8 Hz, 1H), 0.51-0.42 (m, 1H). [α] values for compounds AB05-27A and AB05-27B were not determined.

trans-N-((2-(((2R,5S)-2-(6-aminopyridin-3-yl)-5-methylmorpholino)methyl)cyclopropyl)methyl)-1H-indole-2-carboxamide (AB05-26) Compound AB05-26 was synthesized following the same procedure described for FOB01-60, starting from AB04-85A (30.0 mg, 0.16 mmol) and FOB01-58 (37.5 mg, 0.16 mmol) to yield 36.6 mg of the final product, as a colorless oil, in 54.5% yield. The mixture was additionally purified via preparative chiral HPLC (Chiralpak AD-H 21 mm×250 mm; 5 μm), eluting with n-hexane:2-propanol (from 70:30 up to 50:50, flow rate 25 mL/min) to yield the desired product as a 1:1.6 mixture of the two diastereoisomers. ¹H NMR (400 MHz, CDCl₃) δ 9.33 (s, 1H), 8.00 (d, J=16.4 Hz, 1H), 7.65 (d, J=8.2 Hz, 1H), 7.43 (d, J=8.4 Hz, 1H), 7.42-7.21 (m, 2H), 7.14 (t, J=7.6 Hz, 1H), 6.84 (d, J=27.7 Hz, 1H), 6.43 (d, J=59.1 Hz, 1H), 6.26 (dd, J=18.3, 8.5 Hz, 1H), 4.45 (d, J=10.6 Hz, 1H), 4.39 (s, 2H), 3.82 (t, J=10.0 Hz, 1H), 3.73 (s, 1H, 38% isomer), 3.49 (s, 1H, 62% isomer), 3.40 (t, J=11.4 Hz, 3H), 3.10 (t, J=13.5 Hz, 1H, 62% isomer), 2.90 (d, J=13.6 Hz, 1H, 38% isomer), 2.65 (dd, J=13.2, 6.7 Hz, 1H, 38% isomer), 2.48 (s, 1H, 62% isomer), 2.30 (t, J=11.0 Hz, 2H, 62% isomer), 2.09 (dd, J=15.0, 8.4 Hz, 2H, 38% isomer), 1.21 (d, J=5.9 Hz, 3H, 38% isomer), 1.01 (d, J=6.0 Hz, 3H, 62% isomer), 0.92 (br s, 2H), 0.56 (d, J=19.1 Hz, 1H), 0.42 (s, 1H); ¹³C NMR (101 MHz, CDCl₃) δ 161.58, 158.24, 146.41, 146.36, 136.34, 136.26, 130.91, 130.82, 127.86, 125.97, 124.65, 122.11, 120.85, 120.83, 112.06, 112.05, 108.34, 102.11, 102.00, 92.67, 73.37, 59.04, 58.90, 57.43, 57.33, 54.81, 43.71, 19.07, 17.42, 15.13, 15.01, 14.51, 14.21, 10.93, 9.11. HRMS (ESI) $C_{24}H_{29}O_2N_5$+H⁺ calculated 420.23940, found 420.23979 (0.9 ppm). Analytical HPLC for trans-AB05-26: column Chiralpak AD-H (4.6 mm×250 mm; particle size 5 μm), elution with n-hexane:2-propanol (60:40, flow rate 1 mL/min), total run time 170 min, multiple DAD λ absorbance signals measured in the range of 210-280 nm, RT 66.064 min, purity>99% (absorbance at 230 nm).

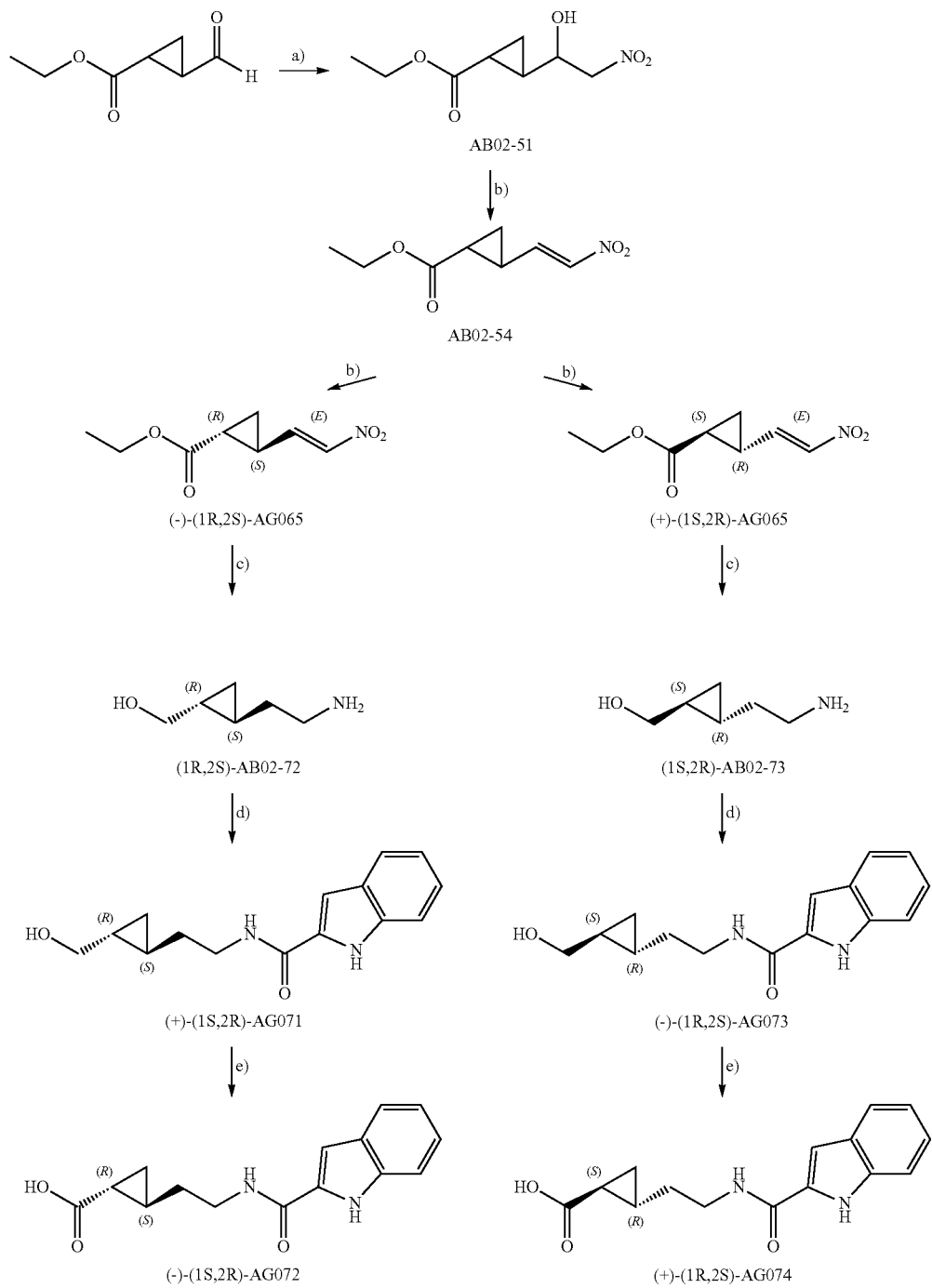

Scheme 7.

a) CH₃NO₂, t-BuOLi, t-BuOH/THF, 0° C. to RT;
b) MsCl, TEA, DCM, 0° C. to RT, followed by preparative chiral HPLC resolution;
c) LAH, THF, 0° to reflux;
d) EDC, HOBt, DIPEA, THF, 0° C. to RT;
e) Dess-Martin periodinane, DCM, RT.

Enantiomeric resolution of Racemic Nitro-Olefin Intermediate (±)-AG065. Chiral HPLC separation was performed on the racemic mixture, synthesized as previously reported, using an Agilent system coupled with UV-Vis/DAD (Diode Array Detector). Separation of the analyte, purity and enantiomeric excess determinations were achieved at 40° C. using Chiralcel OZ-H (Daicel Corporation CPI Company) column (20 mm×250 mmL, 5 μm). The mobile phase used (10 mL/min flow rate) was composed of 10% 2-propanol in hexanes with isocratic elution. The total run time was 60 min, eluting first (−)-(1R,2S)-AG065 [α]$_D^{23}$: −224.76 (0.860 g/100 mL in MeOH), followed by (+)-(1S,2R)-

AG065 [α]$_D^{23}$: +208.94 (0.760 g/100 mL in MeOH) with a separation time between peaks of approximately 2 minutes. Analytical HPLC for (−)-(1R,2S)-AG065: column Chiralcel OZ-H (4.6 mm×250 mm; particle size 5 μm), elution with n-hexane:2-propanol (90:10), total run time 40 min, RT 21.021 min, purity 96.1%, ee 92.3% (absorbance at 254 nm). Analytical HPLC for (+)-(1S,2R)-AG065: column Chiralcel OZ-H (4.6 mm×250 mm; particle size 5 μm), elution with n-hexane:2-propanol (90:10), total run time 40 min, RT 27.677 min, purity 97.1%, ee 94.2% (absorbance at 254 nm). Spectroscopic data for both enantiomers were identical to the racemic mixture.

(2-(2-aminoethyl)cyclopropyl)methanol ((1S,2R)-AB02-073). Lithium aluminum hydride (0.205 g, 5.40 mmol), as a mineral oil dispersion, was added to a vacuum purged round bottom flask, cooled on 0° C. ice bath, slowly suspended with the dropwise addition of anhydrous THF (10 mL) and stirred vigorously for 1 hour. A solution of (+)-(1S,2R)-AG065 (0.33 g, 1.80 mmol) in anhydrous THF (10 mL) was then added dropwise to the stirring suspension over 15 minutes. Upon completion of the addition, reaction flask was removed from the ice bath and allowed to gradually warm to room temperature overnight with constant stirring. Upon completion, reaction was again cooled to 0° C. on ice bath and subsequently quenched with the dropwise addition of a 1:1 mixture of MeOH/2N aqueous NaOH. Precipitated solids were then filtered and washed repeatedly with ethyl acetate, collecting and concentrating the resultant filtrate under vacuo to afford the crude amino alcohol product without further purification (0.189 g/92% yield).

N-(2-(2-(hydroxymethyl)cyclopropyl)ethyl)-1H-indole-2-carboxamide ((−)-(1R,2S)-AG073). To a well stirring solution of indole-2-carboxylic acid (0.307 g, 1.9 mmol) dissolved in anhydrous THF (10 mL), cooled to 0° C. on ice bath, and under inert atmosphere, was added EDC hydrochloride (0.416 g, 2.10 mmol) and HOBt (0.281 g, 2.00 mmol) together as a single portion. Reaction mixture was subsequently removed from ice and allowed to stir, warming to room temperature over the following hour. (1S,2R)-AB02-073 (0.200 g, 1.70 mmol) was dissolved in anhydrous THF (15 mL) and then added dropwise into the vigorously stirring solution. N,N-Diisopropylethylamine (0.297 g, 0.401 mL, 2.30 mmol) was then added via syringe as a single portion and the reaction allowed to proceed at room temperature over the following 4 hours. Upon reaction completion, solvent was evaporated under vacuo and the crude material was purified by Combiflash chromatography, eluting in 75% EtOAc/Hexanes to afford the desired product as a pale viscous yellow oil (0.075 g/16.7% yield). $^1$H NMR (400 MHz, CDCl$_3$) 9.58 δ (s, 1H), 7.61 (dd, J=8.4, 0.8 Hz, 1H), 7.40 (dd, J=8.4, 0.8 Hz, 1H), 7.27-7.23 (m, 1H), 7.12-7.08 (m, 1H), 7.06 (bt, J=5.2 Hz, 1H), 6.97 (dd, J=2.0, 0.8 Hz, 1H), 3.98-3.88 (m, 2H), 3.38-3.32 (m, 1H), 3.19 (bs, 1H), 1.99-1.93 (m, 2H), 1.12-1.03 (m, 1H), 0.97-0.90 (m, 1H), 0.71-0.65 (m, 1H), 0.43-0.34 (m, 2H); $^{13}$C NMR (100 MHz, CDCl$_3$) δ 162.1, 136.3, 130.9, 127.6, 124.4, 121.9, 120.5, 112.0, 102.5, 67.1, 39.8, 34.0, 20.9, 16.0, 9.0. GC-MS (EI) m/z 258.1 (M+). [α]$_D^{23}$: −38.378 (0.185 g/100 mL in MeOH). Analytical HPLC column Chiralcel OZ-H (4.6 mm×250 mm; particle size 5 μm), elution with n-hexane:2-propanol (from 90:10 up to 70:30), total run time 40 min, RT 26.135 min, ee 88.5% (absorbance at 254 nm).

N-(2-(2-formylcyclopropyl)ethyl)-1H-indole-2-carboxamide ((+)-(1R,2S)-AG074). To a well stirring solution of (−)-(1R,2S)-AG073 (0.075 g, 0.29 mmol) in anhydrous DCM (10 mL) and under inert atmosphere, was added Dess-Martin Periodinane (0.142 g, 0.33 mmol) as a single portion. Reaction was then allowed to proceed at room temperature over the following 1.5 hours with vigorous stirring. Upon completion, reaction mixture was diluted with additional DCM (50 mL) and decanted to separatory funnel, wherein the organic phase was washed repeatedly with 10 mL portions of an aqueous 10% NaHCO$_3$ solution. Organic phase was then dried over anhydrous Na$_2$SO$_4$, filtered and concentrated under vacuo to afford the crude product as a viscous red oil. Crude material was subsequently purified by Combiflash chromatography, eluting in 50% EtOAc/Hexanes to afford the desired product as a pale white solid (0.035 g/47% yield). $^1$H NMR (400 MHz, CDCl$_3$) δ 9.54 (s, 1H), 9.08 (d, J=5.2 Hz, 1H), 7.64 (dd, J=8.4, 0.8 Hz, 1H), 7.44 (dd, J=8.4, 0.8 Hz, 1H), 7.29 (dd, J=7.0, 0.8 Hz, 1H), 7.15-7.11 (m, 1H), 6.85 (m, 1H), 6.46 (bt, J=5.2 Hz, 1H), 3.59 (dd, J=12.8, 7.0 Hz, 2H), 1.76-1.68 (m, 3H), 1.58-1.53 (m, 1H), 1.37-1.32 (m, 1H), 1.02-0.98 (m, 1H); $^{13}$C NMR (100 MHz, CDCl$_3$) δ 200.7, 161.8, 136.3, 130.5, 127.6, 124.6, 121.9, 120.7, 112.0, 102.0, 39.3, 32.8, 29.9, 20.2, 14.6. [α]$_D^{23}$: +22.58 (0.124 g/100 mL in MeOH).

(2-(2-aminoethyl)cyclopropyl))methanol ((1R,2S)-AB02-072). Compound was prepared following the synthetic procedure described for (1S,2R)-AB02-073, starting from (−)-(1R,2S)-AG065.

N-(2-(2-(hydroxymethyl)cyclopropyl)ethyl)-1H-indole-2-carboxamide ((+)-(1S,2R)-AG071). Compound was prepared following the synthetic procedure described for (−)-(1R,2S)-AG073, starting from (1R,2S)-AB02-072 (0.130 g, 1.10 mmol). Upon reaction completion, solvent was evaporated under vacuo and the crude material was purified by Combiflash chromatography, eluting in 75% EtOAc/Hexanes to afford the desired product as a pale viscous yellow oil (0.065 g/22% yield). $^1$H NMR (400 MHz, CDCl$_3$) 9.58 δ (s, 1H), 7.61 (dd, J=8.4, 0.8 Hz, 1H), 7.40 (dd, J=8.4, 0.8 Hz, 1H), 7.27-7.23 (m, 1H), 7.12-7.08 (m, 1H), 7.06 (bt, J=5.2 Hz, 1H), 6.97 (dd, J=2.0, 0.8 Hz, 1H), 3.98-3.88 (m, 2H), 3.38-3.32 (m, 1H), 3.19 (bs, 1H), 1.99-1.93 (m, 2H), 1.12-1.03 (m, 1H), 0.97-0.90 (m, 1H), 0.71-0.65 (m, 1H), 0.43-0.34 (m, 2H); $^{13}$C NMR (100 MHz, CDCl$_3$) δ 162.1, 136.3, 130.9, 127.6, 124.4, 121.9, 120.5, 112.0, 102.5, 67.1, 39.8, 34.0, 20.9, 16.0, 9.0. GC-MS (EI) m/z 258.1 (M+). [α]$_D^{23}$: +42.258 (0.310 g/100 mL in MeOH). Analytical HPLC column Chiralcel OZ-H (4.6 mm×250 mm; particle size 5 μm), elution with n-hexane:2-propanol (from 90:10 up to 70:30), total run time 60 min, RT 19.654 min, ee 88.5% (absorbance at 254.4 nm).

N-(2-(2-formylcyclopropyl)ethyl)-1H-indole-2-carboxamide ((−)-(1S,2R)-AG072). Compound was prepared following the synthetic procedure described for (+)-(1R,2S)-AG074, starting from (+)-(1S,2R)-AG071 (0.065 g, 0.26 mmol). Crude material was purified by Combiflash chromatography, eluting in 50% EtOAc/Hexanes to afford the desired product as a pale white solid (0.45 g/68% yield). $^1$H NMR (400 MHz, CDCl$_3$) δ 9.54 (s, 1H), 9.08 (d, J=5.2 Hz, 1H), 7.64 (dd, J=8.4, 0.8 Hz, 1H), 7.44 (dd, J=8.4, 0.8 Hz, 1H), 7.29 (dd, J=7.0, 0.8 Hz, 1H), 7.15-7.11 (m, 1H), 6.85 (m, 1H), 6.46 (bt, J=5.2 Hz, 1H), 3.59 (dd, J=12.8, 7.0 Hz, 2H), 1.76-1.68 (m, 3H), 1.58-1.53 (m, 1H), 1.37-1.32 (m, 1H), 1.02-0.98 (m, 1H); $^{13}$C NMR (100 MHz, CDCl$_3$) δ 200.7, 161.8, 136.3, 130.5, 127.6, 124.6, 121.9, 120.7, 112.0, 102.0, 39.3, 32.8, 29.9, 20.2, 14.6. [α]$_D^{23}$: −30.352 (0.425 g/100 mL in MeOH).

Scheme 8.
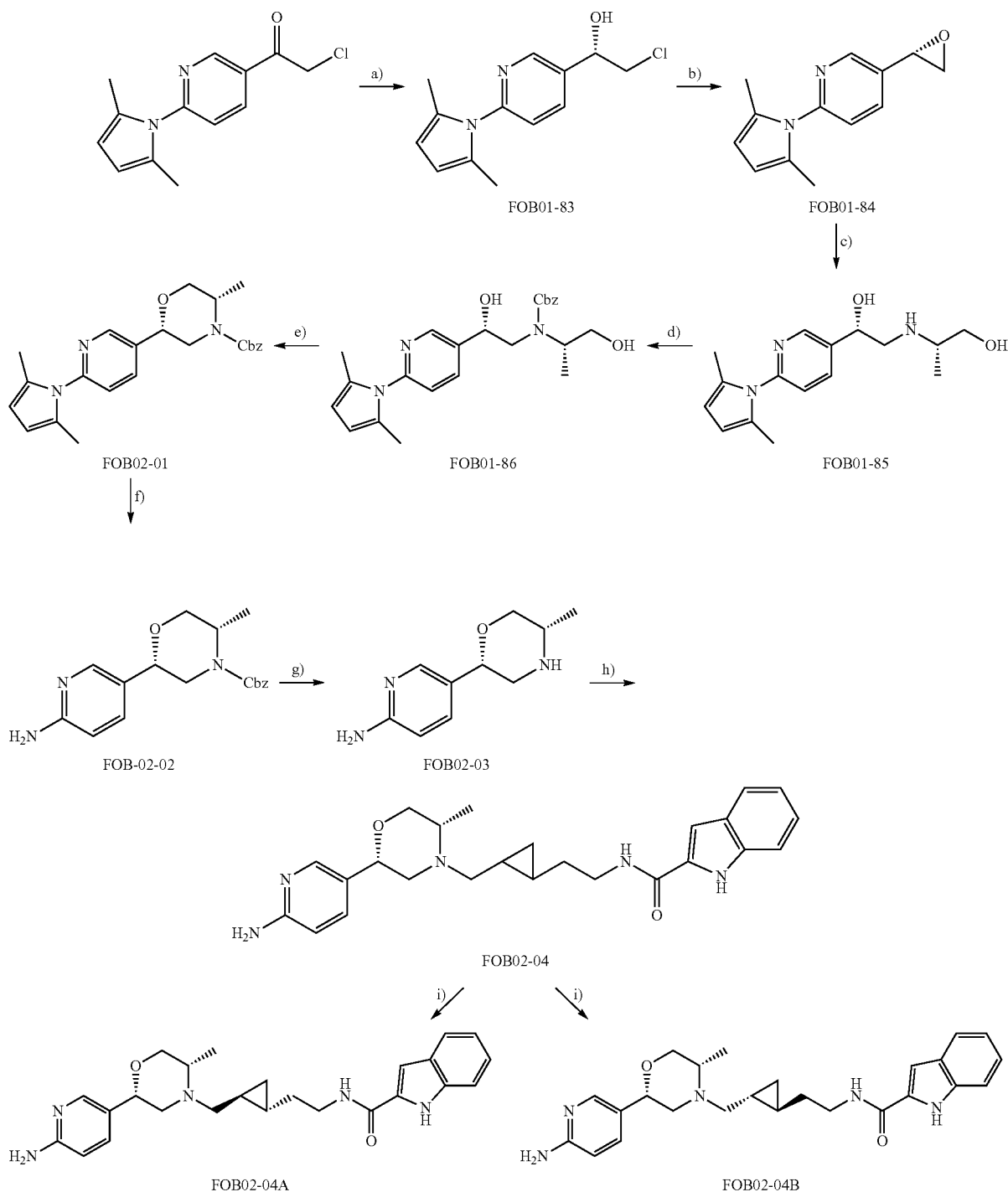
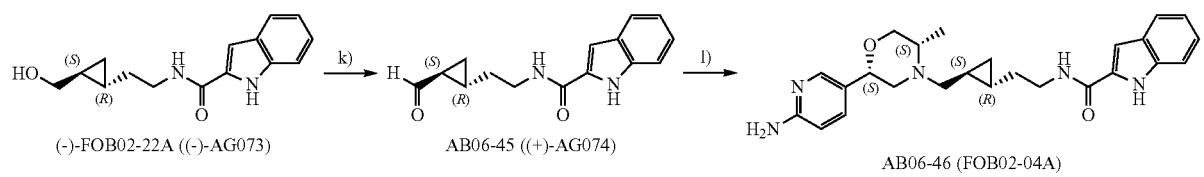

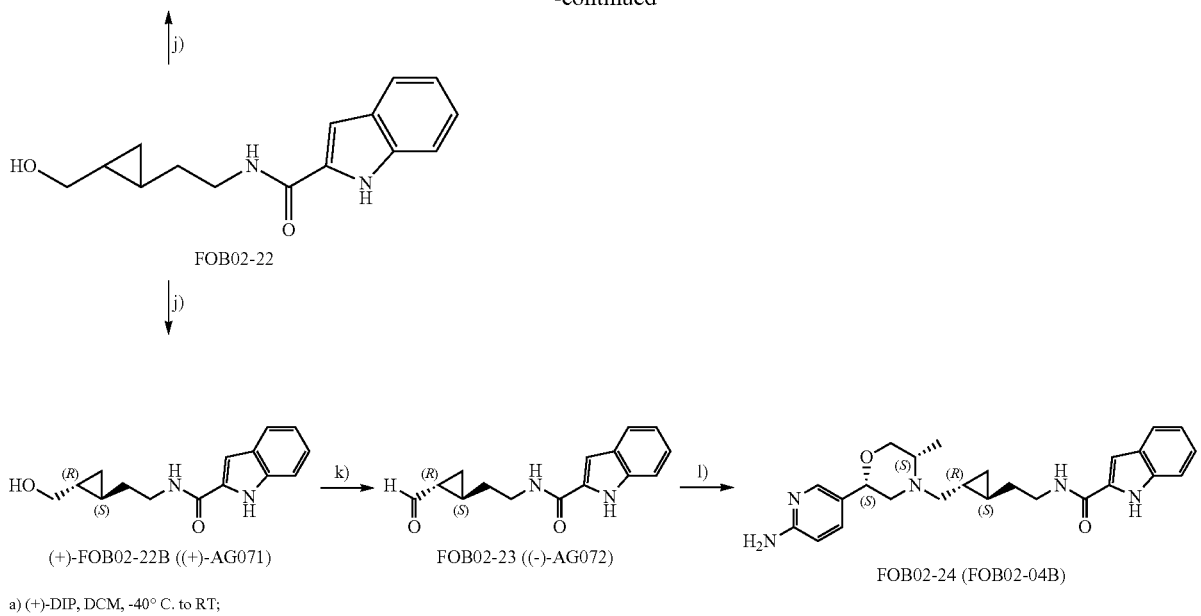

(+)-FOB02-22B ((+)-AG071)   FOB02-23 ((−)-AG072)   FOB02-24 (FOB02-04B)

a) (+)-DIP, DCM, -40° C. to RT;
b) K₂CO₃, ACN, reflux;
c) (S)-2-aminopropan-1-ol, toluene, reflux;
d) N-(Benzyloxycarbonyloxy)succinimide, THF, -40° C. to RT;
e) DIAD, PPh₃, THF, RT;
f) hydroxylamine hydrochloride (NH₂OH•HCl), EtOH, reflux;
g) H₂ (50 psi), Pd/C;
h) cat. AcOH, Na(OAc)₃BH, N-(2-(2-formylcyclopropyl)ethyl)-1H-indole-2-carboxamide, DCE;
i) Chiral resolution via preparative chiral HPLC — ADH.
j) Chiral-resolution via preparative chiral HPLC — ADH;
k) Dess-Martin periodinane (DMP), DCM, 0° C. to RT;
l) FOB02-03, cat. AcOH, Na(OAc)₃BH.

(S)-2-chloro-1-(6-(2,5-dimethyl-1H-pyrrol-1-yl)pyridin-3-yl)ethan-1-ol (FOB-01-83) In a round bottom flask covered in aluminum foil, (+)-B-Chlorodiisopinocampheylborane ((+)-DIP-C$_l$) (3.37 g, 10.5 mmol) was weighed quickly and with limited exposure to light, dissolved with tBuOMe/THF (3:7, 10 mL), placed under an argon atmosphere and subsequently cooled to −40° C. in a dry ice/acetonitrile bath. Compound 2-chloro-1-(6-(2,5-dimethyl-1H-pyrrol-1-yl)pyridin-3-yl)ethan-1-one (2.06 g, 8.2 mmol) was then dissolved in THF (4 mL) and added dropwise to the solution of (+)-DIP-C$_l$. The reaction was allowed to stir overnight, slowly warming to room temperature. The reaction completion was monitored via thin layer chromatography (TLC) and GC/MS, then 30 mL of saturated NH₄Cl aqueous solution were added to the reaction mixture and allowed to stir for 1 hour at room temperature. The organic phase was collected, and the aqueous layer was extracted with EtOAc (3×25 mL). The combined organic layers were washed with brine, dried with Na₂SO₄, filtered and the solvent was removed under reduced pressure. The crude residue was purified via flash chromatography, eluting with hexanes/EtOAc (75:25), to yield 2.07 g of the desired compound as a yellow oil, in 78.6% yield. Spectroscopic data was concurrent with the previously reported ones. GC/MS (EI) RT 10.785 min, 250.1 m/z. HPLC column Chiralcel OZ-H (4.6 mm×250 mm; particle size 5 μm), elution with n-hexane:2-propanol (from 90:10 up to 80:20, flow rate 1 mL/min), total run time 50 min, RT 18.163 min, purity>95%, ee>99% (absorbance at 230 nm). $[\alpha]_D^{23}$: +23.3 (0.645 g/100 mL in CHCl₃). Enantiomeric excess and absolute configuration were confirmed via HPLC comparison (same HPLC methods described above) with the (R)-enantiomer (RT 13.056 min, purity 94.7%, ee 90.3%), re-synthesized, as standard, using (−)-DIP-Cl as previously reported.[39] $[\alpha]_D^{23}$: −21.1 (0.620 g/100 mL in CHCl₃).

(S)-2-(2,5-dimethyl-1H-pyrrol-1-yl)-5-(oxiran-2-yl)pyridine (FOB-01-84) Compound FOB-01-83 (2.06 g, 0.0082 moles) was dissolved in acetonitrile (200 mL), anhydrous K₂CO₃ was added to the solution, (21.3 g, 0.154 moles) and it was stirred overnight at reflux. The reaction mixture was allowed to cool to room temperature and the suspension was filtered. The solvent was removed under reduced pressure to yield 1.59 g of the desired compound as a brown oil, which was used in the next step without further purification. GC/MS (EI) RT 9.672 min, 214.1 m/z.

(S)-2-(((S)-2-(6-(2,5-dimethyl-1H-pyrrol-1-yl)pyridin-3-yl)-2-hydroxyethyl)amino)propan-1-ol (FOB-01-85) Compound FOB01-84 (1.59 g, 7.39 mmol) was dissolved in 150 mL of toluene and the solution was stirred to homogeneity. (S)-2-aminopropan-1-ol (2.77 g, 36.9 mmol) was added to the solution and the reaction mixture was then heated to reflux and stirred overnight. The reaction was cooled to room temperature and the solvent removed under reduced pressure. The crude residue was dissolved in DCM (30 mL), and washed with of water (5 mL). The organic phase was dried with Na₂SO₄, filtered, and evaporated. The crude material was purified via flash chromatography with gradient elution, increasing the polarity of the mobile phase up to 20% DMA (DCM:MeOH+0.5% NH₄OH), to yield 450 mg of the desired compound as an off-white solid, in 21% yield. ¹H NMR (400 MHz, CDCl₃+CD₃OD) δ 8.58 (s, 1H), 7.87 (d, J=8.5 Hz, 1H), 7.22 (d, J=8.4 Hz, 1H), 5.89 (s, 2H), 4.81

(d, J=9.5 Hz, 1H), 3.66 (d, J=10.8 Hz, 1H), 3.4 (t, J=9.4 Hz, 1H), 2.99 (d, J=12.1 Hz, 1H), 2.87 (dt, J=21.7, 10.3 Hz, 2H), 2.11 (s, 6H), 1.47 (d, J=6.6 Hz, 3H).

Benzyl ((S)-2-(6-(2,5-dimethyl-1H-pyrrol-1-yl)pyridin-3-yl)-2-hydroxyethyl)((S)-1-hydroxypropan-2-yl)carbamate (FOB-01-86) Compound FOB-01-85 (0.450 g, 1.55 mmol) was dissolved in 25 mL of anhydrous tetrahydrofuran and subsequently cooled to −40° C. with a cryo-cooler. In a separate vial, a solution of N-(Benzyloxycarbonyloxy)succinimide in anhydrous tetrahydrofuran (0.465 g, 1.87, 0.2 M) was prepared and transferred dropwise into the reaction flask. Upon completion of the N-(Benzyloxycarbonyloxy)succinimide solution addition, the cryo-cooler was powered off to allow the reaction mixture to slowly reach room temperature. Following overnight stirring at room temperature, an additional equivalent of N-(Benzyloxycarbonyloxy)succinimide (0.386 g, 1.55 mmol) was added to the reaction mixture and the reaction stirred at room temperature for an additional 2 hrs. The reaction was quenched with the addition of saturated $NaHCO_3$ aqueous solution (25 mL) and methanol (20 mL) and stirred at room temperature for 1 hr. The organic solvents were removed under reduced pressure and the remaining aqueous layer was extracted with DCM (3×30 mL). The combined organic layers were dried with $Na_2SO_4$, filtered and evaporated under reduced pressure. The crude material was partially purified via flash chromatography, gradually increasing the mobile phase polarity up to hexanes/EtOAc (4:6), to yield 505 mg of the desired product as a colorless oil, in 76.9% yield.

Benzyl (2S,5S)-2-(6-(2,5-dimethyl-1H-pyrrol-1-yl)pyridin-3-yl)-5-methylmorpholine-4-carboxylate (FOB02-01) Triphenylphosphine (TPP) (0.38 g, 1.44 mmol) and FOB01-86 (0.500 g, 1.20 mmol) were dissolved in toluene (20 mL). The solution was stirred at room temperature while diisopropyl azodicarboxylate (DIAD) (0.28 mL, 1.44 mmol) was added dropwise. The reaction mixture was then stirred for 20 hrs at room temperature. The reaction mixture was evaporated under reduced pressure and the crude residue was purified via flash chromatography, gradually increasing the mobile phase polarity up to hexanes/EtOAc (8:2), to yield 363 mg of the desired product as a colorless viscous oil, in 74.6% yield. $^1$H NMR (400 MHz, $CDCl_3$+$CD_3OD$) δ 8.61 (d, J=12.4 Hz, 1H), 7.86 (d, J=8.3 Hz, 1H), 7.38 (br s, 5H), 7.23 (d, J=8.5 Hz, 1H), 5.90 (s, 2H), 5.19 (d, J=9.8 Hz, 2H), 5.11-4.96 (m, 1H), 4.37-3.99 (m, 2H), 3.89 (d, J=15.6 Hz, 2H), 3.32-2.96 (m, 1H), 2.12 (s, 6H), 1.32 (d, J=5.8 Hz, 3H).

Benzyl (2S,5S)-2-(6-aminopyridin-3-yl)-5-methylmorpholine-4-carboxylate (FOB02-02) Compound FOB02-01 (0.363 g, 0.895 mmol) was dissolved in 10 mL of ethanol, hydroxylamine hydrochloride (0.522 g, 7.52 mmol) was then added to the solution in one portion, and the reaction mixture was heated to reflux. After 4 hrs, additional 8 equivalents of hydroxylamine hydrochloride were added to the flask and the reaction mixture was allowed to stir at reflux overnight. The solvent was removed under reduced pressure, the crude mixture was dissolved in DCM, and washed with saturated $NaHCO_3$ aqueous solution. The organic phase was dried with $Na_2SO_4$, filtered, and evaporated. The crude mixture was purified via flash chromatography, eluting with 2% DMA ($DCM:MeOH+1\% NH_4OH$), to yield desired product as a purple oil, in quantitative yield. $^1$H NMR (400 MHz, $CDCl_3$) δ 8.05 (d, J=9.8 Hz, 1H), 7.47 (d, J=8.6 Hz, 1H), 7.35 (d, J=9.4 Hz, 5H), 6.49 (d, J=8.5 Hz, 1H), 5.16 (d, J=10.8 Hz, 2H), 5.09-5.01 (m, 1H), 4.51 (s, 2H), 4.38-4.11 (m, 2H), 3.81 (d, J=16.1 Hz, 2H), 3.06 (dt, J=25.5, 12.3 Hz, 1H), 1.32 (d, J=6.2 Hz, 3H).

5-((2S,5S)-5-methylmorpholin-2-yl)pyridin-2-amine (FOB02-03) Compound FOB02-02 (0.320 g, 0.977 mmol) was dissolved in 30 mL of ethanol and added to a hydrogenation flask, followed by the addition of Pearlman's catalyst ($Pd(OH)_2$/C 20 wt. %, 0.350 g, 0.498 mmol). The reaction mixture was charged and shaken in a Parr apparatus under 50 psi of hydrogen gas atmosphere. The reaction was allowed to proceed for 1 hr. The reaction mixture was subsequently filtered through a wet celite plug, rinsed with ethanol, and evaporated to yield 75 mg of the desired product as a white solid, in 39.7% yield. All the spectroscopic and HPLC data were consistent with the ones described for AB04-85B. GC/MS (EI) RT 9.533 min, 207.0 m/z. HPLC column Chiralcel OD-H (4.6 mm×250 mm; particle size 5 μm), elution with n-hexane:2-propanol (90:10 flow rate 1 mL/min), total run time 60 min, multiple DAD λ absorbance signals measured in the range of 210-280 nm, RT 31.552 min, purity 94.5%, de>99% (absorbance at 230.4 nm). Diastereomeric excess was determined via HPLC comparison (same HPLC method described above) with the (R,S)-diastereoisomer AB04-85A previously described (RT 37.332 min, purity>99, ee>99%).

trans-N-(2-(2-(((2S,5S)-2-(6-aminopyridin-3-yl)-5-methylmorpholino)methyl)cyclopropyl)ethyl)-1H-indole-2-carboxamide (FOB-02-04) N-(2-(2-formylcyclopropyl)ethyl)-1H-indole-2-carboxamide was added to a solution of FOB02-03 (0.075 g, 0.388 mmol) in 1,2-dichloroethane (50 mL). Catalytic amount of glacial acetic acid was added to the stirring solution, and the reaction mixture was allowed to stir for 30 minutes at room temperature before adding sodium triacetoxyborohydride (0.123 g, 0.582 mmol) in one portion. The reaction was stirred for an additional 30 minutes at room temperature, after which the solvent was removed under reduced pressure. The crude mixture was purified via flash chromatography, gradually increasing the mobile phase polarity from 100% DCM to 10% DMA ($DCM:MeOH+0.5\% NH_4OH$)) to afford 150 mg of the desired product as a 50:50 diastereomeric mixture, as an off-white solid, in 89.2% yield. $^1$H NMR (400 MHz, $CDCl_3$) δ 9.61 (s, 1H, 50% isomer), 9.57 (s, 1H, 50% isomer), 8.06 (d, J=8.7 Hz, 1H), 7.64 (d, J=8.1 Hz, 1H), 7.45 (t, J=7.6 Hz, 2H), 7.32-7.23 (m, 2H), 7.13 (t, J=7.6 Hz, 1H), 6.94 (s, 1H, 50% isomer), 6.87 (s, 1H, 50% isomer), 6.47 (d, J=8.4 Hz, 1H), 4.62 (br s, 2H), 4.50 (d, J=10.0 Hz, 1H), 3.94 (t, J=11.6 Hz, 1H), 3.72 (t, J=9.1 Hz, 1H), 3.66-3.47 (m, 2H), 3.03 (d, J=31.6 Hz, 1H), 2.75 (d, J=12.5 Hz, 1H), 2.60 (dt, J=21.5, 11.0, Hz, 1H), 2.47 (dd, J=12.6, 6.2 Hz, 1H, 50% isomer), 2.34 (t, J=9.7 Hz, 1H, 50% isomer), 2.22 (dd, J=12.7, 7.5 Hz, 1H, 50% isomer), 2.10 (s, 1H, 50% isomer), 1.70-1.49 (m, 2H), 1.11 (dd, J=1.6, 6.66, 3H), 0.71 (d, J=36.6 Hz, 2H), 0.43 (t, J=7.0 Hz, 2H); $^{13}$C NMR (400 MHz, $CDCl_3$) δ 161.75, 161.72, 158.28, 158.25, 146.23, 146.15, 136.75, 136.43, 131.20, 131.10, 127.82, 126.13, 124.60, 124.54, 122.02, 120.81, 120.76, 112.10, 108.66, 108.59, 102.45, 102.05, 75.89, 75.55, 71.93, 71.58, 58.84, 53.15, 52.82, 52.17, 51.91, 39.85, 39.82, 33.86, 33.72, 22.21, 16.50, 16.18, 15.37, 11.52, 10.78, 8.63, 8.53. HPLC column Chiralpack AD-H (4.6 mm×250 mm; particle size 5 μm), elution with n-hexane:2-propanol (50:50 flow rate 1 mL/min), total run time 60 min, multiple DAD λ absorbance signals measured in the range of 210-280 nm, RT 21.873 min and 36.176, purity>95%, dr 50:50 (absorbance at 230 nm). The free base was converted into the corresponding oxalate salt. HRMS (ESI) $C_{25}H_{31}O_2N_5$+$H^+$ calculated 434.25505, found 434.25604 (2.3 ppm). CHN Anal ($C_{25}H_{31}N_5O_2 \cdot 2H_2C_2O_4 \cdot H_2O$) calculated C, 55.15; H, 5.90; N, 11.09. found C, 55.55; H, 5.75; N, 11.12. About 50 mg the oxalate salt were free-based and the diastereomeric mixture was separated via preparative chiral HPLC (Chiralpak AD-H 21 mm×250 mm; 5 μm), eluting with n-hexane:2-propanol (from 40:60 up to 50:50, flow rate 20 mL/min) to yield two different fractions corresponding to the two diastereoisomers (FOB-02-04A) N-(2-((1R,2S)-2-(((2S,5S)-2-(6-aminopyridin-3-yl)-5-methylmorpholino)methyl)cyclopropyl)ethyl)-1H-indole-2-carboxamide and (FOB-02-04B) N-(2-((1S,2R)-2-(((2S,5S)-2-(6-aminopyridin-3-yl)-5-methylmorpholino)methyl)cyclopropyl)ethyl)-1H-indole-2-carboxamide. Analytical HPLC for FOB02-04A: column Chiralpak AD-H (4.6 mm×250 mm; particle size 5 μm), elution with n-hexane:2-propanol (50:50, flow rate 1 mL/min), total run time 60 min, multiple DAD λ absorbance signals measured in the range of 210-280 nm, RT 21.362 min, purity>99%, de>99% (absorbance at 230 nm). m.p. 83-84° C. with prior decomposition; $[\alpha]_D^{25}$: +17.8 (0.045 g/100 mL in MeOH). Analytical HPLC for FOB02-04B: column Chiralpak AD-H (4.6 mm×250 mm; particle size 5 μm), elution with n-hexane:2-propanol (50:50, flow rate 1 mL/min), total run time 70 min, multiple DAD λ absorbance signals measured in the range of 210-280 nm, RT 35.338 min, purity>95%, de>99% (absorbance at 230 nm). m.p. 63-64° C. with prior decomposition; $[\alpha]_D^{25}$: −14.3 (0.06 g/100 mL in MeOH).

(−)-N-(2-((1R,2S)-2-(hydroxymethyl)cyclopropyl)ethyl)-1H-indole-2-carboxamide (FOB02-22A) and (+)-N-(2-((1S,2R)-2-(hydroxymethyl)cyclopropyl)ethyl)-1H-indole-2-carboxamide (FOB02-22B). Racemic mixture trans-FOB02-22 was re-synthesized as previously described. The racemic mixture was separated via preparative chiral HPLC (Chiralpak AD-H 21 mm×250 mm; 5 μm), eluting with n-hexane:2-propanol (from 90:10 up to 80:20, flow rate 18 mL/min) to yield two different fractions corresponding to the two enantiomers (−)-FOB02-22A and (+)-FOB02-22B. Analytical HPLC for (−)-FOB02-22A, method A: column Chiralpak AD-H (4.6 mm×250 mm; particle size 5 μm), elution with n-hexane:2-propanol (from 90:10 up to 80:20, flow rate 1 mL/min), total run time 100 min, multiple DAD λ absorbance signals measured in the range of 210-280 nm, RT 35.599 min, purity 88.8%, ee 78.5% (absorbance at 214 nm); method B: column Chiralcel OZ-H (4.6 mm×250 mm; particle size 5 μm), elution with n-hexane:2-propanol (from 90:10 up to 70:30, flow rate 1 mL/min), total run time 60 min, multiple DAD λ absorbance signals measured in the range of 210-280 nm, RT 47.728 min, purity 89.5%, ee 79% (max absorbance at 214 nm). The results of the HPLC analysis performed on OZ-H column, matched with the analysis performed on the same (−)-(1R,2S)-AG073 resolved as described above. Spectroscopic data and optical rotation were consistent with the ones reported above for the same (−)-(1R,2S)-AG073. Analytical HPLC for (+)-FOB02-22B, method A: column Chiralpak AD-H (4.6 mm×250 mm; particle size 5 μm), elution with n-hexane:2-propanol (from 90:10 up to 80:20, flow rate 1 mL/min), total run time 100 min, multiple DAD λ absorbance signals measured in the range of 210-280 nm, RT 40.379 min, purity>95%, ee>99% (absorbance at 214 nm); method B: column Chiralcel OZ-H (4.6 mm×250 mm; particle size 5 μm), elution with n-hexane:2-propanol (from 90:10 up to 70:30, flow rate 1 mL/min), total run time 60 min, multiple DAD λ absorbance signals measured in the range of 210-280 nm, RT 33.440 min, purity>95%, ee>99% (absorbance at 214 nm). The results of the HPLC analysis performed on OZ-H column, matched with the analysis performed on the same (+)-(1S,2R)-AG071 resolved as described above. Spectroscopic data and optical rotation were consistent with the ones reported above for the same (+)-(1S,2R)-AG071.

(−)-N-(2-((1S,2R)-2-formylcyclopropyl)ethyl)-1H-indole-2-carboxamide (FOB02-23) Compound FOB02-23 was synthesized following the same procedure described for FOB01-57, starting from (+)-FOB-02-22B (62.20 mg, 0.24 mmol). Spectroscopic data and optical rotation were consistent with the ones reported above for the same (−)-(1S, 2R)-AG072.

N-(2-((1R,2S)-2-formylcyclopropyl)ethyl)-1H-indole-2-carboxamide (AB06-45) Compound AB06-45 was synthesized following the same procedure described for FOB01-57, starting from (−)-FOB02-22A (60 mg, 0.23 mmol). Spectroscopic data and optical rotation were consistent with the ones reported above for the same (+)-(1R,2S)-AG074.

N-(2-((1S,2R)-2-(((2S,5S)-2-(6-aminopyridin-3-yl)-5-methylmorpholino)methyl)cyclopropyl)ethyl)-1H-indole-2-carboxamide (FOB02-24) Compound FOB02-24 was synthesized following the same procedure described for FOB02-04, starting from FOB02-23 (3.20 mg, 0.02 mmol). Spectroscopic data were consistent with the ones obtained for FOB02-04 (reported above) and HPLC analyses, using FOB02-24 as standard, were identical to the results obtained for FOB02-04B (reported above), confirming the assigned absolute configuration. Analytical HPLC column Chiralpak AD-H (4.6 mm×250 mm; particle size 5 μm), elution with n-hexane:2-propanol (50:50, flow rate 1 mL/min), total run time 60 min, multiple DAD λ absorbance signals measured in the range of 210-280 nm, RT 35.991 min, purity>99%, ee>99% (absorbance at 230 nm).

N-(2-((1R,2S)-2-(((2S,5S)-2-(6-aminopyridin-3-yl)-5-methylmorpholino)methyl)cyclopropyl)ethyl)-1H-indole-2-carboxamide (AB06-46) Compound AB06-46 was synthesized following the same procedure described for FOB02-04, starting from AB06-45 (40 mg, 0.16 mmol). Spectroscopic data were consistent with the ones obtained for FOB02-04 and HPLC analyses, using AB06-46 as standard, were consistent to the results obtained for FOB02-04A, confirming the assigned absolute configuration. Analytical HPLC column Chiralpak AD-H (4.6 mm×250 mm; particle size 5 μm), elution with n-hexane:2-propanol (50:50, flow rate 1 mL/min), total run time 45 min, multiple DAD λ absorbance signals measured in the range of 210-280 nm, RT 20.626 min, purity>99%, ee>99% (absorbance at 230 nm).

All the synthesized compounds were tested in radioligand competition binding studies for on-target affinities (currently Table 1. and Table 2). The selected compounds were further evaluated for metabolic stability in rat liver microsomes and metabolite identification to assess their applicability in future rodents in vivo studies.

Radioligand Binding Data

The affinities of the synthesized compounds at hD2R and hD3R were tested by radioligand competition binding assays, using the agonist [$^3$H]—(R)-(+)-7-OH-DPAT as radiotracer. Competition against an agonist radioligand allows for a more accurate determination of affinities for novel unlabeled $D_2$-like agonists. Affinities of $D_2$-like agonists and partial agonists, when determined in competition against agonist radioligand probe, reflect the ability of binding the receptors in their "active" state. Well known $D_3R$ preferential agonists pramipexole, (+)-PD-128,907 and the diastereomeric mixture of PF592,379 (synthesized as reported in literature) were tested in parallel with the synthesized bitopic analogue compounds, and in the same assay's conditions, to allow a better comparison of affinities and receptor subtype selectivity.

TABLE 1

Binding affinity data for compounds derived from (+)-PD128,907 primary pharmacophore. Radioligand competition binding assays performed on HEK293 cells stably expressing hD$_2$R, hD$_3$R, and hD$_4$R in presence of [$^3$H]-(R)-(+)-7-OH-DPAT.

vs. [$^3$H]-(R)-(+)-7-OH-DPAT

| Compound | Structure | D$_2$R K$_i$ ± SEM [nM] | D$_3$R K$_i$ ± SEM [nM] | D$_4$R K$_i$ ± SEM [nM] | D$_2$R/D$_3$R | D$_4$R/D$_3$R |
|---|---|---|---|---|---|---|
| Pramipexole | | 11.1 ± 0.532 (n = 3) | 1.32 ± 0.200 (n = 5) | ND | 8.41 | ND |
| (+)-PD128,907 | | 20.5 ± 2.87 (n = 6) | 1.69 ± 0.0892 (n = 8) | 26.6 ± 3.97 (n = 4) | 12.1 | 15.7 |
| AB04-75 (nor-PD128,907) | | 4,250 ± 1,320 (n = 3) | 403 ± 5.55 (n = 3) | ND | 10.5 | ND |
| AB02-119 | | 2,510 ± 553 (n = 3) | 1,190 ± 151 (n = 3) | ND | 2.11 | ND |
| AB04-38 | | 10,100 ± 3,590 (n = 3) | 1,590 ± 30.9 (n = 3) | ND | 6.35 | ND |
| SLC01-24 | | 6,710 ± 741 (n = 3) | 806 ± 185 (n = 5) | ND | 8.33 | ND |
| SLC01-25 | | 3,860 ± 975 (n = 3) | 613 ± 50.6 (n = 3) | ND | 6.30 | ND |
| SLC01-26 | | 9,450 ± 3,130 (n = 3) | 6,010 ± 1,540 (n = 4) | ND | 1.57 | ND |
| SLC01-35 | | 5,510 ± 182 (n = 3) | 1,330 ± 263 (n = 3) | ND | 4.14 | ND |
| AB04-41 | | 9,160 ± 276 (n = 3) | 2,130 ± 402 (n = 3) | ND | 4.30 | ND |
| AB04-42 | | 27,000 ± 11,400 (n = 3) | 8,660 ± 3,660 (n = 3) | ND | 3.12 | ND |

TABLE 1-continued

Binding affinity data for compounds derived from (+)-PD128,907 primary pharmacophore. Radioligand competition binding assays performed on HEK293 cells stably expressing hD$_2$R, hD$_3$R, and hD$_4$R in presence of [$^3$H]-(R)-(+)-7-OH-DPAT.
vs. [$^3$H]-(R)-(+)-7-OH-DPAT

| Compound | Structure | D$_2$R K$_i$ ± SEM [nM] | D$_3$R K$_i$ ± SEM [nM] | D$_4$R K$_i$ ± SEM [nM] | D$_2$R/D$_3$R | D$_4$R/D$_3$R |
|---|---|---|---|---|---|---|
| SLC02-11 | (structure) | 6,260 ± 179 (n = 3) | 11,300 ± 1,070 (n = 3) | ND | 0.554 | ND |
| SLC02-16A | (structure) | 245 ± 32 (n = 3) | 354 ± 45.1 (n = 3) | ND | 0.710 | ND |
| SLC02-16B | (structure) | 1,430 ± 210 (n = 3) | 1,770 ± 241 (n = 3) | ND | 0.808 | ND |

Equilibrium dissociation constants (K$_i$) were derived from IC$_{50}$ values using the Cheng-Prusoff equation. Each K$_i$ value represents the arithmetic mean ± S.E.M;
n = number of independent experiments, each performed in triplicate.
ND = Not Determined.

TABLE 2

Binding affinity data for compounds derived from PF592,379 primary pharmacophore. Radioligand competition binding assays performed on HEK293 cells stably expressing hD$_2$R and hD$_3$R, in presence of [$^3$H]-(R)-(+)-7-OH-DPAT.
vs. [$^3$H]-(R)-(+)-7-OH-DPAT

| Compound | Structure | D$_2$R K$_i$ ± SEM [nM] | D$_3$R K$_i$ ± SEM [nM] | D$_4$R K$_i$ ± SEM [nM] | D$_2$R/D$_3$R | D$_4$R/D$_3$R |
|---|---|---|---|---|---|---|
| AB03-02 (PF592,379) | (structure) | 1,740 ± 348 (n = 5) | 185 ± 20.5 (n = 8) | 292 ± 22.2 (n = 3) | 9.41 | 1.58 |
| AB04-52 | (structure) | 8,240 ± 1,670 (n = 3) | 21,100 ± 2,310 (n = 5) | >100,000 | 0.391 | >4.74 |
| AB04-85A | (structure) | 7,100 ± 402 (n = 3) | 1,520 ± 183 (n = 3) | ND | 4.67 | ND |

TABLE 2-continued

Binding affinity data for compounds derived from PF592,379 primary pharmacophore. Radioligand competition binding assays performed on HEK293 cells stably expressing hD₂R and hD₃R, in presence of [$^3$H]-(R)-(+)-7-OH-DPAT.

vs. [$^3$H]-(R)-(+)-7-OH-DPAT

| Compound | Structure | $D_2R$ $K_i$ ± SEM [nM] | $D_3R$ $K_i$ ± SEM [nM] | $D_4R$ $K_i$ ± SEM [nM] | $D_2R/D_3R$ | $D_4R/D_3R$ |
|---|---|---|---|---|---|---|
| AB04-85B | | 2,340 ± 458 (n = 3) | 424 ± 32.4 (n = 3) | ND | 5.52 | ND |
| AB04-87 | | 5,220 ± 735 (n = 3) | 6,470 ± 675 (n = 3) | ND | 0.807 | ND |
| AB04-88 | | 134 ± 21.6 (n = 4) | 5.96 ± 0.477 (n = 4) | 357 ± 71.8 (n = 3) | 22.5 | 59.9 |
| AB04-35 | | 113 ± 22.7 (n = 4) | 173 ± 48.2 (n = 5) | 3,220 ± 842 (n = 3) | 0.653 | 18.6 |
| AB04-95 | | 2,660 ± 370 (n = 3) | 24,200 ± 4,500 (n = 3) | ND | 0.110 | ND |
| AB04-96 | | 34.6 ± 4.86 (n = 3) | 31.2 ± 8.72 (n = 3) | ND | 1.11 | ND |
| FOB01-42 | | 21,100 ± 2,100 (n = 3) | 73,000 ± 2,810 (n = 3) | ND | 0.289 | ND |
| FOB01-44 | | 341 ± 27.6 (n = 3) | 1,150 ± 210 (n = 3) | ND | 0.297 | ND |
| rac-trans-AB05-26 | | 14,100 ± 1,790 (n = 3) | 66,200 ± 25,600 (n = 3) | ND | 0.213 | ND |
| trans-AB05-27A | | 216 ± 32.6 (n = 3) | 1,190 ± 165 (n = 3) | ND | 0.182 | ND |
| trans-AB05-27B | | 707 ± 19.8 (n = 3) | 404 ± 34 (n = 3) | ND | 1.75 | ND |

TABLE 2-continued

Binding affinity data for compounds derived from PF592,379 primary pharmacophore. Radioligand competition binding assays performed on HEK293 cells stably expressing hD$_2$R and hD$_3$R, in presence of [$^3$H]-(R)-(+)-7-OH-DPAT.
vs. [$^3$H]-(R)-(+)-7-OH-DPAT

| Compound | Structure | D$_2$R K$_i$ ± SEM [nM] | D$_3$R K$_i$ ± SEM [nM] | D$_4$R K$_i$ ± SEM [nM] | D$_2$R/D$_3$R | D$_4$R/D$_3$R |
|---|---|---|---|---|---|---|
| cis-FOB01-59A | | 1,070 ± 40.9 (n = 3) | 2,150 ± 159 (n = 3) | ND | 0.498 | ND |
| cis-FOB01-59B | | 120 ± 16.6 (n = 3) | 276 ± 30 (n = 4) | ND | 0.435 | ND |
| cis-FOB01-60A | | 11,300 ± 2,280 (n = 3) | 26,200 ± 2,520 (n = 3) | ND | 0.431 | ND |
| cis-FOB01-60B | | 7,730 ± 2,070 (n = 3) | 32,900 ± 2,700 (n = 3) | ND | 0.235 | ND |
| rac-trans-FOB02-04 | | 106 ± 7.94 (n = 5) | 2.84 ± 0.462 (n = 5) | 315 ± 16.2 (n = 3) | 37.3 | 111 |
| FOB02-04A | | 87.8 ± 9.81 (n = 3) | 1.85 ± 0.137 (n = 3) | 286 ± 23.9 (n = 3) | 47.5 | 155 |
| FOB02-04B | | 831 ± 99.5 (n = 3) | 282 ± 24 (n = 3) | 2,930 ± 719 (n = 3) | 2.95 | 10.4 |

Equilibrium dissociation constants (K$_i$) were derived from IC$_{50}$ values using the Cheng-Prusoff equation.[56] Each K$_i$ value represents the arithmetic mean ± S.E.M; n = number of independent experiments, each performed in triplicate.
ND = Not Determined.

SAR Based on PF592,379 as Primary Pharmacophore—Table 2.

Compound PF592,379 presents two chiral centers. In order to better evaluate the significance of the chirality on the morpholine ring, and understand how the new extended bitopic molecules would change the stereochemical requirements for enhanced recognition of the D$_3$R OBS and SBP, all the possible diastereomeric combinations were prepared and tested. PF592,379 was synthesized and tested as a 3:1 diastereomeric mixture of (2R,5S) and (2S,5S), following the synthetic schemes described in previous literature. The affinity observed in the binding assays was consistent with previously reported ones, confirming a moderate D$_3$R affinity (K$_i$=185 nM) and a preferential selectivity for D$_3$R over D$_2$R (9.41-fold D$_3$R selective). Despite its D$_3$R affinity was not comparable with (+)-PD128,907, PF592,379 showed more versatility in terms of chemical modifications and its lower affinity and selectivity implied significant room for pharmacological improvements. In order to identify the positions that better tolerated substitutions, the affinities of AB03-14 (presenting n-dipropyl substituents on the aniline nitrogen) and the two nor-diastereoisomers (2R,5S)-AB04-85A and (2S,5S)-AB04-85B were assessed and compared. Alkylation of the aniline nitrogen prevented D$_2$-like affinity (K$_i$>5,000 nM and >10,000 nM for D$_2$R and D$_3$R, respectively). De-alkylation of the morpholine nitrogen also decreased affinity for both receptor subtype of ~3-9 fold, suggesting that a tertiary nitrogen is preferred. However, the first interesting observation was that among the two nor-analogues, the (2S,5S)-AB04-85B diastereoisomer was the one showing a slightly higher affinity for D$_3$R (K$_i$=424 nM), giving a first indication of a reversed enantio-specificity from what originally reported for the parent molecule (2R, 5S)-PF592,379. The importance of the morpholine ring chirality and its high enantio-specificity in binding $D_3R$ was highlighted in a definitive manner by the affinity profiles of all the newly prepared bitopic analogues. Indeed, when comparing couples of diastereoisomers (2R,5S)-AB04-87 and (2S,5S)-AB04-88 (presenting the 2-indole butylamide SP), and (2R,5S)-AB04-95 and (2S,5S)-AB04-96 (presenting the 3,4-dihydroquinolin-2(1H)-one SP), it was observed how the (2S,5S) stereochemistry is the privileged one for high $D_3R$ affinity. Particularly, (2S,5S)-AB04-88 showed a low nanomolar $D_3R$ affinity ($K_i$=5.96 nM), >1,000-fold better when compared to its (2R,5S)-AB04-87 inactive diastereoisomer, and 30-fold improved with the respect to the parent molecule PF592,379. This observation not only confirmed the success of the bitopic molecular approach in achieving high affinity, but (2S,5S)-AB04-88 presented an improved $D_3R$ subtype selectivity (23-fold selective over $D_3R$) and underscored the potential significance of the stereochemistry for the morpholine ring position-2 in order to obtain improved biding interaction. Similarly, (2S,5S)-AB04-96 has a $D_3R$ affinity 775-fold better with respect to its (2R,5S)-AB04-95 diastereoisomer, but an overall lack of subtype selectivity, consistent with the presence of 3,4-dihydroquinolin-2(1H)-one SP, which, as discussed above, improves $D_2R$ subtype binding. After identifying the best stereochemical combination for the PP, attention was focused on the nature of the linker portion of the molecules. Published literature supports the role of the linkers as modulators for the pharmacological profiles of bitopic ligands. Linkers differing in length, rigidity and chirality, can help improve binding affinities, receptors' subtype selectivity, as well as enhance allosteric properties and biased agonism. Introduction of rigid elements, such as a double bond or cyclopropyl ring are structural manipulations of linkers that were explored. In the new analogues (2R, 5S)-FOB01-42 and (2S,5S)-FOB01-44 the presence of a trans double bond blocked binding at both $D_2R$ and $D_3R$. The addition of either cis or trans cyclopropyl rings, introduced two extra chiral centers in the bitopic compounds, increasing the total number of the possible diastereoisomers, but allowing a detailed screening of the spatial requirements needed to maximize ligand-receptor interactions. When the cyclopropyl was embedded in a butyl chain, the linker resulted too short for an efficient binding, and all the compounds, independently from the stereochemical combinations tested, resulted in moderate or poor $D_3R$ affinity and selectivity. However, the resolved diastereoisomers trans-(2S,5S)-AB05-27A and trans-(2S,5S)-AB05-27B, despite their overall low $D_3R$ affinity, showed some indications that trans-cyclopropyl is the preferred binding configuration, and that among the two trans enantiomers there might be enantio-specificity towards receptor subtypes recognition. Indeed, trans-(2S,5S)-AB05-27A showed a slightly preferential affinity for $D_2R$ ($K_i$=216 nM), meanwhile trans-(2S, 5S)-AB05-27B seemed to preferentially binds $D_3R$ ($K_i$=404 nM). Based on these observations, extending the cyclopropyl linker of one extra methylene unit, successfully yielded trans-(2S,5S)-FOB02-04, which showed a significantly improved $D_3R$ affinity ($K_i$=2.84 nM) and selectivity over $D_2R$ ($D_2R/D_3R$=37.3). To further disentangle the importance of the chirality of the cyclopropyl ring, its two enantiomers were resolved, and the obtained compounds presented four chiral centers with all the absolute configuration assigned. Binding studies on these analogues provided important insight on how specific stereochemistry at the PP, as well as at the linker, are needed to achieve the highest affinities in this new series of compounds, and the highest $D_3R$ selectivity observed for bitopic agonists. Compound FOB02-04A, presenting (2S,5S)-PP configuration and (1R,2S)-trans-cylopropyl stereochemistry, showed $D_3R$ $K_i$=1.85 nM and an unprecedented 47.5-fold selectivity for $D_3R$ over $D_2R$ ($D_2R$ $K_i$=87.8 nM). Instead, its (1S,2R)-trans-cylopropyl diastereoisomer FOB02-04B, showed 152-fold reduced affinity for $D_3R$ ($K_i$=282 nM) and loss of selectivity ($D_2R$ $K_i$=831 nM, $D_2R/D_3R$=2.95). Moreover, competition binding experiments for FOB02-04 in presence of antagonist [$^3$H]—N-methylspiperone (similar assay conditions to previously described protocols) provided initial evidence of the new compound agonist profile. Indeed, its affinity was significantly reduced for all $D_2$-like receptor subtypes, and its $D_3R$ selectivity increased, (FOB02-04: $D_2R$ $K_i$=8,280±462 nM (n=3), $D_3R$ $K_i$=34±2.23 nM (n=3), $D_4R$ $K_i$=6,650±662 nM (n=3), $D_2R/D_3R$=244, $D_4R/D_3R$=196; FOB02-04A: $D_2R$ $K_i$=1,610±94 nM (n=3), $D_3R$ $K_i$=5.36±0.522 nM (n=3), $D_4R$ $K_i$=1,520±109 nM (n=3), $D_2R/D_3R$=300, $D_4R/D_3R$=284; FOB02-04B: $D_2R$ $K_i$=70,600±15,900 nM (n=3), $D_3R$ $K_i$=2,900±463 nM (n=3), $D_4R$ $K_i$=62,700±25,600 nM (n=3), $D_2R/D_3R$=24, $D_4R/D_3R$=22; AB04-88: $D_2R$ $K_i$=21,000±1,160 nM (n=3), $D_3R$ $K_i$=182±28.3 nM (n=3), $D_4R$ $K_i$=16,800±3,470 nM (n=3), $D_2R/D_3R$=115, $D_4R/D_3R$=92)) when compared to the $K_i$ obtained in competition versus agonist [$_3$H]—(R)-(+)-7-OH-DPAT (Table 2). This is consistent with our extensive experimental observations on how agonists cannot compete in the same with antagonist radiotracers, thus, the need of accurate assay conditions to determine affinity and receptor subtype selectivities, which could be otherwise under- and over-estimated, respectively.

It has been demonstrated how SAR studies based on well-defined stereochemistry led to the identification of new high affinity and selectivity $D_3R$ agonist FOB02-04A. In particular, it was observed that: i) starting from (2R,5S)-PF592,379 as PP, a complete inversion of configuration at the chiral center in position-2 has led to the successful development of new bitopic ligands ((2S,5S)— is the only morpholine ring configuration tolerated, for optimal $D_3R$ binding, by all the bitopic analogues studied); ii) cyclopropyl linkers optimized in their length, relative regiochemical positions of PP and SP, relative and absolute stereochemistry ((1R,2S) is the privileged cyclopropyl configuration) can dramatically modulate pharmacological profiles.

The high molecular complexity of FOB02-04A, combined with its fully resolved tridimensional structure, and unprecedented $D_3R$ agonist affinity/selectivity, may lead extensive computational studies to better understand $D_3R$ ligand-receptor interactions, as well as underscore potential biased agonism as a consequence of specific receptor conformations.

Moreover, due to the large degree of homogeneity among the $D_2$-like family of dopamine receptors and consequent lack of selective agonists, FOB02-04 and the eutomer FOB02-04A, presenting the highest $D_3R$ to $D_2R$ selectivity reported for agonists, to date, may have the potential to become the main pharmacological reference tools for future $D_3R$ in vitro and/or in vivo studies (taken also in account the promising metabolic stability of FOB02-04 in rat liver microsomes Example 2).

Example 2. Metabolic Stability and Metabolite Identification

Phase I Metabolism in Rat Liver Microsomes

For phase I metabolism, the reactions were carried out with 100 mM potassium phosphate buffer, pH 7.4, in the presence of NADPH regenerating system (1.3 mM NADPH, 3.3 mM glucose 6-phosphate, 3.3 mM MgCl$_2$, 0.4 U/mL glucose-6-phosphate dehydrogenase, 50 μM sodium citrate). Reactions in triplicate were initiated by addition of the liver microsomes to the incubation mixture (compound final concentration was 10 μM; 0.5 mg/mL microsomes). Compound disappearance was monitored via LC/MS/MS. Chromatographic analysis was performed using an Accela™ ultra high-performance system consisting of an analytical pump, and an autosampler coupled with TSQ Vantage mass spectrometer (Thermo Fisher Scientific Inc., Waltham MA). Separation of the analyte from potentially interfering material was achieved at ambient temperature using Agilent Eclipse Plus column (100×2.1 mm i.d.) packed with a 1.8 μm C18 stationary phase. The mobile phase used was composed of 0.1% Formic Acid in Acetonitrile and 0.1% Formic Acid in water with gradient elution, starting with 10% (organic) linearly increasing to 99% up to 2.5 min, and re-equilibrating to 10% by 2.7 min. The total run time for each analyte was 5.0 min.

Phase I metabolic stability of FOB02-04 in rat liver microsomes was conducted and metabolites were identified. Compound FOB02-04 presented affinity and selectivity profiles very similar to the eutomer FOB02-04A, thus it was selected for further evaluation of its metabolic stability. Compound FOB02-04 showed moderate instability to Phase I metabolism in rat liver microsomes fortified with NADPH (Table 3). The remaining percentage of product was 81% and 53%, after 30 and 60 minutes, respectively. The compound shows complete stability in negative control without NADPH. Moreover, the pathways to major metabolites of FOB02-04 have been identified and are reported in Scheme 10.

The high metabolic stability of FOB02-04 in liver microsome preparations present this compound and its eutomer FOB-02-04A as excellent candidates for studies on in vivo models of dopamine system dysregulations.

TABLE 3

Metabolic Stability of FOB02-04 Phase I in Rat Liver Microsomes

| Time (minutes) | +NADPH | −NADPH |
| --- | --- | --- |
| 0 | 100% | 100% |
| 30 | 81% | 99% |
| 60 | 53% | 100% |

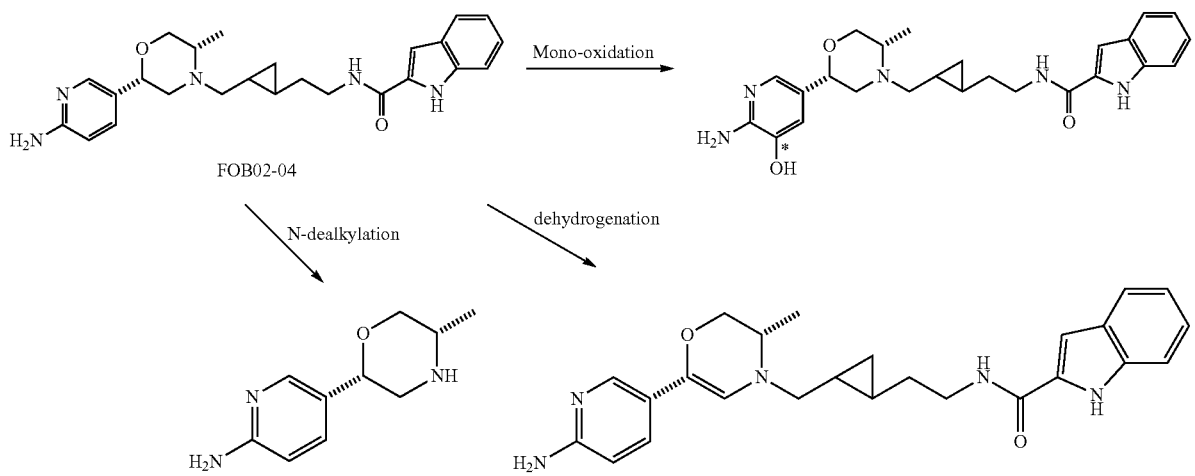

Scheme 10. Pathways to major metabolites of FOB02-04.

*position of hydroxyl can be at any given position of the pyridine.

Example 3. Further Bitopic Compounds Comprising the (S,S) Analog of PF-592,379 Scaffold as PP and Various Linker Groups Schemes 11.-15. illustrate the chemistry for forming a series of bitopic compounds comprising the (S,S) analog of the PF-592,379 scaffold as PP with various linker groups.

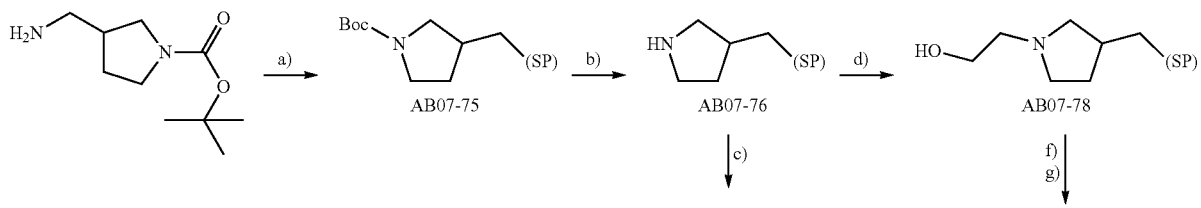

Scheme 11.

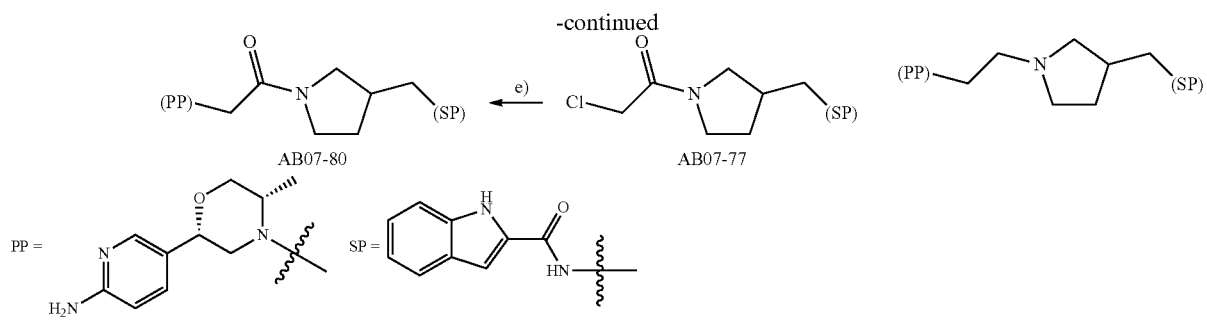

a) indole-2-carboxylic acid, EDC hydrochloride, DIPEA, HOBt, DCM;
b) TFA, DCM;
c) 2-chloroacetyl chloride, DIPEA, DMC;
d) 2-bromoethan-1-ol, K₂CO₃, ACN, Δ;
e) AB04-85B, K₂CO₃, ACN, Δ;
f) Dess-Martin Periodinane, DCM,
g) AB04-85B, Na(CH₃COO)₃BH, cat. AcOH, DCE.

tert-butyl 3-((1H-indole-2-carboxamido)methyl)pyrrolidine-1-carboxylate (AB07-75). To a round bottom flask were added indole-2-carboxylic acid (2.00 g, 12.0 mmol), N-(3-Dimethylaminopropyl)-N'-ethylcarbodiimide hydrochloride (EDC; 2.40 g, 12.0 mmol), and hydroxybenzotriazole hydrate (HOBt; 1.90 g, 12.0 mmol) and suspended in 150 mL of dichloromethane (DCM), N,N-Diisopropylethylamine (DIPEA; 2.20 mL, 12.0 mmol) was added to the reaction mixture and the mixture was allowed to stir at room temperature for 10 minutes, allowing the reactants to solubilize. To the reaction mixture was added tert-butyl 3-(aminomethyl)pyrrolidine-1-carboxylate (2.50 g, 12.0 mmol) and the reaction mixture was allowed to stir for 3 hours. The reaction solvent was subsequently removed under reduced pressure and the crude mixture was purified via flash column chromatography with the desired product eluting with 48% Ethyl Acetate (EtOAc) in Hexanes, to yield 2.80 g (65% yield) of the desired product AB07-75.

N-(pyrrolidin-3-ylmethyl)-1H-indole-2-carboxamide (AB07-76). Compound AB07-75 (2.80 g, 8.20 mmol) was dissolved in 20 mL of DCM and to the solution was added trifluoroacetic acid (TFA; 6.30 mL, 82.0 mmol) dropwise. The reaction mixture was allowed to stir at room temperature overnight. Solvent and TFA were subsequently removed under reduced pressure, the crude material was basified with 2N NaOH and the aqueous solution was then extracted three times with DCM:iso-propanol (iPrOH) (3:1). The organic fractions were then dried with Na₂SO₄, concentrated, and the crude was purified via flash chromatography with the desired product eluting with 25% DMA (Methanol (1% ammonium hydroxide) in DCM), to yield 1.40 g (71% yield) of the desired product AB07-76.

N-((1-(2-chloroacetyl)pyrrolidin-3-yl)methyl)-1H-indole-2-carboxamide (AB07-77). Compound AB07-76 (700 mg, 2.87 mmol) was dissolved in 20 mL of DCM. To the solution of AB07-76 was added 2-chloroacetyl chloride (300 mg, 2.65 mmol) dropwise, followed by the addition of DIPEA (2.70 mL, 15.5 mmol). The reaction mixture was stirred for 3 hours after which the reaction solvent was removed under reduced pressure and the crude material was purified via flash chromatography with the desired product eluting with 5% DMA, to yield 0.350 g (39% yield) of the desired product AB07-77.

N-((1-(2-hydroxyethyl)pyrrolidin-3-yl)methyl)-1H-indole-2-carboxamide (AB07-78). To a pressure vessel were added compound AB07-76 (700 mg, 2.87 mmol), potassium carbonate (4.00 g, 28.9 mmol), and 2-bromoethan-1-ol (400 mg, 3.20 mmol) and suspended in 20 mL of acetonitrile. The pressure vessel was sealed and the reaction mixture was stirred at 80° C. overnight. Following overnight stirring, the reaction was brought down to room temperate, the potassium carbonate was removed with a paper filter, and the reaction solvent was evaporated under reduced pressure. The crude material was purified via flash chromatography with the desired product eluting with 15% DMA, to yield 0.430 g (54% yield) of the desired product AB07-78.

N-((1-(2-((2S,5S)-2-(6-aminopyridin-3-yl)-5-methylmorpholino)acetyl)pyrrolidin-3-yl)methyl)-1H-indole-2-carboxamide (AB07-80). To a round bottom flask were added compound AB07-78 (50.0 mg, 0.156 mmol), 5-((2S,5S)-5-methylmorpholin-2-yl)pyridin-2-amine (AB04-85B; 30.0 mg, 0.155 mmol), and potassium carbonate (210 mg, 1.52 mmol), the reactants were then dissolved in 10 mL of acetonitrile. The reaction mixture was stirred at reflux for 5 hours and subsequently stirred at room temperature overnight. The suspension was then filtered, the solvent was evaporated under reduced pressure, and the crude residue was purified via flash chromatography with the desired product eluting with 10-15% DMA, to yield 26.0 mg (35% yield) of the desired product as a mixture of diastereomers AB07-80.

Scheme 12.

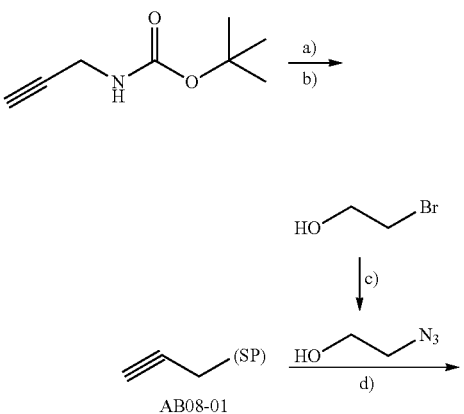

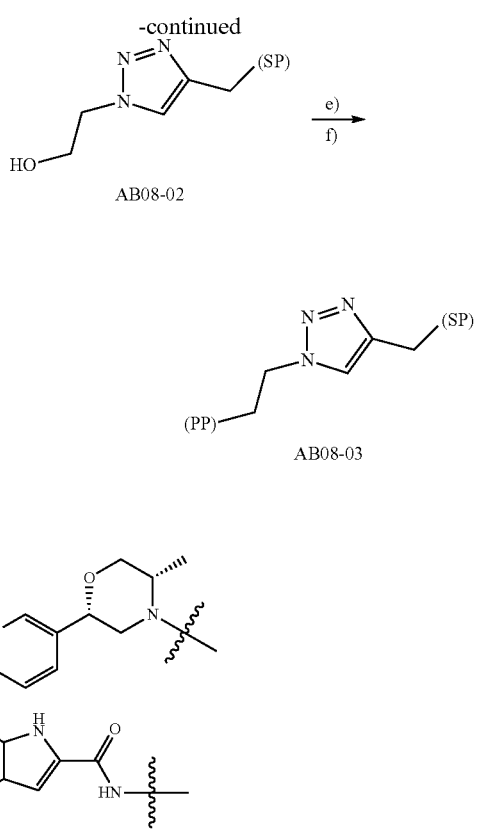

a) TFA, DCM;
b) indole-2-carboxylic acid, EDC hydrochloride, DIPEA, HOBt, DCM;
c) NaN₃, acetone, Δ;
d) 5% mol sodium ascorbate, 5% mol CuSO₄, THF:Water (1:1);
e) Dess-Martin periodinane, DCM;
f) AB04-85B, Na(CH₃COO)₃BH, cat. AcOH, DEC N-(prop-2-yn-1-yl)-1H-indole-2-carboxamide (AB08-01). To a solution of tert-butyl prop-2-yn-1-ylcarbamate (5.00 g, 32.2 mmol) in 100 mL of DCM was added TFA (3.70 g, 32.5 mmol) and the reaction was stirred at room temperature for 1 hour. The reaction was subsequently basified with the addition of DIPEA (4.20 g, 32.5 mmol). This reaction mixture was then added portionwise to a separate flask containing a solution of indole-2-carboxylic acid (5.20 g, 32.2 mmol), EDC (6.20 g, 32.4 mmol), and HOBt (4.90 g, 32.0 mmol) in 100 mL of DCM. The reaction was stirred overnight at room temperature, the solvent was later removed under reduced pressure and the crude residue was purified via flash chromatography with the desired product eluting with 30% EtOAc in Hexanes, to yield 200 mg (3.1% yield) of the desired product AB08-01 (significant yield loss observed during flash chromatography due to precipitation of product).

N-((1-(2-hydroxyethyl)-1H-1,2,3-triazol-4-yl)methyl)-1H-indole-2-carboxamide (AB08-02). In a pressure vessel, sodium azide (1.05 g, 16.1 mmol) was added portion-wise to a solution of 2-bromoethan-1-ol (2.00 g, 16.0 mmol) in 50 mL of acetone, the vessel was sealed and the reaction stirred for 3 hours with gentle heating. The reaction was subsequently cooled down to room temperature, the suspension was filtered and the solvent evaporated under reduced pressure. The resulting residue was then dissolved in 30 mL of (1:1) THF:H₂O, to the solution was added AB08-01 (200 mg, 1.01 mmol), sodium ascorbate (9.99 mg, 0.050 mmol) and copper sulfate pentahydrate (8.05 mg, 0.050 mmol), and the reaction was further stirred for an additional 3 hours at room temperature. The organic and aqueous layers were then separated and the aqueous layer extracted three times with DCM:iPrOH (3:1). The combined organic layers were dried with Na₂SO₄ and concentrated under reduced pressure. The crude residue was purified via flash chromatography with the desired product eluting with 5% DMA, to yield 140 mg (49% yield) of the desired product AB08-02.

N-((1-(2-((2S,5S)-2-(6-aminopyridin-3-yl)-5-methylmorpholino)ethyl)-1H-1,2,3-triazol-4-yl)methyl)-1H-indole-2-carboxamide (AB08-03). Dess-Martin periodinane (220 mg, 0.52 mmol) was added to a solution of AB08-02 (140 mg, 0.49 mmol) in 20 mL of DCM. The reaction mixture was stirred at room temperature for 20 minutes and subsequently quenched with 5 mL of sat. sodium bicarbonate. The aqueous and organic layers were then separated and the organic layer concentrated under reduced pressure. The organic residue was redissolved in 10 mL of dichloroethane (DCE), to the solution was then added AB04-85B (20.0 mg, 0.103 mmol) and three drops of acetic acid (AcOH); the reaction mixture was stirred for 20 minutes and then sodium triacetoxyborohydride (STAB; 26.0 mg, 0.120 mmol) was added to the reaction in one portion. The reaction mixture was stirred overnight at room temperature; the solvent was subsequently removed under reduced pressure and the crude residue purified via flash chromatography with the desired product eluting with 15% DMA, to yield 10.0 mg (21% yield) of the desired product AB08-03.

Scheme 13.

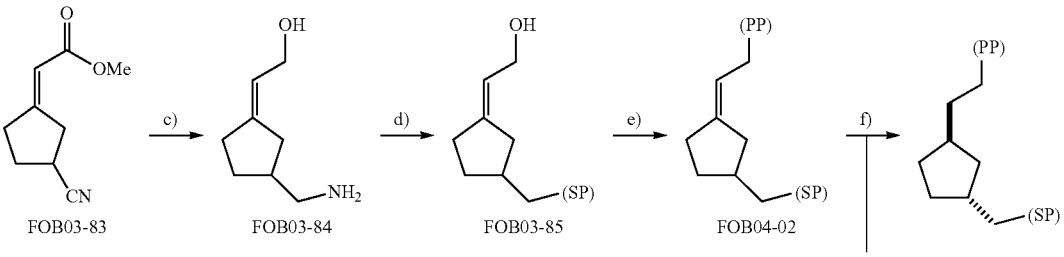

-continued

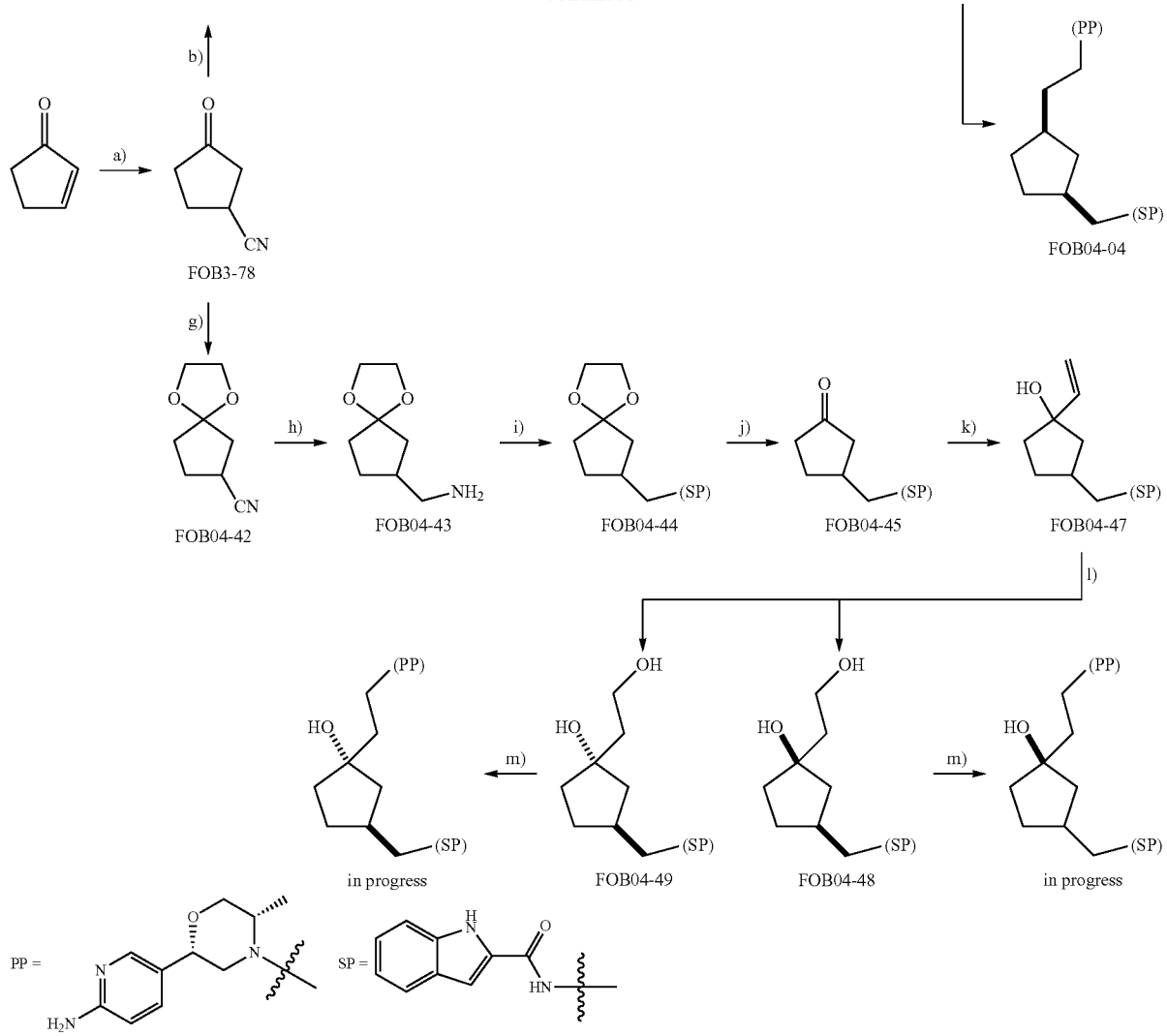

a) NaCN, Et₃N·HCl, MeOH, H₂O;
b) (MeO)₂P(O)CH₂CO₂CH₃, NaH, MeOH, 0° C. to RT;
c) LAH, THF, Δ;
d) indole-2-carboxylic acid, EDC hydrochloride, DIPEA, HOBt, DCM;
e) first Dess-Martin periodinane, DCM, then AB04-85B, Na(CH₃COO)₃BH, cat. AcOH, DCE;
f) cat. Pd (5% on C), H₂ (50 psi), EtOH followed by chiral separation;
g) ethylene glycol, pTSA, PhMe, Δ;
h) LAH, THF, Δ;
i) indole-2-carboxylic acid, EDC hydrochloride, DIPEA, HOBt, DCM;
j) HCl (1M), THF;
k) vinyl magnesium bromide, THF;
l) BH₃·THF, THF, NaOH, H₂O₂
m) first Dess-Martin periodinane, DCM, then AB04-85B, Na(CH₃COO)₃BH, cat. AcOH, DCE (in process)

3-oxocyclopentane-1-carbonitrile (FOB03-78). Triethylamine hydrochloride (940 mg, 6.83 mmol) and sodium cyanide (335 mg, 6.83 mmol) were dissolved in a 30 mL H₂O:Methanol (MeOH) (2:1) solution. A prepared solution of cyclopent-2-en-1-one (520 mmL, 6.21 mmol) in 1 mL of MeOH was subsequently added to the reaction mixture and the reaction was allowed to stir overnight at room temperature. Following overnight stirring, MeOH was removed under reduced pressure (in an ice bath) and the aqueous layer was brought to a pH of ~7 with dropwise addition of AcOH. The aqueous solution was then extracted three times with DCM, the combined organics were dried with Na₂SO₄ and concentrated under reduced pressure (in an ice bath). The crude material was subsequently purified via flash chromatography with solvent system ramping from 0% to 80% EtOAc in Hexanes, to yield 306.0 mg (45% yield) of the desired product as a colorless oil.

methyl (Z)-2-(3-cyanocyclopentylidene)acetate (FOB03-83). In a round bottom flask, trimethyl phosphonoacetate (2.98 g, 16.4 mmol) were dissolved in 100 mL of methanol and the solution cooled to 0° C. in an ice bath. To the solution was added sodium hydride (95%, 433 mg, 17.1 mmol) portionwise and the reaction was allowed to stir for 1 hr and reach room temperature. A prepared solution of FOB03-78 (1.70 g, 15.6 mmol) in 5 mL of MeOH was then added dropwise to the reaction mixture and the reaction was allowed to stir overnight at room temperature. Following overnight stirring, the reaction was quenched with sat ammonium chloride solution (50 mL), the MeOH was removed under reduced pressure and the aqueous layer was extracted three times with DCM. The combined organic layers were then dried with $Na_2SO_4$, concentrated, and the crude material purified via flash chromatography with solvent system ramping from 0% to 60% EtOAc in Hexanes, to yield 1.80 g (70% yield) of the desired product, a colorless oil, as a mixture of E and Z isomers.

(Z)-2-(3-(aminomethyl)cyclopentylidene)ethan-1-ol (FOB03-84). Compound FOB03-83 (1.96 g, 11.9 mmol) was dissolved in 100 mL of tetrahydrofuran (THF), the solution was cooled to 0° C. and subsequently was added lithium aluminum hydride (LAH; 3.15 g, 82.8 mmol) portion-wise. Upon full addition of the LAH, the reaction was heated to 45° C. and allowed to stir overnight. Following overnight stirring, the reaction was returned to room temperature and quenched with 4 mL of water, followed by 4 mL of 2N NaOH, followed by an additional 12 mL of water, and then allowed the biphasic solution to stir vigorously for an hour. The suspension was then filtered through a celite bed, rinsing with ethanol (EtOH) and the organic solvents removed under reduced pressure. The remaining crude was resuspended with 10 mL of water and extracted three times with $CHCl_3$:iPrOH (3:1). The combined organic layers were dried with $Na_2SO_4$ and concentrated to yield the crude product in quantitative yield requiring no further purification.

(Z)—N-((3-(2-hydroxyethylidene)cyclopentyl)methyl)-1H-indole-2-carboxamide (FOB03-85). In a round bottom flask, EDC (1.36 g, 7.12 mmol), HOBt (962 mg, 7.12 mmol), and indole-2-carboxylic acid (994 mg, 6.17 mmol) were dissolved in 100 mL of DCE and stirred for 25 minutes. A prepared solution of FOB03-84 (670 mg, 4.74 mmol) and DIPEA (1.66 mL, 9.49 mmol) in 15 mL of DCE was then added to the reaction mixture and the reaction subsequently stirred for 5 hrs. The reaction solvent was then removed under reduced pressure and the resulting crude mixture purified via flash chromatography with solvent system ramping from 0% to 100% EtOAc in Hexanes, to yield 604 mg (49% yield) of the desired product as a white solid.

1,4-dioxaspiro[4.4]nonane-7-carbonitrile (FOB04-42). Dissolved FOB03-78 (1.00 g, 9.16 mmol) in 100 mL of toluene and subsequently added p-Toluenesulfonic acid (pTSA; 100 mg, 0.580 mmol) and ethylene glycol (2.56 mL, 45.82 mmol) to the reaction mixture followed by 10 g of $Na_2SO_4$ to remove water generated by the reaction. The reaction was stirred at reflux for 5 hrs and the $Na_2SO_4$ was then removed with a paper filter and an additional 10 g of $Na_2SO_4$ were added as well as an additional 5 eq. of ethylene glycol, the reaction was then allowed to stir at reflux overnight. The reaction solvent was then removed under reduced pressure and the crude purified via flash chromatography with solvent system ramping from 0% to 100% EtOAc in Hexanes, to yield 837 mg (60% yield) of the desired product as a colorless liquid.

(1,4-dioxaspiro[4.4]nonan-7-yl)methanamine (FOB04-43). Compound FOB04-42 (830 mg, 5.42 mmol) was dissolved in 50 mL of THF and subsequently LAH (514 mg, 13.5 mmol) was added portionwise to the reaction at 0° C., upon complete addition of the LAH the reaction was set to reflux for 8 hrs. The reaction mixture was subsequently quenched with 3 mL of water and 2 mL of 2N NaOH and the biphasic solution was stirred for 30 min. The white precipitate was removed with a celite bed and the solvent was subsequently removed under reduced pressure and the resulting crude was used without further purification in the next step.

N-((1,4-dioxaspiro[4.4]nonan-7-yl)methyl)-1H-indole-2-carboxamide (FOB04-44). Compound FOB04-44 was synthesized following the same procedure as detailed for compound FOB03-85, starting from amine FOB04-43 (850 mg, 5.41 mmol). The resulting crude purified via flash chromatography with solvent system ramping from 0% to 100% EtOAc in Hexanes, eluting at 60% EtOAc, to yield 580 mg (28% yield) of the desired product as a white solid.

N-((3-oxocyclopentyl)methyl)-1H-indole-2-carboxamide (FOB04-45). Compound FOB04-44 (580 mg, 1.93 mmol) was dissolved with 100 mL of THF and to the solution was added 75 mL of 1N HCl. The reaction mixture was stirred for 2 hrs at room temperature and the organic and aqueous layers were subsequently separated. The aqueous layer was then extracted three times with EtOAc and the combined organic layers dried with $Na_2SO_4$ and concentrated to yield 369 mg (75%) of the deprotected product requiring no further purification.

N-((3-hydroxy-3-vinylcyclopentyl)methyl)-1H-indole-2-carboxamide (FOB04-47). Under an inert atmosphere, to an anhydrous THF (10 mL) solution of FOB04-45 (320 mg, 1.25 mmol) was added vinyl magnesium bromide (3.75 mL, 1M in THF) dropwise. The reaction mixture was then allowed to stir at room temperature for 2.5 hrs and the reaction subsequently quenched with 4 mL of 1M HCl. The organic and aqueous layers were then separated and the aqueous layer extracted three times with EtOAc, the combined organic layers dried with $Na_2SO_4$, concentrated, and the resulting crude was purified via flash chromatography with solvent system ramping from 0% to 80% EtOAc in Hexanes, eluting at 50% EtOAc, the cis and trans isomers of the product were isolated as separate peaks: cis-FOB04-47 (101 mg, 28%) and trans-FOB04-47 (53 mg, 15%).

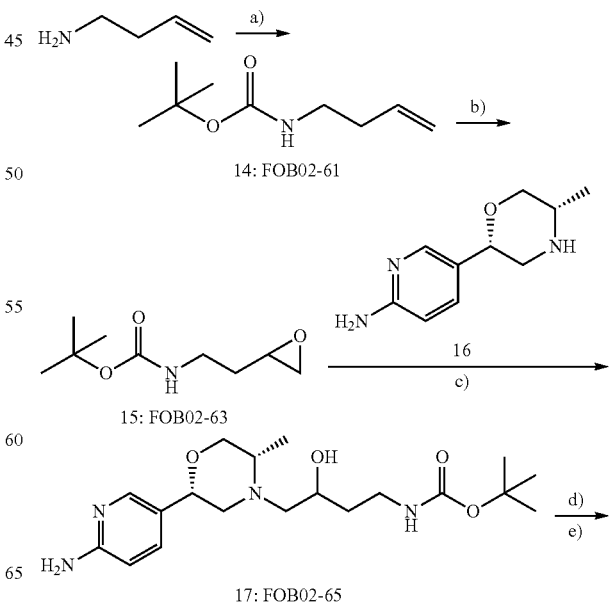

Scheme 14.

-continued

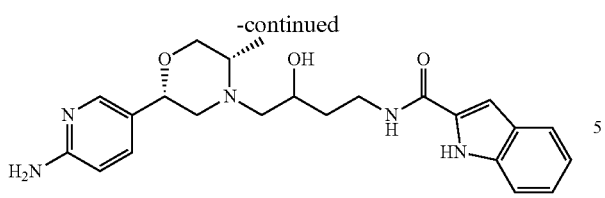

10: FOB02-67 a) Di-tert-butyl dicarbonate, DMAP, DCM, RT;
b) mCPBA, DCM, from 0° C. to RT;
c) K$_2$CO$_3$, toluene, DMF, Δ, microwave 75W, 120° C., 275 psi set point;
d) HCl (2N–4N in Et$_2$O), DCM, from 0° C. to RT;
e) EDC•HCl, HOBt, DIPEA, indole-2-carboxylic acid, DCM, RT.

Scheme 15.

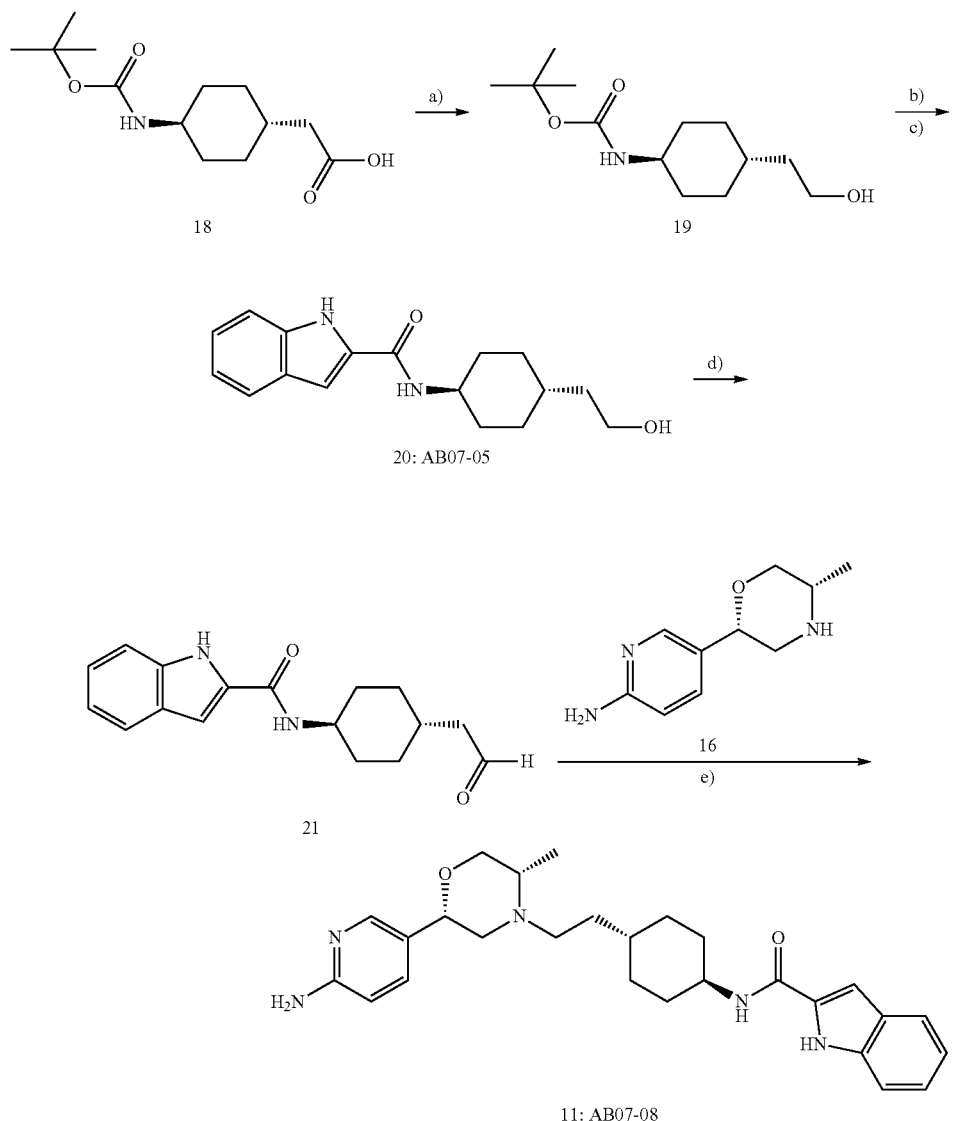

a) BH$_3$•(CH$_3$)$_2$S, THF, from 0° C. to RT;
b) HCl (2N–4N in Et$_2$O), DCM, from 0° C. to RT;
c) EDC•HCl, HOBt, DIPEA, indole-2-carboxylic acid, DCM, RT;
d) Dess-Martin periodinane, DCM, from 0° C. to RT;
e) cat. AcOH, Na(AcO)$_3$BH, DCE, RT.

Scheme 16. Compound 12 with Overall Resolution of Diastereomers at the Final Step[a]

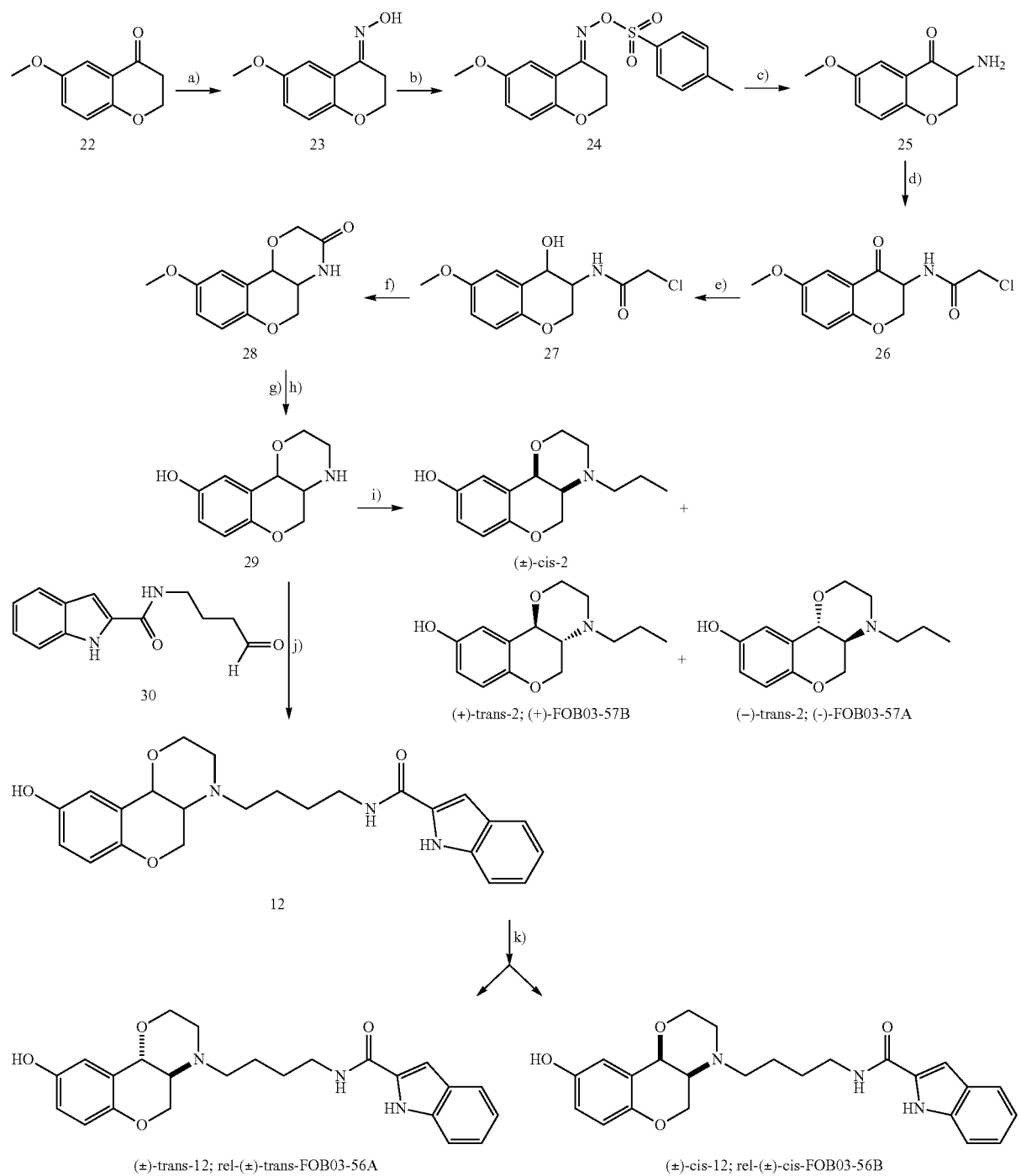

a) AcONa, NH$_2$OH·HCl, EtOH, H$_2$O;
b) p-TsCl, pyridine, from 0° C. to RT;
c) Na, EtOH, from 0° C. to RT, 2N HCl in H$_2$O, RT;
d) 2-chloroacetyl chloride, DIPEA, EtOAc, RT;
e) NaBH$_4$, EtOH:THF (1:3), RT;
f) tBuOK, DCM, 2-PrOH, RT;
g) LiAlH$_4$, THF, from 0° C. to RT;
h) 48% HBr in H$_2$O, Δ;
i) propionaldehyde, cat. AcOH, Na(AcO)$_3$BH, DCE, RT; preparative chiral HPLC (Chiralpak AD—H);
j) N-(4-oxobytyl)-1H-indole-2-carboxamide, 28 cat. AcOH, Na(AcO)$_3$BH, DCE, RT;
k) preparative chiral HPLC (Chiralpak AD—H).

In Scheme 16. the intermediate 29 was thus converted into the bitopic analogue 12 (FOB03-56) via reductive amination in the presence of 30. The mixture of four enantiomers was analyzed by chiral HPLC, and the trans and cis diastereomers were separated by preparative HPLC, into the corresponding mixture of enantiomers rel-trans-FOB03-56A/rel-trans-12 (er 65:35) and rel-cis-FOB03-56B/rel-cis-12 which we then carried into biological screening. The relative enantiomer abundance was not determined for rel-cis-12. Cis and trans diastereoisomers' conformations for (+)-trans-2, rel-trans-12, and rel-cis-12 were readily identifiable by comparison with the precedent literature and by $^1$H NMR spectroscopy.

Radioligand Binding Data

The affinities of the synthesized compounds at $hD_{L2}R$ and $hD_3R$ were tested by radioligand competition binding assays, using the agonist [$^3$H]—(R)-(+)-7-OH-DPAT as radiotracer. A further assay using [$^3$H]—N-methylspiperone was also conducted and the results are provided in Table 4.

TABLE 4

| Compound | | [$^3$H]-(R)-(+)-7-OH-DPAT $K_i$ (nM) ± SEM | | [$^3$H]-N-methylsiperone $K_i$ (nM) ± SEM | |
|---|---|---|---|---|---|
| | | $hD_{2L}R$ | $hD_3R$ | $hD_{2L}R$ | $hD_3R$ |
| FOB02-04A | | 87.8 ± 9.81 | 1.85 ± 0.137 | 1610 ± 94 | 5.36 ± 0.522 |
| FOB02-04B | | 831 ± 99.5 | 282 ± 24 | 70600 ± 15900 | 2900 ± 463 |
| FOB02-67 | | 1010 ± 162 | 423 ± 164 | — | — |
| AB07-08 | | 104 ± 12.3 | 21.6 ± 1.78 | — | — |
| FOB04-02 | | 55.9 ± 4.78 | 7.41 ± 0.323 | 7920 ± 772 | 104 ± 7.65 |
| FOB04-04 | | 79.6 ± 4.97 | 7.32 ± 0.565 | 15000 ± 4760 | 114 ± 13.3 |
| FOB04-04A (AB08-04A) | | — | — | 22600 ± 3940 | 87.6 ± 6.83 |

TABLE 4-continued
| Compound | | [³H]-(R)-(+)-7-OH-DPAT $K_i$ (nM) ± SEM | | [³H]-N-methylsiperone $K_i$ (nM) ± SEM | |
| --- | --- | --- | --- | --- | --- |
| | | hD$_{2L}$R | hD$_3$R | hD$_{2L}$R | hD$_3$R |
| FOB04-04B (AB08-04B) | 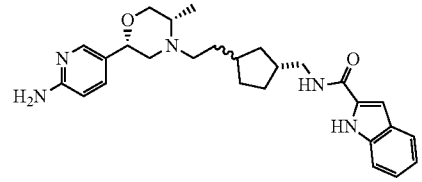 [SMILES: C[C@H]1CO[C@@H](c2ccc(N)nc2)CN1CCC1CCC(CNC(=O)c2cc3ccccc3[nH]2)C1] | — | — | 25400 ± 2670 | 362 ± 34.6 |
| FOB04-04C | 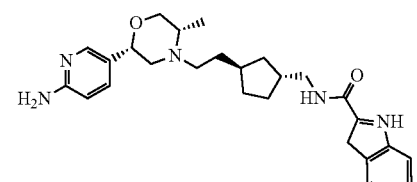 FOB04-04C | — | — | — | — |
| FOB04-04D | 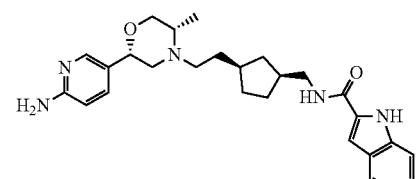 FOB04-04D | — | — | — | — |
| FOB04-04E | 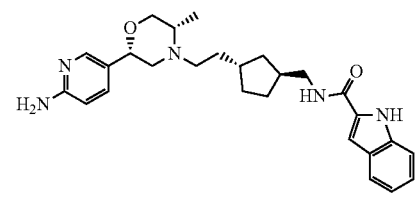 FOB04-04E | — | — | — | — |
| FOB04-04F | 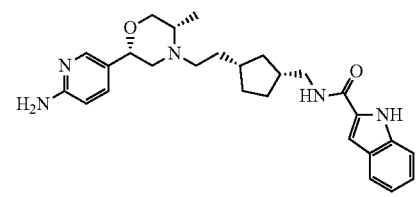 FOB04-04F | — | — | — | — |
| AB07-80 | 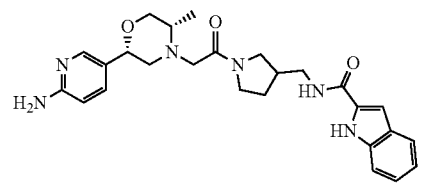 [SMILES: C[C@H]1CO[C@@H](c2ccc(N)nc2)CN1CC(=O)N1CCC(CNC(=O)c2cc3ccccc3[nH]2)C1] | 1840 ± TBD | 2010 ± TBD | 7930 ± 1190 | 2410 ± 287 |
| AB08-03 | 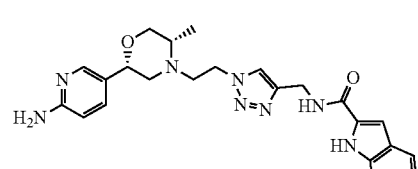 | TBD | TBD | 32300 ± 12700 | 2780 ± 1020 |

TABLE 4-continued

| | | [³H]-(R)-(+)-7-OH-DPAT $K_i$ (nM) ± SEM | | [³H]-N-methylsiperone $K_i$ (nM) ± SEM | |
| --- | --- | --- | --- | --- | --- |
| | Compound | hD$_{2L}$R | hD$_3$R | hD$_{2L}$R | hD$_3$R |
| Compound 98 | | — | — | — | — |
| Compound 99 | | — | — | — | — |
| Compound 100 | | — | — | — | — |
| Compound 101 | | — | — | — | — |
| Compound 102 | | — | — | — | — |

Table 5. also includes the results of radioligand binding studies where the compounds were tested for their affinities at hD$_2$R and hD$_3$R, in competition with the agonist [³H]—(R)-(+)-7-OH-DPAT. The ability to evaluate agonist affinities for the receptors of interest in their active states allows for a better estimation of subtype selectivity and better resembles the ligand-receptor interaction under physiological conditions where only a fraction of the total available receptors are in the active state, and the agonists have to compete with endogenous dopamine (DA) for the OBS. Moreover, the radiolabeled agonist simplifies the binding protocol for testing new agonists' affinity in cell membrane preparations and generates monophasic curves, with optimal fitting, representing the high-affinity agonist bound state.

TABLE 5

Radioligand Competition Binding Assays Performed on HEK293 Cells Stably Expressing hD$_2$R, hD$_3$R, hD$_1$R, and hμOR[c]

| Compounds | Structure | hD$_{2L}$R K$_i$ ± SEM (μM) | hD$_3$R K$_i$ ± SEM (μM) | hD$_1$R K$_i$ ± SEM (μM) | hμOR K$_i$ ± SEM (μM) |
|---|---|---|---|---|---|
| AB03-02 (PF592,379) (d.r. 3:1) | | 1.74 ± 0.348 (n = 5) | 0.185 ± 0.0205*** (n = 8) | >100[b] | >100[b] |
| (+)-(4aR,10bR)-2 | | 0.0280 ± 0.00559 (n = 4) | 0.00167 ± 0.000257*** (n = 3) | >100[b] | 36.6 ± 19.8 (n = 4) |
| (−)-(4aS,10bS)-2 | | 7.58 ± 2.62 (n = 4) | 5.62 ± 2.30[ns] (n = 3) | >100[b] | 77.9 ± 41.4 (n = 5) |
| (±)-cis-2 | | >10 | >10 | NT | NT |
| AB04-87 | | 5.22 ± 0.735 (n = 3) | 6.47 ± 0.675[ns] (n = 3) | NT | NT |
| AB04-88 | | 0.134 ± 0.0216 (n = 4) | 0.00596 ± 0.000477**** (n = 4) | NT | NT |
| FOB02-04A | | 0.0878 ± 0.00981 (n = 3) | 0.00185 ± 0.000137**** (n = 3) | 5.63 ± 2.05 (n = 3) | 16.9 ± 3.10 (n = 3) |
| FOB02-04B | | 0.831 ± 0.0995 (n = 3) | 0.282 ± 0.024*** (n = 3) | NT | NT |
| FOB02-67[d] | | 1.01 ± 0.162 (n = 5) | 0.423 ± 0.164* (n = 5) | >100[b] | 0.739 ± 0.0701 (n = 4) |

TABLE 5-continued

Radioligand Competition Binding Assays Performed on HEK293 Cells Stably Expressing hD$_2$R, hD$_3$R, hD$_1$R, and hµOR[c]

| Compounds | Structure | hD$_{2L}$R K$_i$ ± SEM (µM) | hD$_3$R K$_i$ ± SEM (µM) | hD$_1$R K$_i$ ± SEM (µM) | hµOR K$_i$ ± SEM (µM) |
|---|---|---|---|---|---|
| rel-trans-AB07-08[e] | | 0.104 ± 0.0123 (n = 4) | 0.0216 ± 0.00178**** (n = 5) | >100[b] | 21.9 ± 7.92 (n = 4) |
| rel-trans-12: rel-trans-FOB03-56A | | 5.88 ± 2.03 (n = 4) | 5.54 ± 1.43[ns] (n = 5) | >100[b] | 12.4 ± 636 (n = 4) |
| rel-cis-12: rel-cis-FOB03-56B | | 9.42 ± 3.44 (n = 4) | 13.8 ± 3.13[ns] (n = 5) | >100[b] | 12.3 ± 2.88 (n = 4) |

Unpaired Welch's t-test performed to compare selectivity for D$_3$R over D$_2$R K$_i$.
[ns] = P > 0.05; * =P < 0.05;  =P < 0.01; * = P < 0.001; **** = P < 0.0001.
[b] < 50% inhibition at 100 µM, from 2 to 5 independent triplicate experiments.
NT = not tested.
[c]Equilibrium dissociation constants (K$_i$) were derived from IC50 values using the Cheng-Prusoff equation. Each K$_i$ value represents the arithmetic mean ± S.E.M;
n = number of independent experiments, each performed in triplicate.
[d]Obtained as a mixture of diastereomers ((d.r. 75:25),
[e]Obtained as relative trans enantiomer (ee% > 99%).

Affinities for the orthosteric agonists AB03-02, (+)-(4aR,10bR)-2, (−)-(4aS,10bS)-2, (±)-cis-2, and are reported in Table 5 for comparison. Both (+)-(4aR,10bR)-2 and (−)-(4aS,10bS)-2 were tested for assay validation. It was confirmed that (+)-(4aR,10bR)-2 has the favored stereochemical configuration for the 9-methoxy-3,4,4a,10b-tetrahydro-2H,5H-chromeno[4,3-b][1,4]oxazine scaffold for D$_3$R binding. Inversion of configuration of the PP obtaining (−)-(4aS,10bS)-2 is detrimental for D$_3$R binding, with a loss of affinity>3000-fold. The cis and trans PP stereochemistry was studied for a complete investigation of the stereochemical space and suitability of (4a,10b)-2 as a PP in a bitopic configuration. Both rel-trans-12 (rel-trans-FOB03-56A) and rel-cis-12 (rel-cis-FOB03-56B) complement extensive SAR observations, suggesting that (+)-(4aR,10bR)-2 may not suitable for either O- or N-bitopic alkylation; if was further observed that this is not only due to regiochemistry but also stereochemistry dependent, since (4aR,10bR) appears to be the sole privileged absolute configuration for the bitopic analogues of (4a,10b)-2. Compounds rel-trans-12 (rel-trans-FOB03-56A) and rel-cis-12 (rel-cis-FOB03-56B) showed low micromolar affinity for D$_3$R, and an overall loss of subtype selectivity in comparison with the parent lead.

Compound FOB02-04A in Table 5 has improved D$_3$R affinity and selectivity in comparison to its stereoisomer FOB02-04B and parent compound AB03-02. Novel bitopic analogues were designed and synthesized using the 5-((2S,5S)-5-methylmorpholin-2-yl)pyridin-2-amine PP, and their SAR were directed toward the study of the linker's chemical space, including butyl-hydroxy and trans-cyclohexyl linkers. Despite a moderate submicromolar D$_3$R affinity, FOB02-67 presented decreased binding when compared to both AB04-88 and FOB02-04A. Despite the loss of affinity and selectivity, no wishing to be bound by theory, the value of this observation resides in the fact that the linker hydroxyl substitution, though optimal for D$_3$R antagonism, is not directly transferable to agonism, probably due to different receptor active and inactive conformations and pose codependence between the PP and linker. Introduction of the trans-cyclohexyl moiety affords an intermediate flexibility between AB04-88 and the more strained FOB02-04A and was better tolerated. Analogue rel-trans-AB07-08 presented the high D$_3$R affinity, in the same order of magnitude with agonist FOB02-04A, and ~10-15-fold improved with respect to AB03-02. Despite a retained high D$_3$R affinity, rel-trans-AB07-08 yielded a moderate selectivity over D$_2$R (6.5-fold). Structural and stereochemical requirements for both the PP and linker are unique in the design of antagonists or agonists; furthermore, without being bound by theory, for the optimal D$_3$R agonist affinity/subtype selectivity, (2S, 5S)-2-(6-aminopyridin-3-yl)-5-methylmorpholino PP, (1R, 2S)-methyl-cyclopropyl-ethyl linker, and 2-indoleamide SP seem to be the privileged synthons. Similarly, compounds (−)-(4aS,10bS)-2, (±)-cis-2, rel-trans-12, and rel-cis-12 can be valuable tools for computational biology. Studying these compounds allow for the first time observation at a molecular level of how changes in each fragment of bitopic drugs affect the overall poses of the entire molecule, and how this translates into pharmacological profiles, with the potential to finally identify the structural fingerprints discriminating D$_3$R agonism and antagonism, as well as D$_3$R and D$_2$R subtype selectivity.

Given the established poor D$_4$R affinity associated with these scaffolds, a subset of compounds was selected for off-target binding screening investigating affinities at different GPCRs highly colocalized and/or functionally related to D$_3$R. Competition experiments were performed on dopamine D$_1$ receptors (D$_1$R), known to form functional heteromers in vivo with D$_3$R, and opioid receptors (µORs), which are located in brain regions associated with reward and motivation and where $D_3R$ modulate opioid self-administration. Experiments were conducted in the presence of [$^3$H]-SCH23390 and [$^3$H]-DAMGO, using HEK293 cell membranes stably expressing $hD_1R$ and $h\mu OR$, respectively. Among the compounds, FOB02-04A presented the highest affinity for $D_1R$, with a low micromolar Ki. This does not affect the overall pharmacological applicability of the compound, since it still maintains a very high selectivity for $D_3R$ over $D_1R$ and $\mu OR$. This observation highlights how structurally different G protein-coupled receptor OBS can potentially accommodate identical PPs; however, the linker negatively affects the binding affinity, as small changes in the linker's substituents or rigidity result in complete inactivity for $D_1R$.

All the studied compounds were inactive or poor binders for $\mu OR$, with the exception of FOB02-67, whose hydroxyl substituted linker was detrimental for $D_3R$ binding but appears to be an important structural feature to achieve $\mu OR$ binding. Indeed, 10 is equipotent at $D_3R$ and $\mu OR$, suggesting that both receptors can be targeted by identical structural scaffolds, with the linker being the main discriminant. Compound FOB02-67 might very well exemplify the first synthetic analogue probing the possibility of future SAR studies directed toward multitarget ligands for simultaneous comodulation of dopaminergic and opioid pharmacology.

Not wishing to be bound by theory, the data suggest that, when switching from an orthosteric to bitopic binding mode, AB03-02 and (+)-(4aR,10bR)-2 diverge toward different binding modes, possibly due to different receptor conformations needed to accommodate them within the OBS and SBP simultaneously. Inverting the stereochemistry of AB03-02, from (2R,5S) to (2S,5S), when designing bitopic ligands allows the enantiospecific recognition of $D_3R$. However, independently from stereochemical combinations, (+)-(4aR,10bR)-2 has a unique structural motif which binds the $D_3R$ OBS and is unsuitable for modifications into bitopic analogues. This underscores the possible existence of multiple active states for the $D_3R$ when engaged with agonists. These "negative" observations can be essential to build computational models predicting how PPs can be modified in their core and stereochemistry to improve affinity and selectivities. A direct comparison between the compounds, covering a wide range of differences in binding affinities and selectivity, can feed extensive structural biology studies and molecular dynamic simulations. Further investigations are elucidating whether these different ligand-induced receptor conformations potentially affect recruitment of second messengers ultimately inducing bias signaling.

Our data also suggest that bitopic agonists and antagonists bind differently within the $D_3R$ active and inactive states, respectively. Despite the presence of a hydroxy substituent or a trans-cyclohexyl group in the linker promoting high affinity and selectivity for various $D_3R$ antagonists, the same substitutions applied to our bitopic agonists reduce $D_3R$ affinity and subtype selectivity. These exemplify how SAR directed to explore different linkers' chemical space and chirality might represent an important future direction in drug design of highly selective $D_3R$ agonists.

Considering the limited information regarding $D_2$-like receptor active states, these extensive data sets, along with previous studies, provide a large library of $D_3R$ agonists to elucidate a greater understanding of ligand-$D_3R$ engagement and clarify the differences ultimately underlying multiple active and inactive receptor conformations.

Moreover, the growing interest in drug design assisted by artificial intelligence (AI)-machine learning (ML), and the extensive efforts directed toward multiparameter physiochemical analyses, would greatly benefit from our $D_3R$ agonists library. ML requires accurate learning data sets and model validation establishing recognizable structural pattern for a model's predictive validity. Active compounds used for training sets are often taken from known experimental observations; however, chemogenetic SAR libraries usually lack inactive or poorly binding compounds with stereochemistry-dependent structural features. The studied molecules, with multiple characterized chiral centers, and detailed in vitro pharmacology, can help ML training, provide structural information on fragment-based drug design, and expand drug prediction libraries based on chirality and PP suitability for bitopic modifications.

Linker chirality and chemical space investigation allowed for the identification of pharmacological profiles depending predominantly on its substitutions and rigidity: (i) Cyclopropyl-containing linker (5) is privileged for high $D_3R$ affinity and selectivity and is also an important synthon for $D_1R$ recognition directed toward $D_1R$-$D_3R$ multitarget drug design. (ii) Cyclohexyl-containing linker (rel-trans-AB07-08) is well-tolerated at $D_3R$ with moderate subtype selectivity, despite a slight loss in overall affinity. (iii) Hydroxyl-substituted linker (FOB02-67) causes a loss in $D_3R$ affinity, maintains a moderate subtype selectivity over $D_2R$, and results in an increased $\mu OR$ affinity. This might inspire new SAR efforts to generate $D_3R$-$\mu OR$ dual-target chemical tools for studying dopaminergic and opioid pharmacology in pain, reward, and motivation. These data also suggest that identification of new leads and structural pharmacophores for multitarget GPCR studies can be identified via off-target binding screening based on receptor colocalization and functional similarities, more than just simple structural analogies between receptor proteins.

The compounds, compositions, methods, and processes disclosed herein include(s) at least the following aspects:

Aspect 1: A compound of Formula I, II, III, or IV:

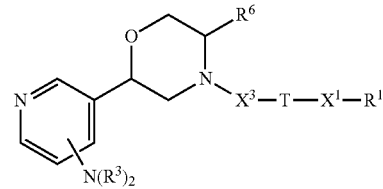

Formula I

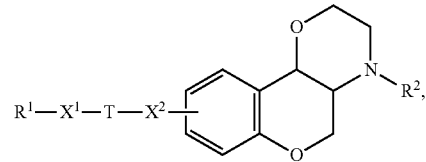

Formula II

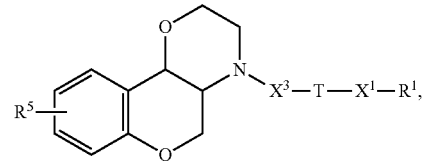

Formula III

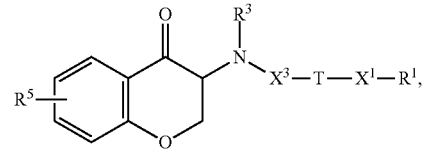

Formula IV or a pharmaceutically acceptable salt thereof, wherein $R^1$ is an aryl, a heteroaryl, or a heterocycloalkyl; T is a tether group; $X^1$ is a covalent bond, O, S, $NR^3$, —(C=O)—, or $C(R^4)_2$, $N(R^3)$—(C=O)—, —(C=O)—$N(R^3)$, —O—(C=O)—O—, —O—(C=O)—$N(R^3)$—, —$N(R^3)$—(C=O)—O—, or —$N(R^3)$—(C=O)—$N(R^3)$—; $X^2$ is a covalent bond, O, S, $NR^3$, —(C=O)—, or $C(R^4)_2$, $N(R^3)$—(C=O)—, —(C=O)—$N(R^3)$, —O—(C=O)—O—, —O—(C=O)—$N(R^3)$—, —$N(R^3)$—(C=O)—O—, or —$N(R^3)$—(C=O)—$N(R^3)$—; $R^2$ is hydrogen, $C_1$-$C_6$ alkyl, $C_1$-$C_6$ haloalkyl, or $C_2$-$C_6$alkanoyl; each instance of $R^3$ independently is hydrogen, $C_1$-$C_6$ alkyl, $C_1$-$C_6$ haloalkyl, or $C_2$-$C_6$alkanoyl; each instance of $R^4$ independently is hydrogen, $C_1$-$C_6$ alkyl, $C_1$-$C_6$ haloalkyl, halogen, hydroxyl, amino, nitro, cyano, —COOH, —CHO, —$CONH_2$, $C_1$-$C_6$alkoxy, $C_1$-$C_6$haloalkoxy, $C_2$-$C_6$alkanoyl, mono-$C_1$-$C_2$alkylamino, or di-$C_1$-$C_2$alkylamino; $X^3$ is a covalent bond or —(C=O)—; $R^5$ is hydrogen, hydroxyl, halogen, amino, nitro, cyano, $C_1$-$C_6$ alkyl, —COOH, —CHO, —$CONH_2$, $C_1$-$C_6$alkoxy, $C_1$-$C_6$haloalkyl, $C_1$-$C_6$haloalkoxy, $C_2$-$C_6$alkanoyl, mono-$C_1$-$C_2$alkylamino, or di-$C_1$-$C_2$alkylamino; and $R^6$ is $C_1$-$C_6$ alkyl, $C_1$-$C_6$alkoxy, $C_1$-$C_6$haloalkyl, or $C_1$-$C_6$haloalkoxy.

Aspect 2: The compound of Aspect 1, wherein the tether group T is an alkyl chain containing 3, 4, 5, 6, 7, 8, 9 or more carbon atoms in the chain (the number of carbon atoms excluding pendant substitution), optionally including internal unsaturation, an internal cycloalky group (e.g, cyclopropyl, cyclobutyl, cyclopentyl, or cyclohexyl), an internal heteroatom (e.g. O, N, S, or P, specifically an internal O (ether group) such as where T is —$(CH_2)_y$—O—$(CH_2)_y$— where each y independently is 1, 2, 3, or more), a substitution on the alkyl chain where the substitution is described herein (e.g. oxo, hydroxyl, alkyl, alkoxy, halogen, cycloalkyl group, hydroxyl-cycloalkyl group, etc.), an internal heteroaryl group (e.g. triazolyl), an internal heterocycloalkyl group (e.g., pyrrolidinyl), or a combination thereof.

Aspect 3: The compound of Aspect 1, wherein T is —$(CH_2)_m$— wherein m is 3, 4, 5, 6, 7, or 8 (e.g., n-butyl, n-pentyl, etc.); —$(CH_2)_m$— substituted with 1, 2, or 3 substituents wherein each substituent independently is $C_1$-$C_6$ alkyl, $C_1$-$C_6$ haloalkyl, halogen, hydroxyl, amino, nitro, cyano, —COOH, —CHO, —$CONH_2$, $C_1$-$C_6$alkoxy, $C_1$-$C_6$haloalkoxy, $C_2$-$C_6$alkanoyl, mono-$C_1$-$C_2$alkylamino, or di-$C_1$-$C_2$alkylamino, specifically 1 substituent that is hydroxyl, wherein m is 3, 4, 5, 6, 7, or 8 (e.g., substituted n-butyl, n-pentyl, etc.); —$(CH_2)_n$—CH=CH—$(CH_2)_n$— wherein each instance of n independently is 1, 2, or 3 (e.g., E-butenyl); or

wherein each instance of n independently is 1, 2, or 3 (e.g., cis-(methyl)cyclopropyl-methyl, trans-(methyl)cyclopropyl-methyl, trans-(methyl)cyclopropyl-ethyl, trans-(ethyl)cyclopropyl-methyl), cis-(methyl)cyclopropyl-ethyl, cis-(ethyl)cyclopropyl-methyl);
or T can be one of the following groups:

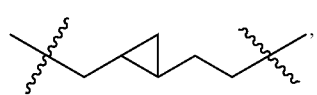

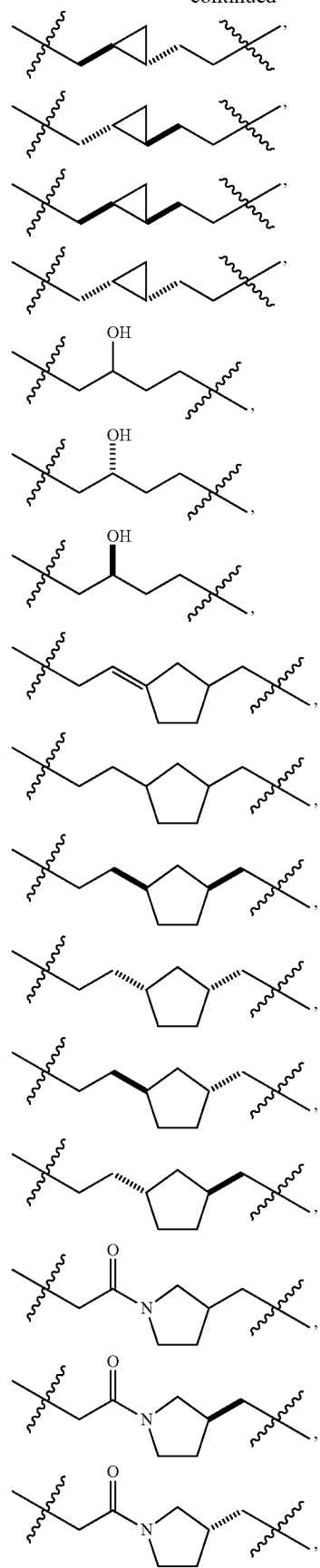

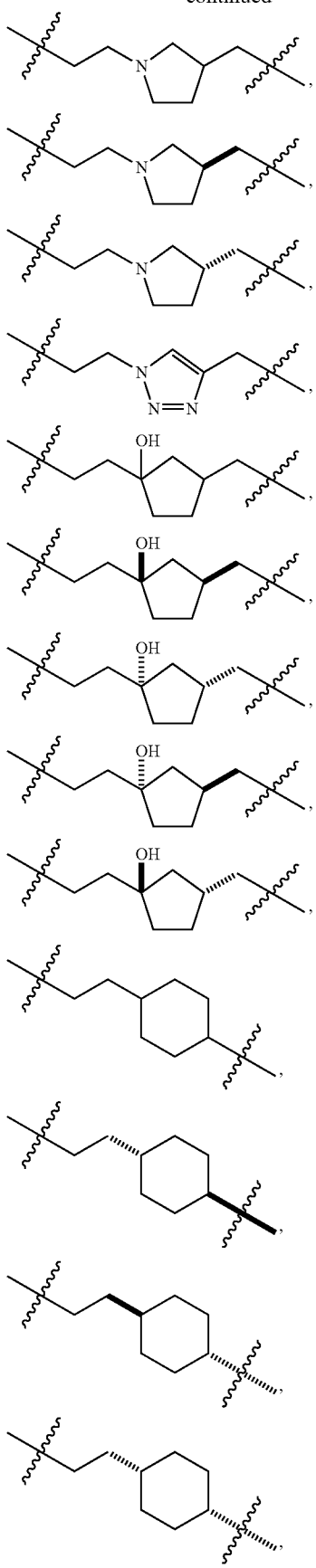
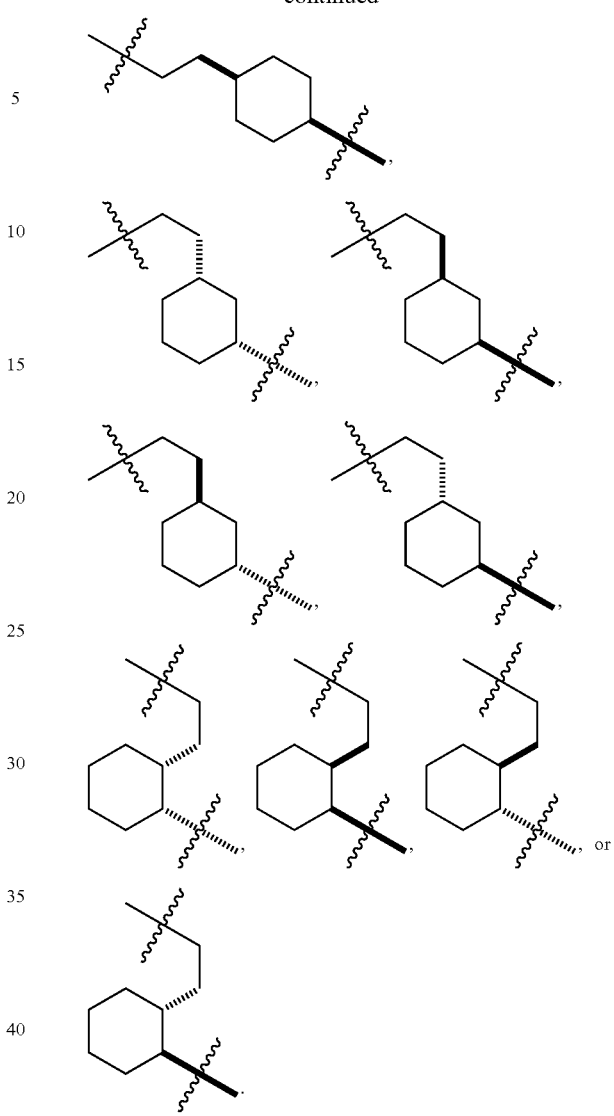
Aspect 4: The compound of any one of Aspects 1-3, wherein R[1] is benzofuran, benzothiazole, 3,4-dihydroquinolin-2(1H)-one, fluorene, indole, or 1H-pyrrolo[2,3-b]pyridine.
Aspect 5: The compound of any one of Aspects 1-4, wherein R is
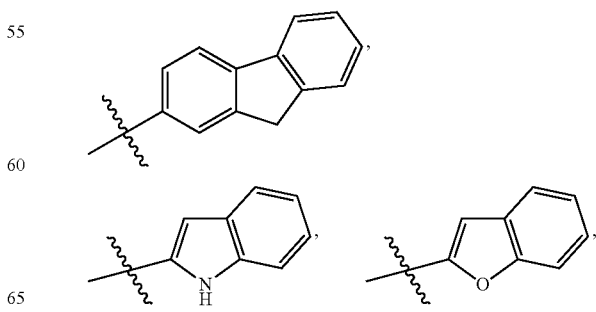

-continued

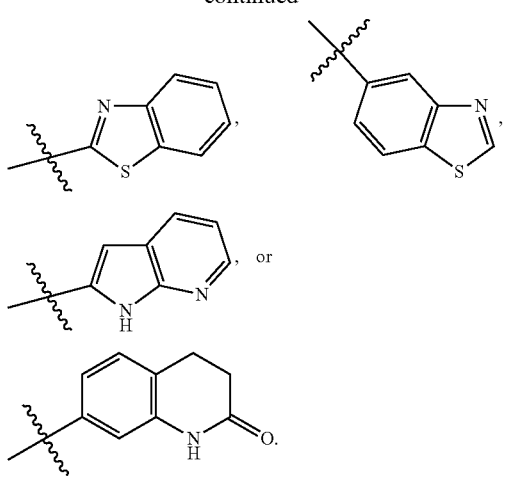

Aspect 6: The compound of any one of Aspects 1-5, wherein $X^1$ is O, $N(R^3)$—(C=O)— or —(C=O)—$N(R^3)$; $X^2$ is a covalent bond or O; $R^2$ is $C_1$-$C_6$ alkyl, specifically $C_2$-$C_5$ alkyl, or more specifically $C_3$-$C_4$ alkyl; each instance of $R^3$ independently is hydrogen or $C_1$-$C_6$ alkyl, specifically hydrogen; $X^3$ is a covalent bond; R is hydrogen, hydroxyl, or $C_1$-$C_6$alkoxy, specifically hydroxyl; and $R^6$ is $C_1$-$C_6$ alkyl, specifically, $C_1$-$C_3$ alkyl, or more specifically methyl.

Aspect 7: The compound of any one of Aspects 1-6, wherein the compound is Formula Ia, Ib, IIa, IIIa, Ib, Ia-1, Ia-2, Ib-1, or Ib-2:

Formula Ia
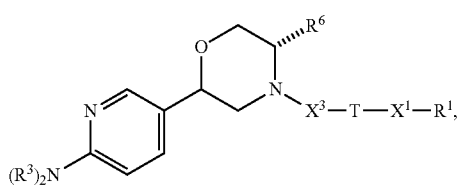

Formula Ib
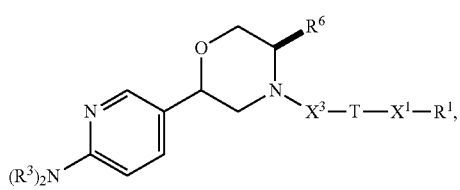

Formula IIa
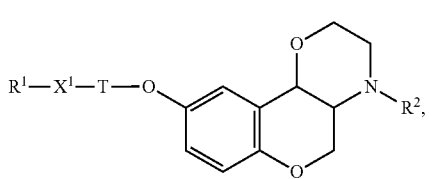

Formula IIIa
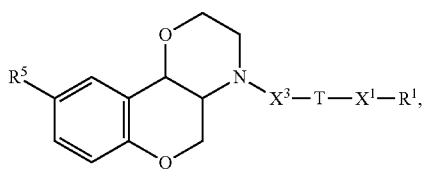

Formula Ib
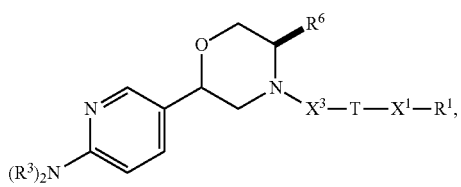

Formula Ia-1
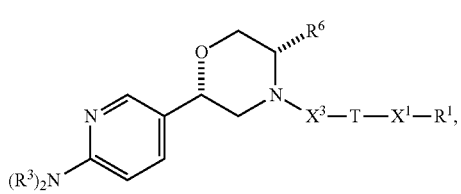

Formula Ia-2
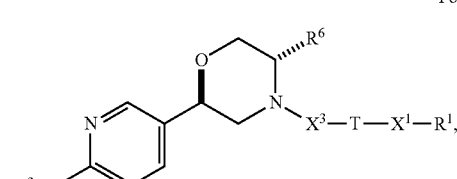

Formula Ib-1
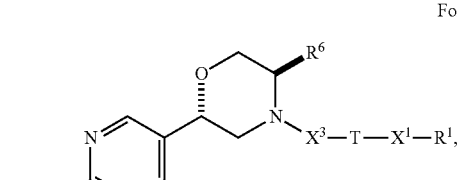

Formula Ib-2 or a pharmaceutically acceptable salt thereof, specifically Formula Ia-1.

Aspect 8: A compound of Table 1, Table 2, Table 4, Table 5, or pharmaceutical salt thereof, excluding Pramipexole, (+)-PD128,907, nor-PD128,907, and PF592,379.

Aspect 9: A pharmaceutical composition comprising a compound or salt of any one of Aspects 1-8, comprising at least one pharmaceutically acceptable carrier.

Aspect 10: The pharmaceutical composition of Aspect 9, wherein the composition is formulated as an injectable fluid, an aerosol, a cream, a gel, a tablet, a pill, a capsule, a syrup, an ophthalmic solution, or a transdermal patch.

Aspect 11: A package comprising the pharmaceutical composition of Aspect 9 or 10 in a container and further comprising instructions for using the composition in order to treat a patient suffering from a neuropsychiatric disorder or dopaminergic system dysfunction.

Aspect 12: A method for treating a neuropsychiatric disorder or dopaminergic system dysfunction comprising providing a therapeutically effective amount of a compound or salt of any one of Aspects 1-8 or a pharmaceutical composition of any one of Aspects 10-11 to a patient in need thereof.

Aspect 13: A process of preparing a compound of Formula I of any one of Aspects 1-8, comprising:
reacting Intermediate I-A with Intermediate I-B via reductive amination

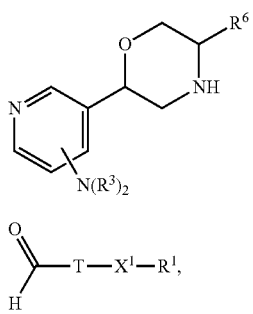

Intermediate I-A

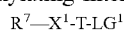

Intermediate I-B alkylating Intermediate I-A with Intermediate I-C

R$^7$—X$^1$-T-LG$^1$　　　　　Intermediate I-C, wherein LG$^1$ is a leaving group; and
R$^7$ is R$^1$ or a protecting group,
optionally when R$^7$ is a protecting group, further comprising deprotecting and coupling the resulting intermediate compound with a compound comprising a R$^1$ group.

Aspect 14: A process of preparing a compound of Formula II of any one of Aspects 1-8, comprising:
alkylating Intermediate II-A with Intermediate II-B

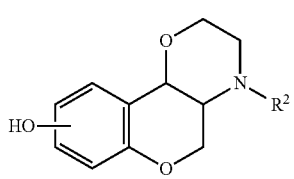

Intermediate II-A

R$^7$—X$^1$-T-LG$^1$　　　　　Intermediate II-B wherein LG$^1$ is a leaving group; and
R$^7$ is R$^1$ or a protecting group,
optionally when R$^7$ is a protecting group, further comprising deprotecting and coupling the resulting intermediate compound with a compound comprising a R$^1$ group.

Aspect 15: A process of preparing a compound of Formula III of any one of Aspects 1-8, comprising:
reacting Intermediate III-A with Intermediate III-B via reductive amination

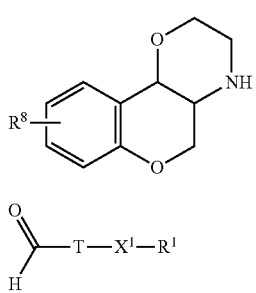

Intermediate III-A

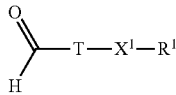

Intermediate III-B wherein R$^8$ is hydroxyl or —O-PG$^2$, wherein PG$^2$ is a hydroxyl protecting group, and optionally further comprising a deprotecting step to remove PG$^2$.

Aspect 16: A process of preparing a compound of Formula IV of any one of Aspects 1-8, comprising:
reacting Intermediate IV-A with Intermediate IV-B via reductive amination

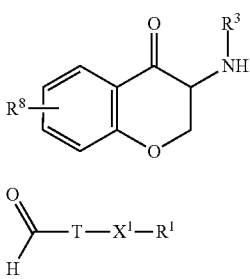

Intermediate IV-A

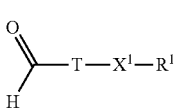

Intermediate IV-B wherein R$^8$ is hydroxyl or —O-PG$^2$, wherein PG$^2$ is a hydroxyl protecting group, and optionally further comprising a deprotecting step to remove PG$^2$.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

In general, the disclosure may alternately comprise, consist of, or consist essentially of, any appropriate components herein disclosed. The disclosure may additionally, or alternatively, be formulated so as to be devoid, or substantially free, of any components, materials, ingredients, adjuvants or species used in the prior art compositions or that are otherwise not necessary to the achievement of the function and/or objectives of the present disclosure.

The endpoints of all ranges directed to the same component or property are inclusive of the endpoints, are independently combinable, and include all intermediate points and ranges (e.g., ranges of "up to 25 wt %, or more specifically 5 to 20 wt %" is inclusive of the endpoints and all intermediate values of the ranges of "5 to 25 wt %," such as "10 to 23 wt %," "20 to 24," "1 to 5 wt %," etc.). Disclosure of a narrower range or more specific group in addition to a broader range is not a disclaimer of the broader range or larger group.

"Combination" is inclusive of blends, mixtures, reaction products, and the like.

The terms "a" and "an" and "the" herein do not denote a limitation of quantity, and are to be construed to cover both the singular and the plural, unless otherwise indicated herein or clearly contradicted by context. "Or" means "and/or." The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

The modifier "about" used in connection with a quantity is inclusive of the stated value and has the meaning dictated by the context (e.g., includes the degree of error associated with measurement of the particular quantity). "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this invention belongs.

Unless otherwise specified herein, any reference to standards, regulations, testing methods and the like, refer to the standard, regulation, guidance or method that is in force at the time of filing of the present application.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

The invention claimed is:

1. A compound of Formula I:

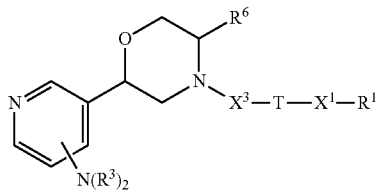

Formula I or a pharmaceutically acceptable salt thereof, wherein
$R^1$ is benzofuran, benzothiazole, 3,4-dihydroquinolin-2(1H)-one, fluorene, indole, or 1H-pyrrolo[2,3-b]pyridine, each of which may optionally be substituted with 1, 2, 3, or 4 substituents selected from halogen, cyano, hydroxyl, nitro, azido, amino, —COOH, —CHO, a $C_2$-$C_6$ alkanoyl group, carboxamido, a $C_1$-$C_8$ alkyl group, a $C_1$-$C_8$ haloalkyl group, a $C_2$-$C_8$ alkenyl group, a $C_2$-$C_8$ alkynyl group, a $C_1$-$C_8$alkoxy group, a $C_1$-$C_8$ haloalkoxy group, phenoxy, a $C_1$-$C_8$ alkylthio group, a $C_1$-$C_8$ alkylsulfinyl group, a $C_1$-$C_8$ alkylsulfonyl group, a $C_1$-$C_8$ aminoalkyl group, phenyl, biphenyl, naphthyl, benzyl, benzyloxy, a $C_3$-$C_8$ cycloalkenyl, a ($C_3$-$C_8$ cycloalkyl) $C_0$-$C_3$ alkyl group, a (heterocycloalkyl) $C_0$-$C_3$ alkyl group, a heteroaryl group, and a combination thereof, wherein heterocycloalkyl is a saturated cyclic group having 3 to 8 ring atoms containing from 1 to 3 heteroatoms chosen from N, O, and S, with remaining ring atoms being carbon, and the heteroaryl group is a 5- to 7-membered monocyclic or 7- to 10-membered bicyclic heterocyclic ring which contains at least one aromatic ring containing from 1 to 4 heteroatoms chosen from N, O, and S, with remaining ring atoms being carbon;

T is a tether group, wherein the tether group T is an alkyl chain containing 3, 4, 5, 6, 7, 8, or 9 carbon atoms, optionally including internal unsaturation, an internal cycloalkyl group, an internal heteroatom, one or more substitutions selected from oxo, hydroxyl, alkyl, alkoxy, halogen, cycloalkyl group, hydroxyl-cycloalkyl, and a combination thereof on the alkyl chain, an internal heteroaryl group, an internal heterocycloalkyl group, or a combination thereof, wherein the internal heteroaryl group is an internal 5- to 7-membered monocyclic or 7- to 10-membered bicyclic heterocyclic ring which contains at least one aromatic ring containing from 1 to 4 heteroatoms chosen from N, O, and S, with remaining ring atoms being carbon and the internal heterocycloalkyl group is an internal saturated cyclic group having 3 to 8 ring atoms containing from 1 to 3 heteroatoms chosen from N, O, and S, with remaining ring atoms being carbon;

$X^1$ is a covalent bond, O, S, $NR^3$, —(C=O)—, or $C(R^4)_2$, $N(R^3)$—(C=O)—, —(C=O)—$N(R^3)$, —O—(C=O)—O—, —O—(C=O)—$N(R^3)$—, —$N(R^3)$—(C=O)—O—, or —$N(R^3)$—(C=O)—$N(R^3)$—;

each instance of $R^3$ independently is hydrogen, $C_1$-$C_6$ alkyl, $C_1$-$C_6$ haloalkyl, or $C_2$-$C_6$ alkanoyl;

each instance of $R^4$ independently is hydrogen, $C_1$-$C_6$ alkyl, $C_1$-$C_6$ haloalkyl, halogen, hydroxyl, amino, nitro, cyano, —COOH, —CHO, —CONH$_2$, $C_1$-$C_6$alkoxy, $C_1$-$C_6$haloalkoxy, $C_2$-$C_6$alkanoyl, mono-$C_1$-$C_2$alkylamino, or di-$C_1$-$C_2$alkylamino;

$X^3$ is a covalent bond or —(C=O)—;

and $R^6$ is $C_1$-$C_6$ alkyl, $C_1$-$C_6$alkoxy, $C_1$-$C_6$haloalkyl, or $C_1$-$C_6$haloalkoxy.

2. The compound of claim 1, wherein T is one of the following groups:

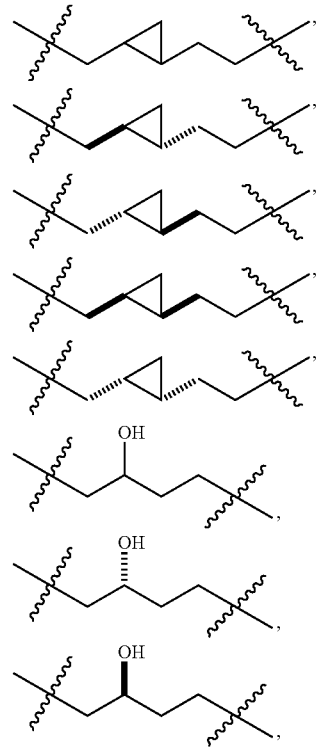

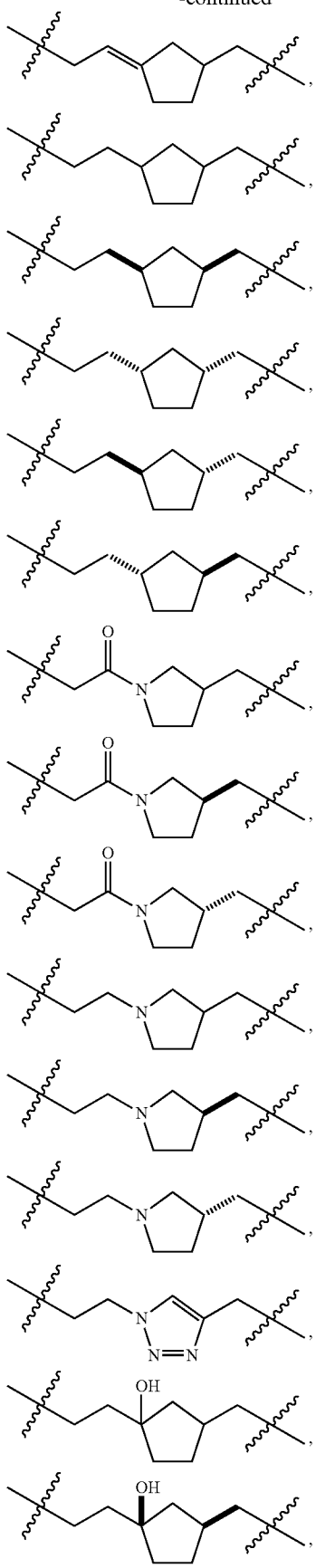
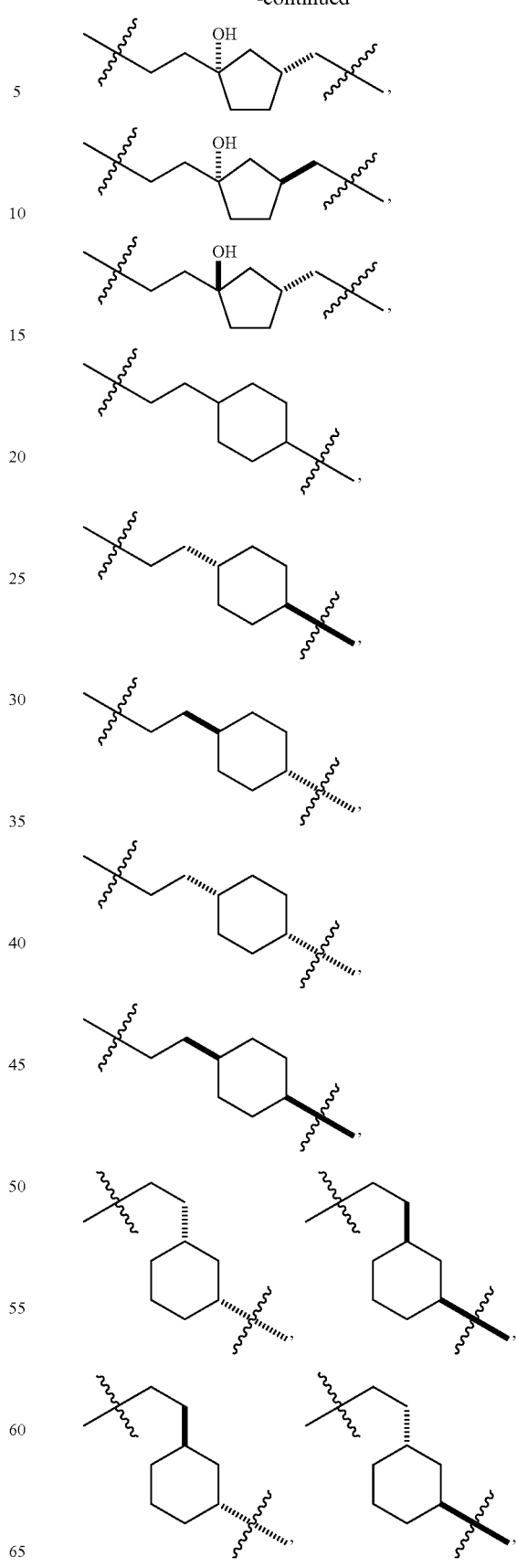

-continued

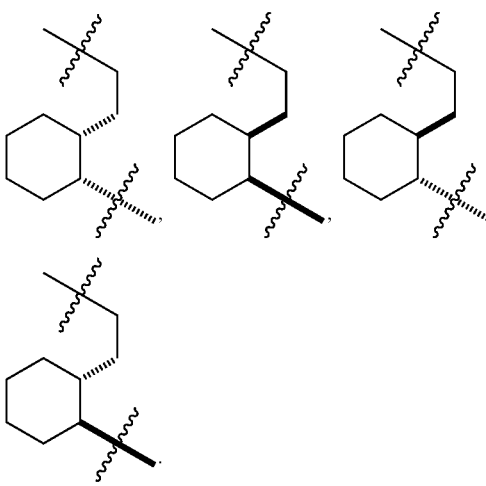

3. The compound of claim 1, wherein R¹ is

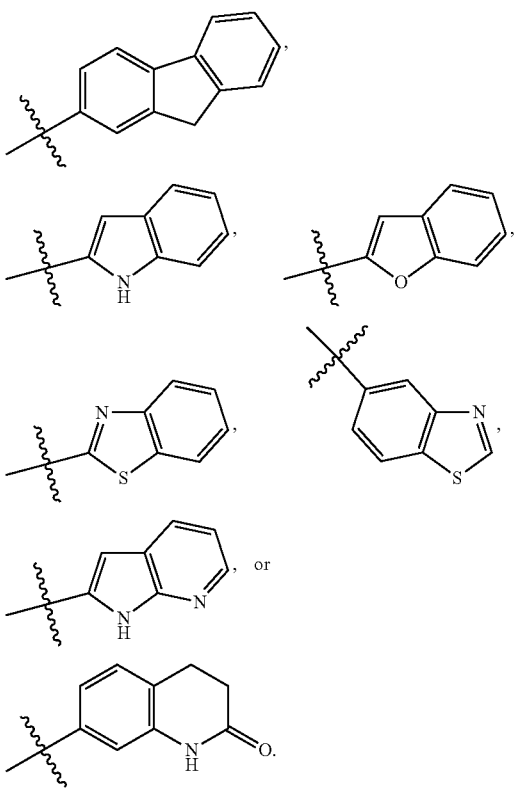

4. The compound of claim 1, wherein
X¹ is O, N(R³)—(C=O)— or —(C=O)—N(R³);
each instance of R³ independently is hydrogen or $C_1$-$C_6$ alkyl;
X³ is a covalent bond; and
R⁶ is $C_1$-$C_6$ alkyl.

5. The compound of claim 4, wherein each instance of R³ independently is hydrogen; and R⁶ is $C_1$-$C_3$ alkyl.

6. The compound of claim 5, wherein R e is methyl.

7. The compound of claim 1, wherein the compound is Formula Ia, Ib, Ia-1, Ia-2, Ib-1, or Ib-2:

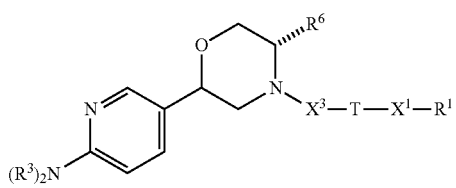
Formula Ia

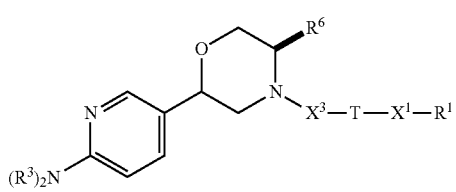
Formula Ib

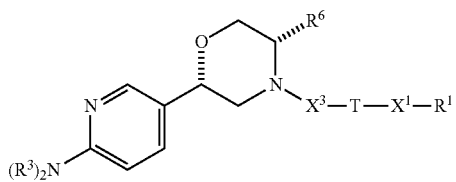
Formula Ia-1

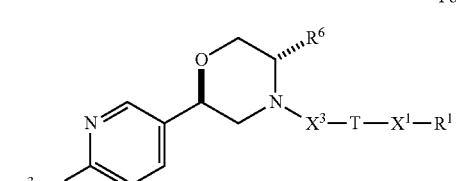
Formula Ia-2

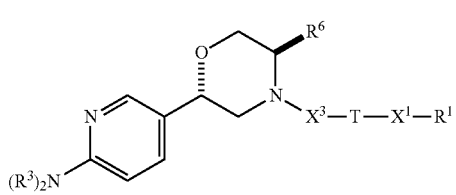
Formula Ib-1

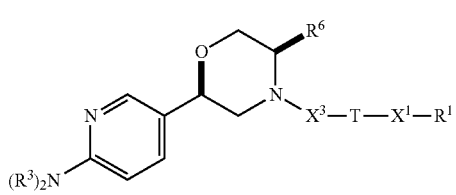
Formula Ib-2

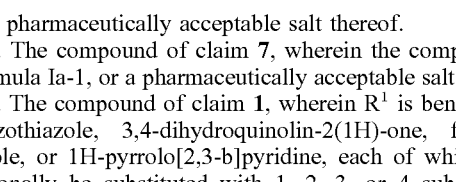

or a pharmaceutically acceptable salt thereof.

8. The compound of claim 7, wherein the compound is Formula Ia-1, or a pharmaceutically acceptable salt thereof.

9. The compound of claim 1, wherein R¹ is benzofuran, benzothiazole, 3,4-dihydroquinolin-2(1H)-one, fluorene, indole, or 1H-pyrrolo[2,3-b]pyridine, each of which may optionally be substituted with 1, 2, 3, or 4 substituents wherein each substituent independently is $C_1$-$C_6$ alkyl, $C_1$-$C_6$ haloalkyl, halogen, hydroxyl, amino, nitro, cyano, —COOH, —CHO, —CONH₂, $C_1$-$C_6$alkoxy, $C_1$-$C_6$haloalkoxy, $C_2$-$C_6$alkanoyl, mono-$C_1$-$C_2$alkylamino, or di-$C_1$-$C_2$alkylamino.

10. The compound of claim 1, wherein $R^1$ is benzofuran, benzothiazole, 3,4-dihydroquinolin-2(1H)-one, fluorene, indole, or 1H-pyrrolo[2,3-b]pyridine.

11. The compound of claim 1, wherein each instance of $R^3$ is hydrogen.

12. The compound of claim 1, wherein T is —$(CH_2)_m$— and m is 3, 4, 5, 6, 7, or 8.

13. The compound of claim 1, wherein T is —$(CH_2)_m$— substituted with 1, 2, or 3 substituents, wherein each substituent independently is $C_1$-$C_6$ alkyl, $C_1$-$C_6$ haloalkyl, halogen, hydroxyl, amino, nitro, cyano, —COOH, —CHO, —CONH$_2$, $C_1$-$C_6$alkoxy, $C_1$-$C_6$haloalkoxy, $C_2$-$C_6$alkanoyl, mono-$C_1$-$C_2$alkylamino, or di-$C_1$-$C_2$alkylamino, and wherein m is 3, 4, 5, 6, 7, or 8.

14. The compound of claim 1, wherein T is —$(CH_2)_n$—CH=CH—$(CH_2)_n$— and each instance of n independently is 1, 2, or 3.

15. The compound of claim 1, wherein T is

and each instance of n independently is 1, 2, or 3.

16. The compound of claim 1, wherein T is one of the following groups:

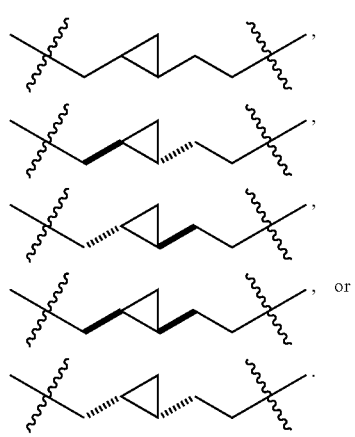

17. A compound of

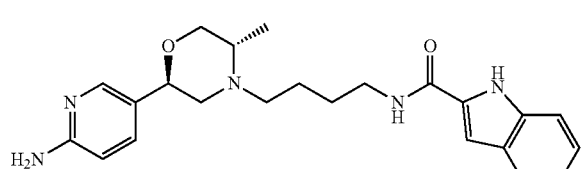

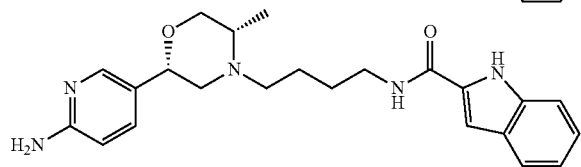

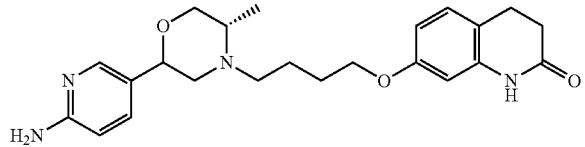

-continued

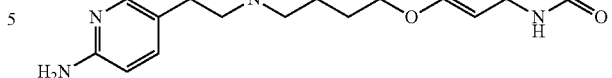

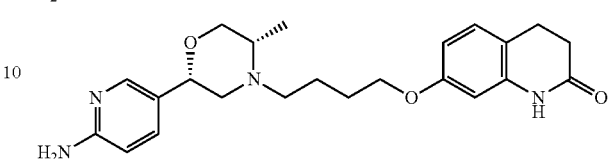

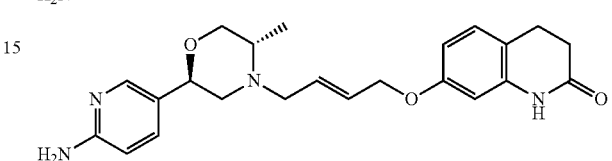

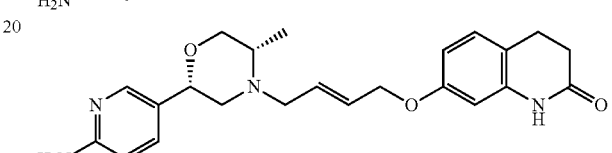

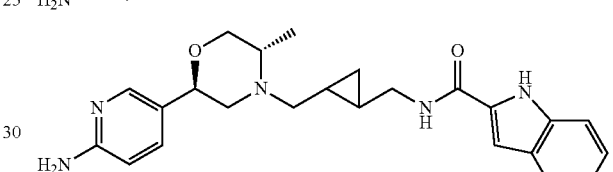

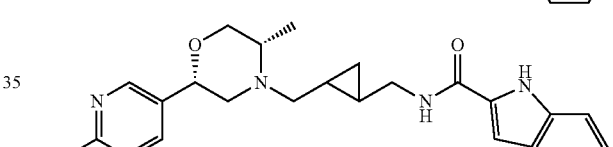

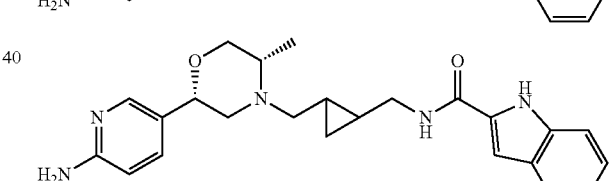

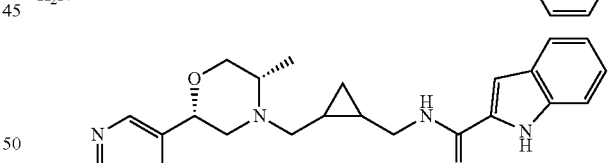

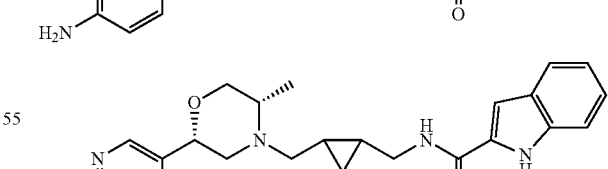

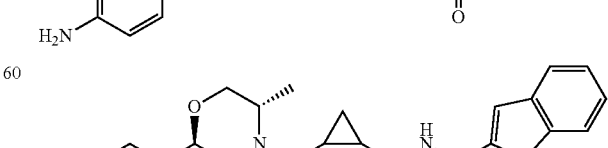

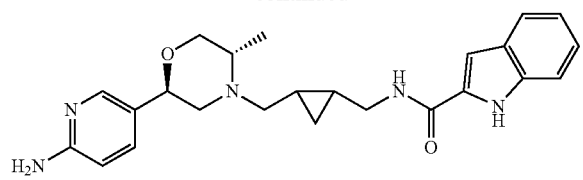
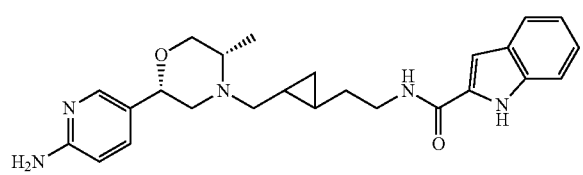
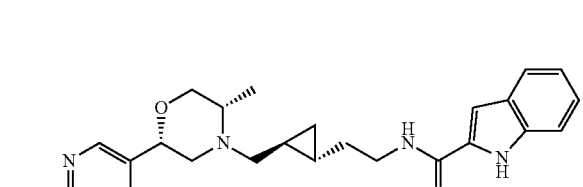
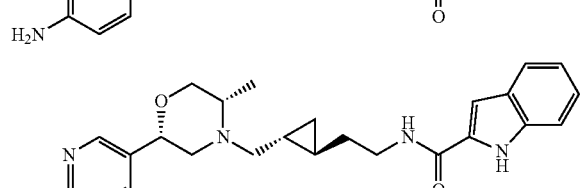
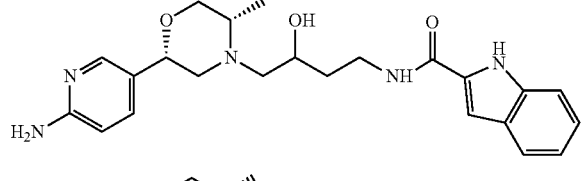
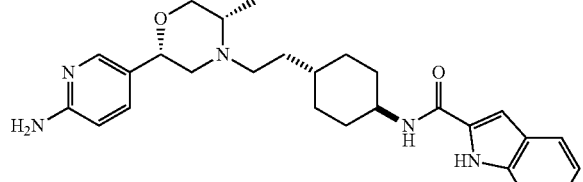
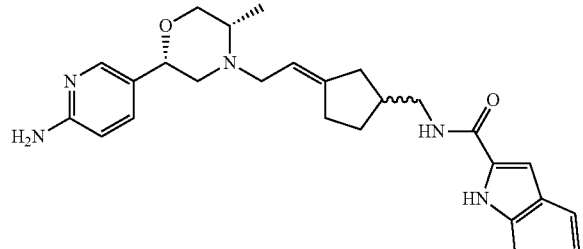
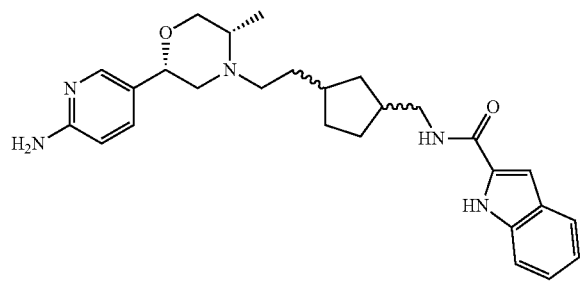
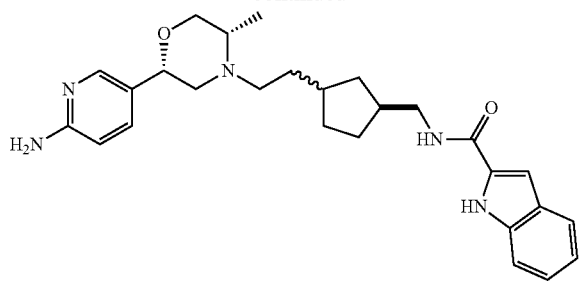
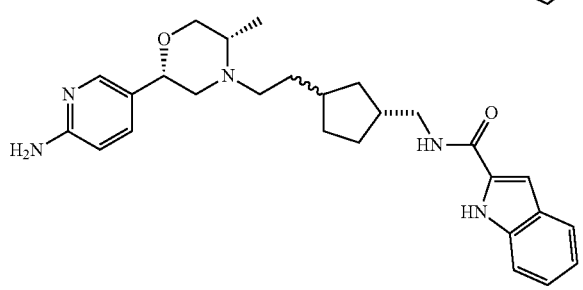
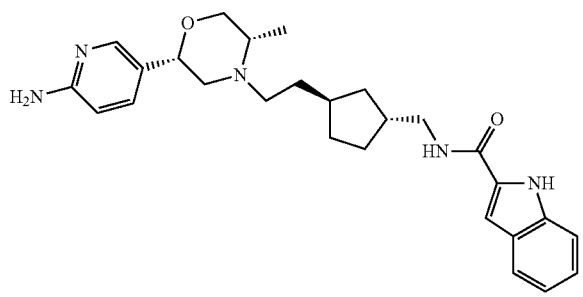
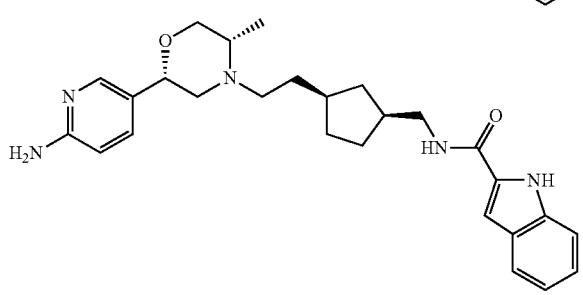
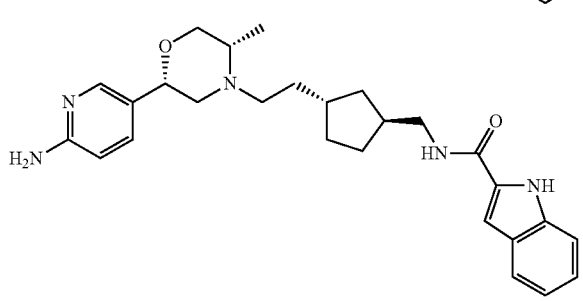
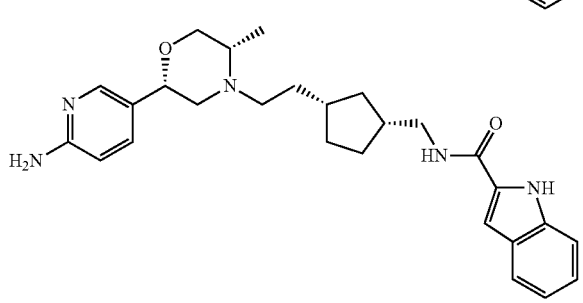

-continued

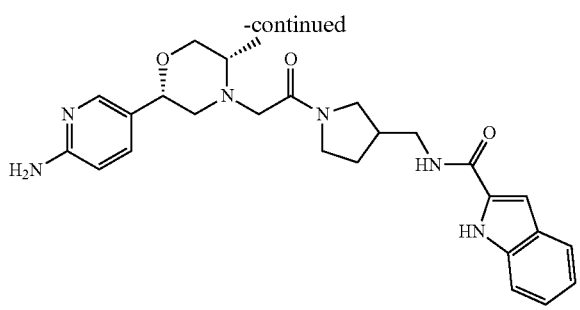
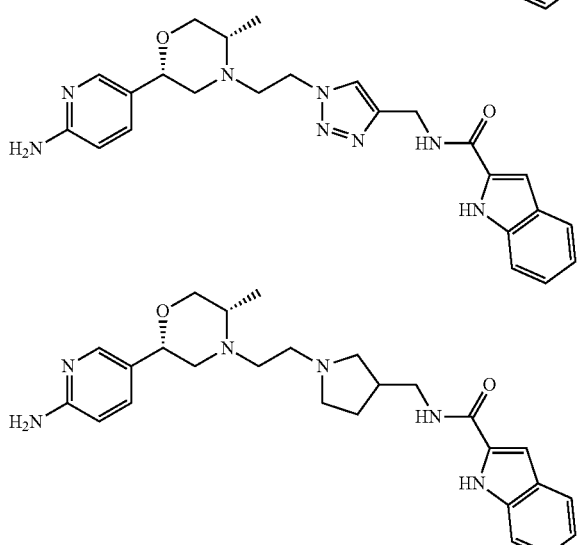
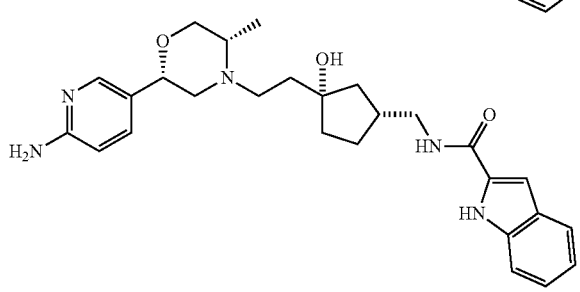
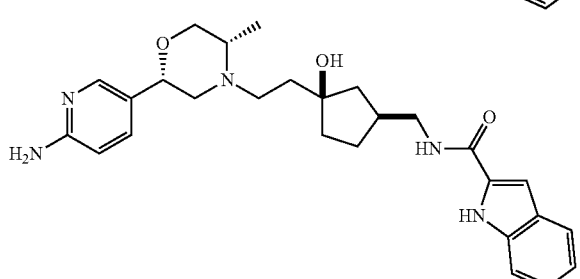
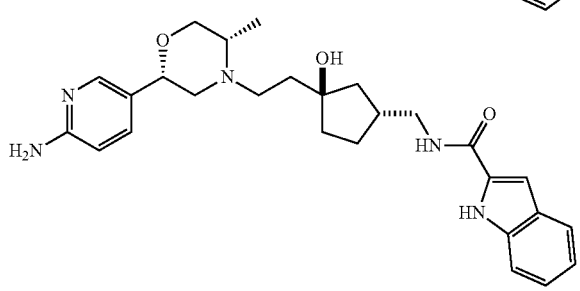

-continued

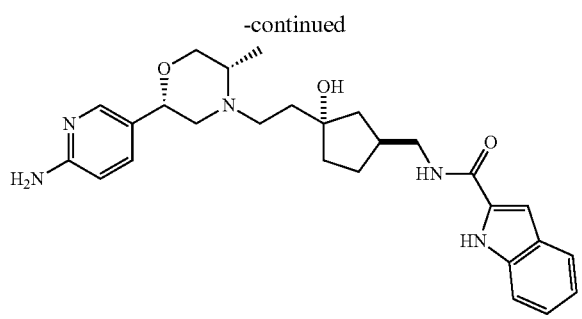

or pharmaceutical salt thereof.

18. A pharmaceutical composition comprising the compound or salt of claim 1, and optionally further comprising at least one pharmaceutically acceptable carrier.

19. The pharmaceutical composition of claim 18, wherein the composition is formulated as an injectable fluid, an aerosol, a cream, a gel, a tablet, a pill, a capsule, a syrup, an ophthalmic solution, or a transdermal patch.

20. A package comprising the pharmaceutical composition of claim 18 in a container and further comprising instructions for using the composition in order to treat a patient suffering from Parkinson's disease or restless leg syndrome.

21. A process of preparing the compound of Formula I of claim 1, comprising:

reacting Intermediate I-A with Intermediate I-B via reductive amination

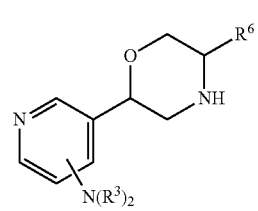

Intermediate I-A

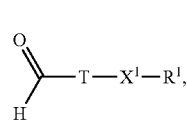

Intermediate I-B or alkylating Intermediate I-A with Intermediate I-C

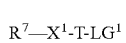

Intermediate I-C, wherein $LG^1$ is a leaving group; and $R^7$ is $R^1$.

22. A method for treating Parkinson's disease or restless leg syndrome, comprising providing a therapeutically effective amount of the compound or salt of claim 1 or a pharmaceutical composition thereof to a patient in need thereof.

* * * * *